US010536570B2

(12) United States Patent
Nalluri et al.

(10) Patent No.: US 10,536,570 B2
(45) Date of Patent: Jan. 14, 2020

(54) PERSONAL SAFETY AND EMERGENCY SERVICES

(71) Applicant: McAfee, LLC, Santa Clara, CA (US)

(72) Inventors: Srikanth Nalluri, Bangalore (IN); Dattatraya Kulkarni, Bangalore (IN); Raja Sinha, Bangalore (IN); Venkatasubrahmanyam Krishnapur, Bangalore (IN); Yogesh Jain, Cupertino, CA (US); Kaushal Kumar Dhruw, Bangalore (IN); Kamlesh Halder, Bangalore (IN)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 15/348,531

(22) Filed: Nov. 10, 2016

(65) Prior Publication Data

US 2017/0195865 A1 Jul. 6, 2017

Related U.S. Application Data

(63) Continuation of application No. 14/127,426, filed as application No. PCT/US2013/065794 on Oct. 18, 2013, now abandoned.

(30) Foreign Application Priority Data

Oct. 19, 2012 (IN) ........................... 1217/KOL/2012

(51) Int. Cl.
*H04M 11/04* (2006.01)
*H04M 1/2745* (2006.01)
(Continued)

(52) U.S. Cl.
CPC .... *H04M 1/274583* (2013.01); *G06F 16/951* (2019.01); *G06Q 50/265* (2013.01);
(Continued)

(58) Field of Classification Search
CPC ......... H04W 4/22; H04W 4/005; H04W 4/02; H04W 76/007
See application file for complete search history.

(56) References Cited

U.S. PATENT DOCUMENTS 7,296,070 B2 11/2007 Sweeney et al.
7,343,302 B2 3/2008 Aratow et al.
(Continued)

FOREIGN PATENT DOCUMENTS

JP H10190838 A 7/1998
JP 2003087436 A 3/2003
(Continued)

OTHER PUBLICATIONS

Chinese Patent Office First Office Action in Chinese Patent Application No. 201380048769.4 dated Mar. 20, 2017 (with summary of relevance), 9 pages.
(Continued)

*Primary Examiner* — Khalid W Shaheed
(74) *Attorney, Agent, or Firm* — Patent Capital Group

(57) ABSTRACT

A safety event is determined as affecting a user based at least in part context data collected at a user device associated with the user. In some aspects, context data is detected from sensors on the client device, the context data describing a present context of the user. A deviation of the present context from a historical context is determined to be beyond a threshold. Determining that the deviation is beyond the threshold can be determined to correspond to a safety event potentially jeopardizing safety of the user. In some aspects, an action can be launched in response to determining the safety event.

17 Claims, 30 Drawing Sheets

(51) Int. Cl.

| | |
|---|---|
| ***G06F 16/951*** | (2019.01) |
| ***G06Q 50/26*** | (2012.01) |
| ***H04W 8/22*** | (2009.01) |
| ***H04M 19/04*** | (2006.01) |
| *G06F 21/62* | (2013.01) |
| *H04W 88/02* | (2009.01) |
| *H04W 4/14* | (2009.01) |

(52) U.S. Cl.

CPC ............. *H04M 19/04* (2013.01); *H04W 8/22* (2013.01); *G06F 21/6245* (2013.01); *H04W 4/14* (2013.01); *H04W 88/02* (2013.01)

(56) References Cited

U.S. PATENT DOCUMENTS

| | | | | |
|---|---|---|---|---|
| 2007/0106896 | A1* | 5/2007 | Sandberg .............. | H04L 9/0637 713/170 |
| 2007/0218925 | A1* | 9/2007 | Islam ...................... | H04W 4/12 455/466 |
| 2008/0252445 | A1* | 10/2008 | Kolen ................ | G08B 21/0446 340/539.16 |
| 2009/0280770 | A1* | 11/2009 | Mahendran ....... | H04L 29/12594 455/404.1 |
| 2010/0145695 | A1 | 6/2010 | Jung et al. | |
| 2010/0156630 | A1 | 6/2010 | Ainsbury | |
| 2012/0264409 | A1 | 10/2012 | Geyer et al. | |
| 2012/0282885 | A1* | 11/2012 | Hamed ................... | B60R 21/00 455/404.2 |
| 2015/0065081 | A1* | 3/2015 | Estes ..................... | H04W 4/021 455/404.2 |
| 2015/0245189 | A1 | 8/2015 | Nalluri et al. | |

FOREIGN PATENT DOCUMENTS

| | | | |
|---|---|---|---|
| JP | 2003218995 | A | 7/2003 |
| JP | 2004038881 | A | 2/2004 |
| JP | 2004343475 | A | 12/2004 |
| JP | 2005044060 | A | 2/2005 |
| JP | 2006-072665 | | 3/2006 |
| JP | 2006-333114 | | 12/2006 |
| JP | 2007-020971 | | 2/2007 |
| JP | 2007156967 | A | 6/2007 |
| JP | 2007-334452 | | 12/2007 |
| JP | 2007535861 | A | 12/2007 |
| JP | 2008217731 | A | 9/2008 |
| JP | 2009033313 | A | 2/2009 |
| JP | 2009169629 | A | 7/2009 |
| JP | 2009-301457 | | 12/2009 |
| JP | 2010-067169 | | 2/2010 |
| JP | 2011145853 | A | 7/2011 |
| JP | 2012-027893 | | 2/2012 |
| JP | 2013-196041 | | 9/2013 |
| KR | 10-2010-0055746 | | 5/2010 |
| WO | WO 2008/109477 | | 9/2005 |
| WO | WO 2008/018699 | | 2/2008 |
| WO | WO 2014/063121 | | 4/2014 |

OTHER PUBLICATIONS

Japanese Notification of Reasons for Refusal in Chinese Application No. 2017-110483 dated Aug. 30, 2018, including computer translation, 9 pages.

European Office Action in European Patent Application No. 13847172.7 dated Jan. 31, 2019, 5 pages.

Chinese Patent Office Second Office Action in Chinese Patent Application No. 201380048769.4 dated Feb. 8, 2018 (with summary of relevance), 4 pages.

Final Office Action in U.S. Appl. No. 14/127,426 dated Mar. 14, 2016.

Notice of Allowance in U.S. Appl. No. 14/127,426 dated Aug. 10, 2016.

Notice of Allowance in U.S. Appl. No. 14/127,426 dated Sep. 22, 2016.

USPTO Non-Final Office Action in U.S. Appl. No. 14/127,426 dated Aug. 14, 2015.

PCT International Search Report and Written Opinion received for PCT Patent Application No. PCT/US2013/065794, dated Mar. 20, 2014, 14 pages.

PCT International Preliminary Report on Patentability in PCT International Application Serial No. PCT/US2013/065794 dated Apr. 21, 2015, 8 pages.

EESR in European Patent Application No. 13847172.7 dated Feb. 24, 2016, 7 pages.

Japanese Patent Office Notice of Non-Final Reasons for Rejection in JP Patent Application No. 2015-538092 dated May 31, 2016, 7 pages.

Japanese Patent Office Notice of Non-Final Reasons for Rejection in JP Patent Application No. 2015-538092 dated Dec. 27, 2016, 5 pages.

Chinese Patent Notice of Granting Patent Right for Invention in Chinese Patent Application No. 2013-80048769.4 dated Oct. 9, 2018, 3 pages including translation.

* cited by examiner

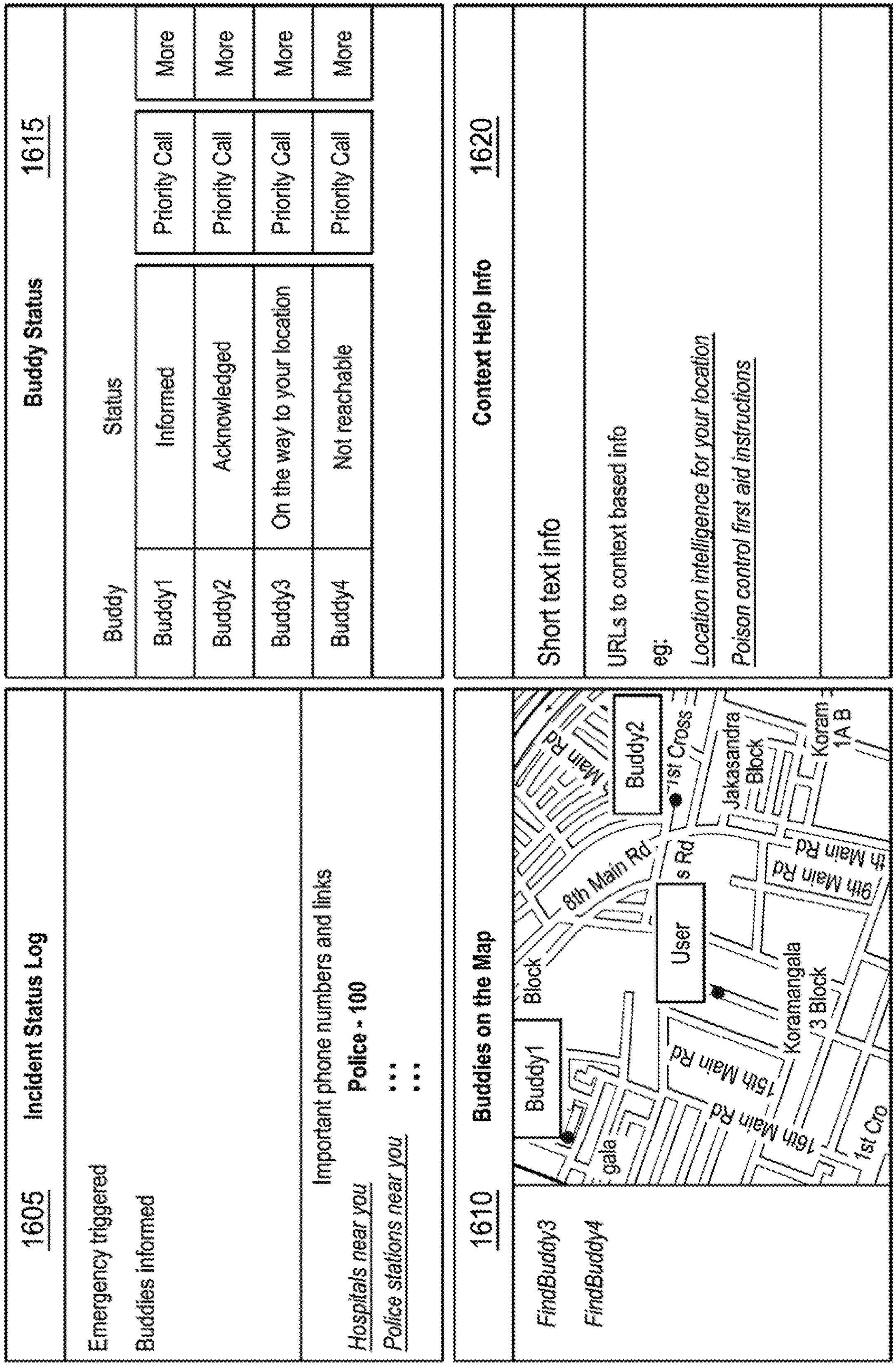

1605 Incident Status Log

Emergency triggered

Buddies informed

Important phone numbers and links

Police - 100

*Hospitals near you*  . . .

*Police stations near you*  . . .

1610 Buddies on the Map

*FindBuddy3*
*FindBuddy4*

1615 Buddy Status

| Buddy | Status | |
|---|---|---|
| Buddy1 | Informed | Priority Call / More |
| Buddy2 | Acknowledged | Priority Call / More |
| Buddy3 | On the way to your location | Priority Call / More |
| Buddy4 | Not reachable | Priority Call / More |

1620 Context Help Info

Short text info

URLs to context based info eg:

*Location intelligence for your location*

*Poison control first aid instructions*

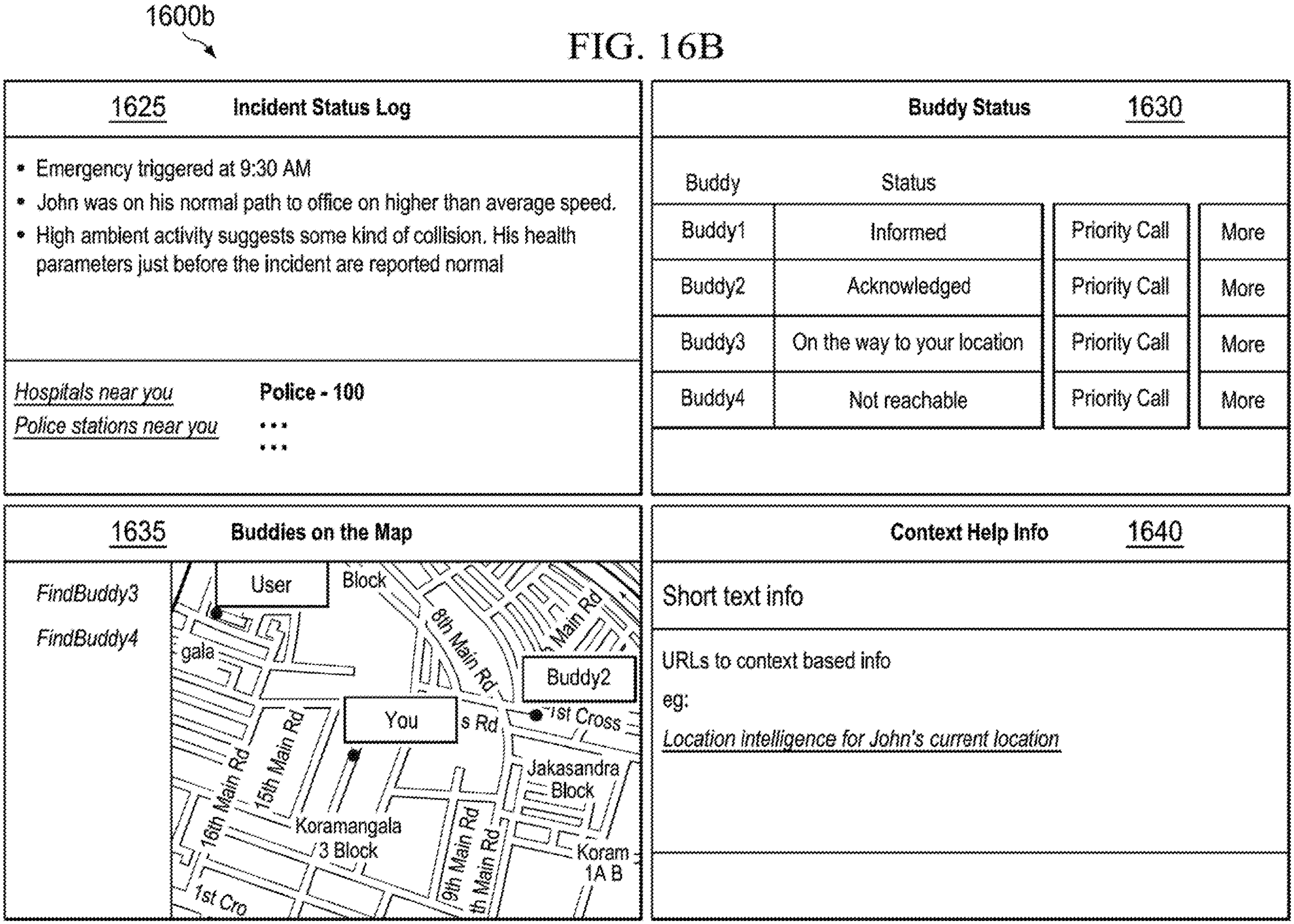

1625 Incident Status Log

- Emergency triggered at 9:30 AM
- John was on his normal path to office on higher than average speed.
- High ambient activity suggests some kind of collision. His health parameters just before the incident are reported normal

*Hospitals near you*     Police - 100
*Police stations near you*     ...
                          ...

Buddy Status          1630

| Buddy  | Status                     |                |
|--------|----------------------------|----------------|
| Buddy1 | Informed                   | Priority Call  More |
| Buddy2 | Acknowledged               | Priority Call  More |
| Buddy3 | On the way to your location| Priority Call  More |
| Buddy4 | Not reachable              | Priority Call  More |

1635 Buddies on the Map

*FindBuddy3*
*FindBuddy4*

1640 Context Help Info

Short text info

URLs to context based info
eg:
*Location intelligence for John's current location*

2200a

2200b

2200c

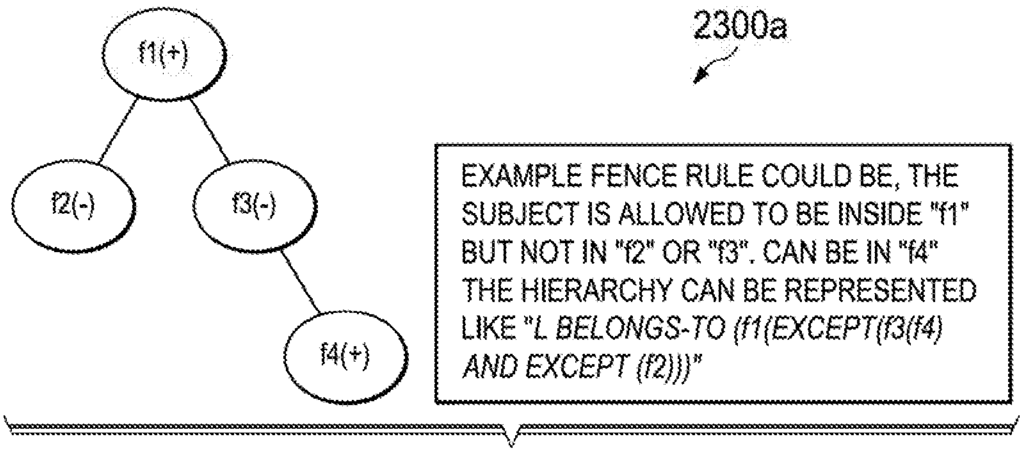

*geopoint* is a pair of latitude and longitude values that represents a point on earth
*Node* is a node in the hierarchical fence tree.
*Node.polygon* is list of *geopoint* that represents the fence polygon

```
FindPointInHierarchicalFenceTree ( GEOPOINT gp, NODE root) {
    //creates a list in reverse bredth-first order of traversal
    Bredthfirstlist = CreateBredthfirstTraversalList (root);
    FOR each element FenceNode in the Bredthfirstlist DO {
    IF (FenceNode.Exclusion == TRUE) THEN Continue;
    IF ((IsGeoPointinside(FenceNode.polygon, geopoint)) THEN
        return INSIDE;
    }
    return OUTSIDE;
}
```

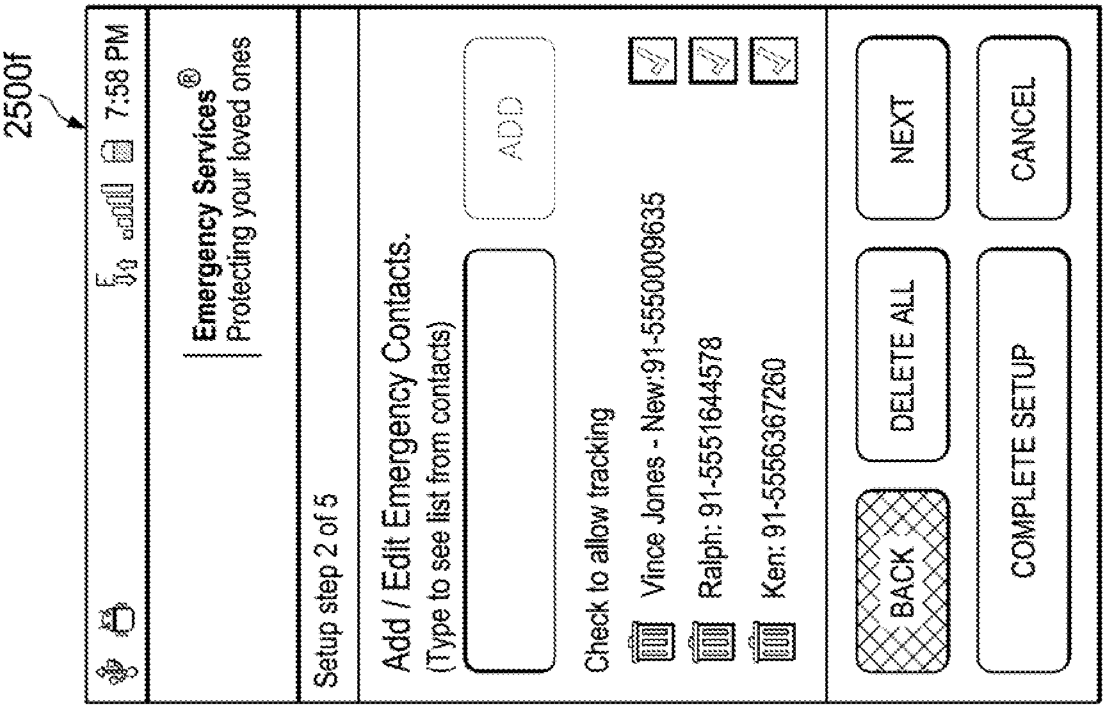

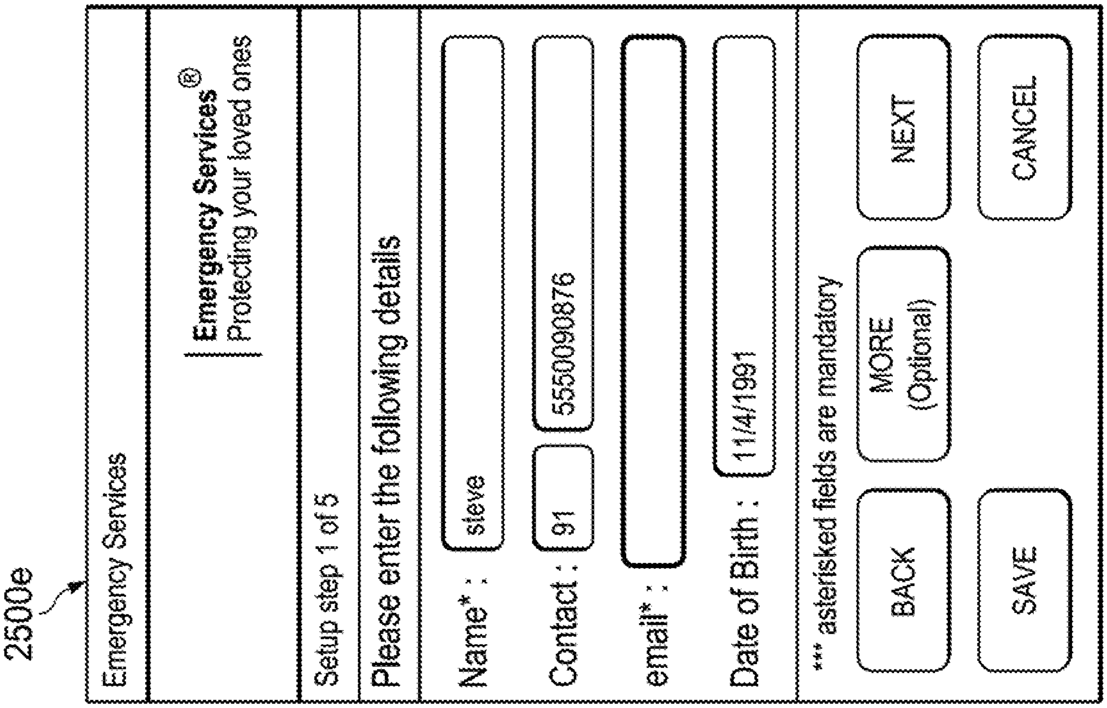

FIG. 25E

Emergency Services

Emergency Services®
Protecting your loved ones

Setup step 1 of 5

Please enter the following details

Name* : steve
Contact : 91  5550090876
email* :
Date of Birth : 11/4/1991

*** asterisked fields are mandatory

[ BACK ] [ MORE (Optional) ] [ NEXT ]
[ SAVE ] [ CANCEL ]

Emergency Services®
Protecting your loved ones

Setup step 2 of 5

Add / Edit Emergency Contacts.
(Type to see list from contacts)

[ ADD ]

Check to allow tracking

☐ Vince Jones - New: 91-5550009635
☐ Ralph: 91-5551644578
☐ Ken: 91-5556367260

[ BACK ] [ DELETE ALL ] [ NEXT ]
[ COMPLETE SETUP ] [ CANCEL ]

2500g

2500h

2500k

2500l

PERSONAL SAFETY AND EMERGENCY SERVICES

CROSS-REFERENCE TO RELATED APPLICATIONS

This application is a continuation of U.S. application Ser. No. 14/127,426 filed Dec. 18, 2013 and entitled PERSONAL SAFETY AND EMERGENCY SERVICES which is a national stage application under 35 U.S.C. § 371 of PCT International Application Serial No. PCT/US2013/065794, filed on Oct. 18, 2013 and entitled PERSONAL SAFETY AND EMERGENCY SERVICES, which application claims the benefit of priority to Indian Provisional Patent Application Serial No. 1217/KOL/2012 filed on Oct. 19, 2012 and entitled PERSONAL SAFETY AND EMERGENCY SERVICES. The disclosures of the prior applications are considered part of and are hereby incorporated by reference in their entirety in the disclosure of this application.

TECHNICAL FIELD

This disclosure relates in general to the field of mobile communications and, more particularly, to personal security using mobile communications.

BACKGROUND

Personal security and safety is a high priority to people, schools, and businesses. As life becomes more urban and complex, the propensity for events that threaten personal safety tends to increase. Further, a safety event that threatens one person in a densely populated area is likely to also pose a threat to other persons within that same area. While many countries and governments invest in and maintain adequate emergency response capabilities and infrastructure, people also rely on private individuals, including family, friends, and insurance companies during emergencies. Mobile phones and other communication devices have it made easier to contact others when assistance is desired. Whereas previous generations sought out a pay phone or other landline when help was needed, the ubiquity of cell phones in current society allow users to conveniently contact others using their own or a borrowed cell phone and allow such calls to be made at the scene of an accident or other safety event.

BRIEF DESCRIPTION OF THE DRAWINGS

FIGS. 16A-16B are screenshots of example user interfaces provided in connection with reporting a safety incident involving a user in accordance with some embodiments;

FIGS. 23A-23B are simplified representations of an algorithm for interpreting an example hierarchical geo-fence in accordance with some embodiments;

FIGS. 25A-25L are screenshots of example user interfaces of an example personal safety engine in accordance with some embodiments.

Like reference numbers and designations in the various drawings indicate like elements.

DETAILED DESCRIPTION

Figure 1:
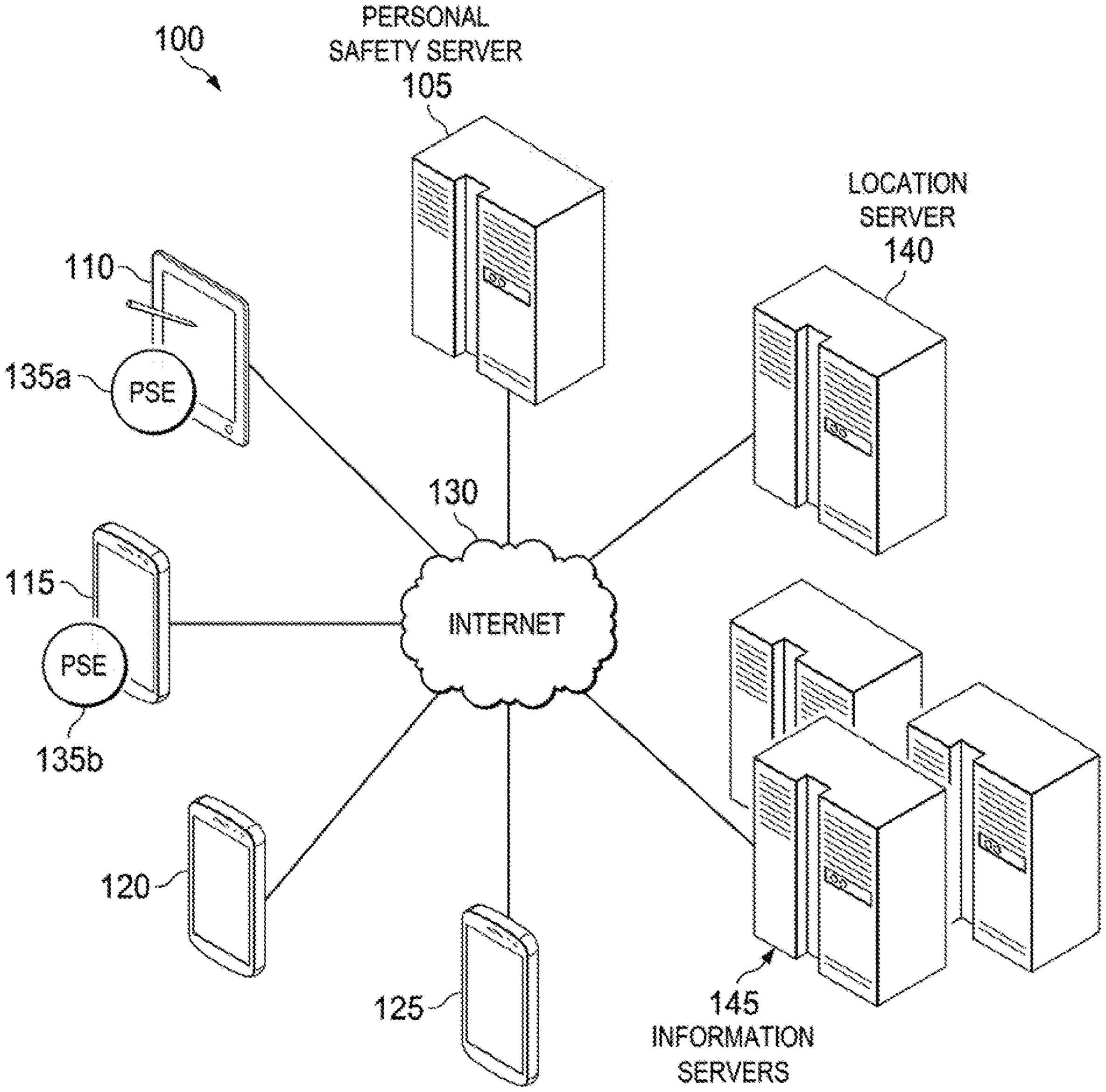
FIG. 1 is a simplified schematic diagram of an example system including client devices equipped with personal safety engines and a personal safety server for interacting with the personal security engines in accordance with one embodiment.

FIG. 1 illustrates an example system 100 including, in some implementations, an example personal safety server 105 that can provide personal safety services to one or more client devices 110, 115, 120, 125. In some implementations, client devices (e.g., 110, 115) can include a personal safety engine 135*a*, 135*b* capable of interfacing with personal safety server 105 over one or more networks (e.g., 130), among other examples. Other client devices (e.g., 120, 125) can communicate with one or more of personal safety server 105 as well as other client devices (e.g., 110, 115, 120, 125). In some implementations a personal safety engine (e.g., 135*a*, 135*b*) can collect information from hardware and software of a client device in connection with personal safety services served at least in part, by personal safety server 105. Personal safety server 105 can further interface with one or more outside servers and data repositories such as location server 140 and information servers 145 over one or more networks (e.g., 130). Services provided by other entities local to or remote from personal safety server 105, such as location server 140 and information servers 145, can further enhance the functionality and features of services hosted by personal safety server 105. For example, location server 140 can host global positioning and geolocation services for use in connection with other personal safety services hosted by personal safety server 105. Additional information, such as user profile information, safety information, location information, medical and crime prevention information, and device configuration information, among other information and services can be hosted by information servers (e.g., 145) and consumed by personal safety server 105, among other examples.

In general, "servers," "clients," "client devices," "computing devices," "network elements," "hosts," "system-type system entities," and "systems," including system devices in example computing environment 100 (e.g., 105, 110, 115, 120, 125, 140, 145, etc.), can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, client devices, network elements, systems, and computing devices can each include one or more processors, computer-readable memory, and one or more interfaces, among other features and hardware. Servers can include any suitable software component or module, or computing device(s) capable of hosting and/or serving software applications and services (e.g., personal safety systems, services and applications of server 105, etc.), including distributed, enterprise, or cloud-based software applications, data, and services. For instance, in some implementations, a personal safety server 105, location server 104, information servers 145, or other sub-systems of computing system 100 can be a cloud-implemented system configured to remotely host, serve, or otherwise manage data, software services and applications interfacing, coordinating with, dependent on, or used by other services and devices in system 100. In some instances, a server, system, subsystem, or computing device can be implemented as some combination of devices that can be hosted on a common computing system, server, server pool, or cloud computing environment and share computing resources, including shared memory, processors, and interfaces.

User, endpoint, or client computing devices (e.g., 110, 115, 120, 125, etc.) can include traditional and mobile computing devices, including personal computers, laptop computers, tablet computers, smartphones, personal digital assistants, feature phones, handheld video game consoles, desktop computers, internee-enabled televisions, set top bozes, and other devices designed to interface with human users and capable of communicating with other devices over one or more networks (e.g., 130). Computer-assisted, or "smart," appliances can include household and industrial devices and machines that include computer processors and are controlled, monitored, assisted, supplemented, or otherwise enhance the functionality of the devices by the computer processor, other hardware, and/or one or more software programs executed by the computer processor. Computer-assisted appliances can include a wide-variety of computer-assisted machines and products including refrigerators, washing machines, automobiles, HVAC systems, industrial machinery, ovens, security systems, and so on.

Attributes of user computing devices, computer-assisted appliances, servers, and computing devices generally, can vary widely from device to device, including the respective operating systems and collections of software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices.

Some system devices can further include at least one graphical display device and user interfaces, supported by computer processors of the system devices, that allow a user to view and interact with graphical user interfaces of applications and other programs provided in system 100, including user interfaces and graphical representations of programs interacting with applications hosted within the system devices as well as graphical user interfaces associated with personal safety engines 135*a*, 135*b*, etc. Moreover, while system devices may be described in terms of being used by one user, this disclosure contemplates that many users may use one computer or that one user may use multiple computers.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
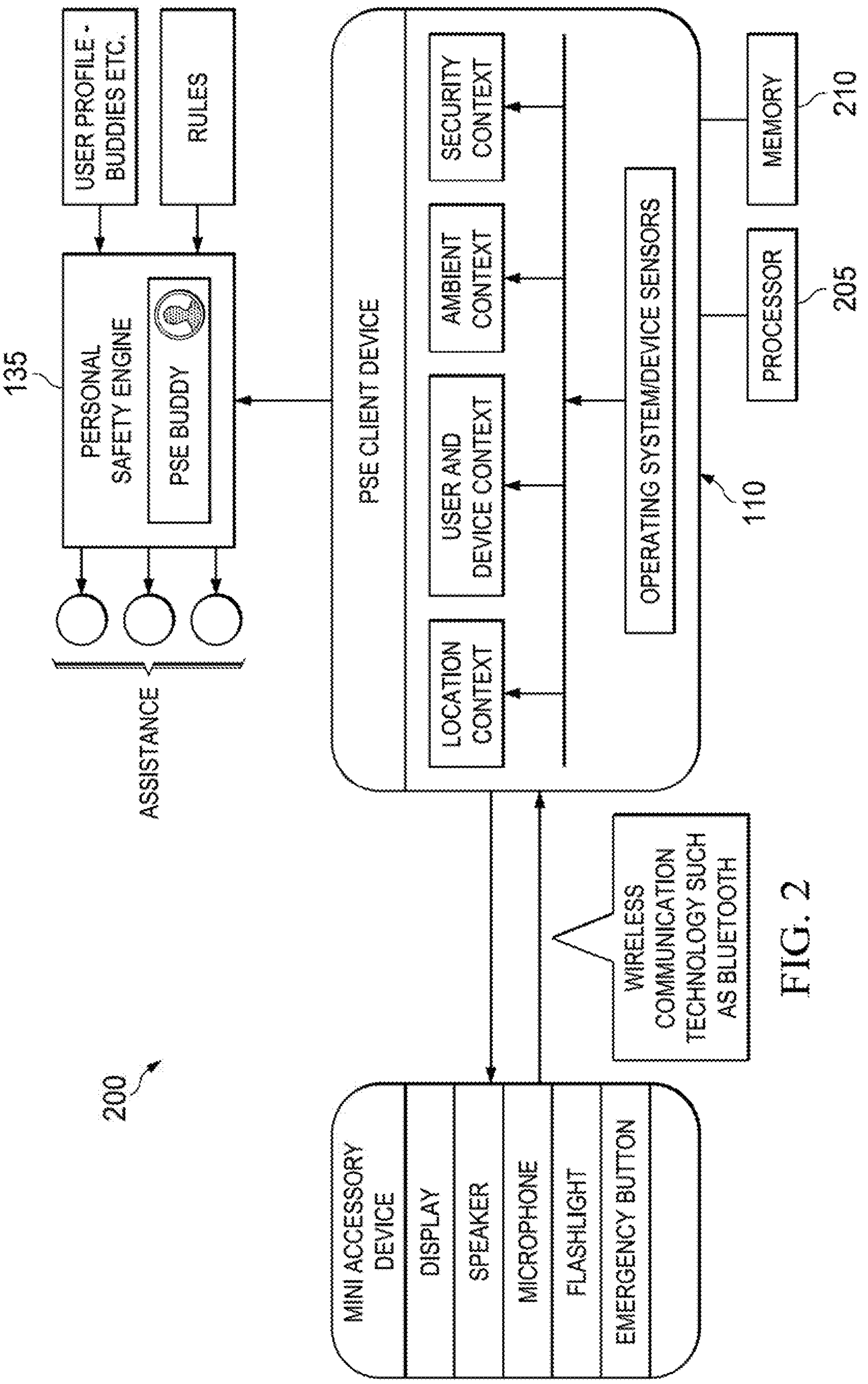
FIG. 2 is a simplified block diagram of an example client device equipped with a personal safety engine in accordance with one embodiment.

Turning now to the example of FIG. 2, simplified block diagram 200 is shown including a user client device 110 including a processor 205 and one or more memory elements 210 as well as other hardware- and/or software-implemented modules for use in connection with a personal safety engine (or "PSE") 135 provided at least in part through the client device 110. A variety of data and information can be obtained using functionality of the client device. Examples of such data and information can include, for instance, location or geo-positional information of the device, user profile information, device identification and configuration information, ambient context information, security context information, attributes and configuration information of the operating system of the client device, information collected from device sensors, among other information.

Sensors, peripheral devices, and other resources integrated with, connected to, or otherwise operable in connection with the client device, can be used to collect information that can provide context of the client device as well as the conditions of the client device's user. For instance, display devices, audio speakers, microphones, flashlights, emergency buttons, cameras, accelerometers, motion detectors, global positioning systems, and other devices, modules, and functionality of the client device (and its peripherals) can collect or generate data describing aspects of the location context, user and device context, ambient context (e.g., of the environment around the client device), and security context of the client device, among other examples. In some implementations, peripherals and other devices can supplement functionality and sensors integrated with the client device, and can connect to the client device via wireline or wireless communication connections (such as Bluetooth) among other examples.

Context information and data can be accessible to and otherwise used by the PSE to assist in the delivery and provision of personal safety services for a user at the client device. Further, user-provided context, user profile information, preference, and rules can be further used together with the context information to provide personal safety services through the client device. The PSE can communicate and function cooperatively with personal safety servers and other services over one of more networks using communication channels of the client device. Indeed, while in some examples, a PSE can be fully embodied within the client device, in other implementations, at least a portion of the functionality of the PSE can alternatively or additionally be provided, at least in part, by remote computing systems including systems such as a personal safety server (e.g., 105) operating in conjunction with the client-based functionality of the PSE, among other examples.

The PSE, in some implementations, can be used to help enhance personal safety and improve effectiveness of emergency assistance for a user of the client device. Functionality of modern mobile client devices, such as smartphones, tablet computers, mobile gaming platforms, and other personal devices can provide powerful, sensor-rich, "always-connected" functionality to effectively provide contextually relevant assistance in situations that impact personal safety. Further, the PSE can continually collect data about and adapt to (e.g., "learn") about the user and situations encountered by the user as the user carries the client device. Further, crowd-sourced intelligence can be leveraged by a PSE as the PSE can access context information and other intelligence provided through multiple sources including social networks, other client devices (e.g., also hosting PSEs), and systems managing networks to which the client device connects, among other examples.

Figure 3:
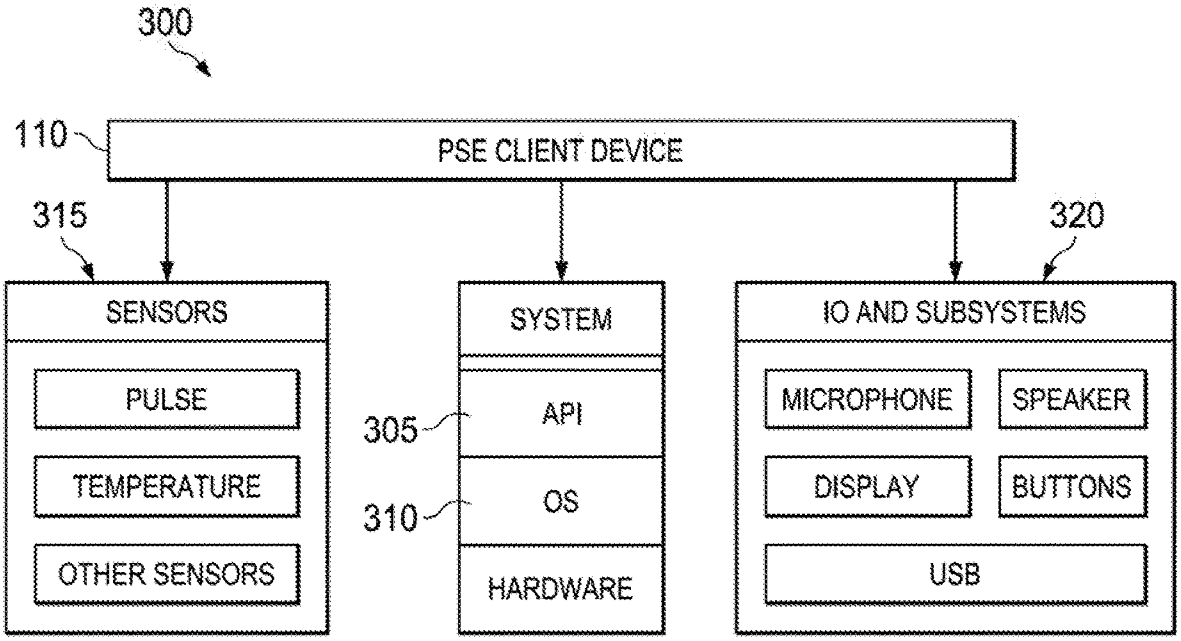
FIG. 3 is a simplified block diagram an example client device accessing sensors for use with a personal safety engine in accordance with one embodiment.

Turning now to FIG. 3, another simplified block diagram 300 is shown illustrating modules and functionality of a client device 110 supporting implementation of a PSE. The client device can include a system with one or more APIs 305 (e.g., for interfacing with outside services (e.g., personal safety server 105)), an operating system 310, other programs and elements, as well as one or more memory elements, one or more processors, and other features. The PSE client device can further include sensors 315 such as heart rate, temperature, voice, vibration, and other sensors that can be used to gather information about the characteristics (including physiological characteristics) regarding the well-being of the device's user. Additionally, the PSE client device can further include various input-output (I/O), user interface, and other subsystems 320 such as, for example, microphones, speakers, display devices, touchscreens, buttons, ports and interfaces (e.g. universal serial bus connectors (USB), among other examples, as well as other subsystems, peripherals, and devices for use in connection with the PSE client device. Such I/O functionality can be used to provide feedback to the user as well as collect information from the user at the PSE client device in connection with personal safety services provided at least in part to the PSE client device and the resident PSE. For instance, the PSE client device can be provided with a display device that can show status of the application and stream continuous updates relating to a triggered help/emergency event detected, for instance, using the PSE. The client device can have additional features, such as speakers, indicator lamps around the service trigger buttons, among other example features that can present information to the user of the client device.

Figure 4:
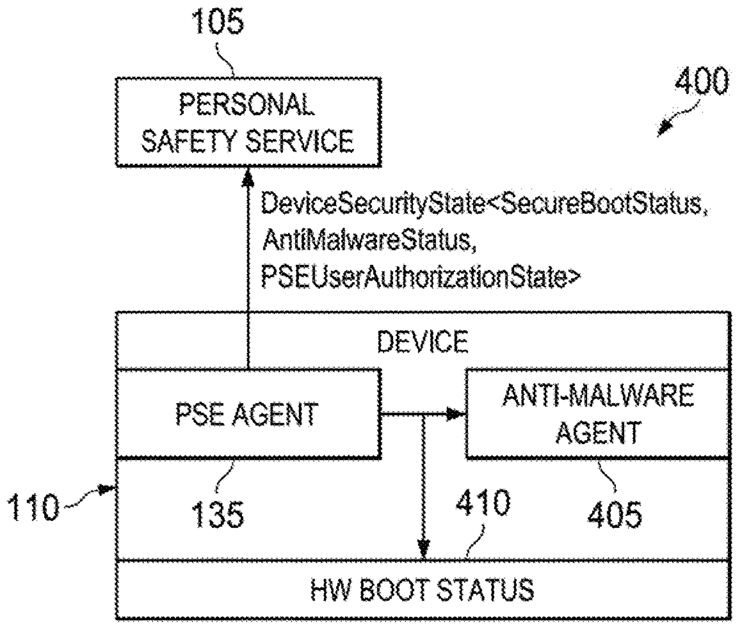
FIG. 4 is a simplified block diagram representing interactions between an example personal safety server and a client device hosting a personal safety engine in accordance with one embodiment.

Turning to FIG. 4, another simplified block diagram 400 is shown illustrating additional example functionality of a personal safety server and PSE client device according to some example implementations. Information collected by a client device in connection with security services provided for user can include information and attributes of the sensitive nature to the user. This information can be shared with a personal safety server 105. In some implementations, anti-malware (e.g., 405) and other security tools and services can be provided to scan and manage security on the PSE client device (e.g., 110). Maintaining security on the client device can assist, for instance, in ensuring that sensitive information collected and/or stored on the client device is not exploited. Additionally, in some implementations, a PSE's (e.g., 135) interaction with an outside personal security server (or other outside server) (e.g., 105) can be conditioned on the PSE client device maintaining a particular threshold level of security. For example, in one implementation, a hardware assisted mechanism (e.g., 410) can be provided to assess whether the user device is securely booted with known root of trust, components, and expected boot steps, among other examples. It can be determined that the PSE client device possesses a trustworthy security context when the PSE client device is securely booted, has anti-malware software running with no active malware, among other examples. Additionally security services provided by an outside server, such as a personal security server 105, can be further conditioned on permission being granted by a user of the client device, such that the user enables safety assistance functionality provided at least in part by the PSE 135 on the client device 110.

Figure 5:
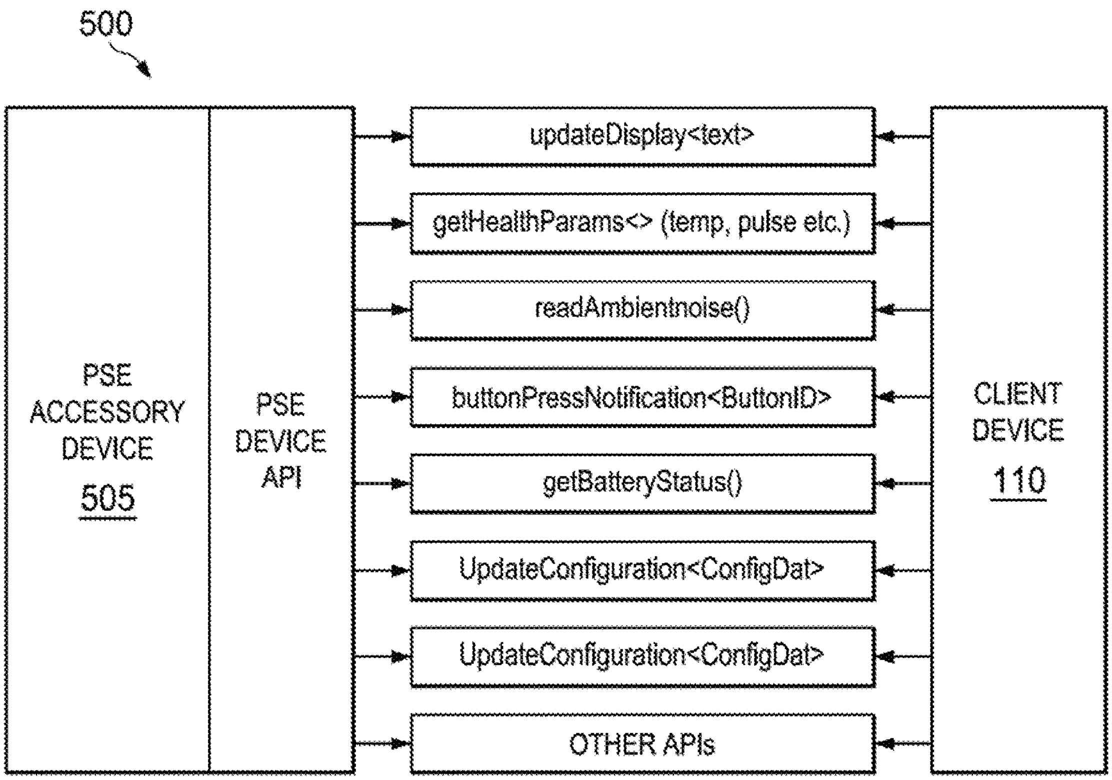
FIG. 5 is a simplified block diagram representing an application programming interface used by an example personal safety engine in accordance with one embodiment.

Turning to the example of FIG. 5, simplified block diagram 500 is shown illustrating APIs of an example implementation of a PSE and PSE client device 110 (or PSE accessory device 505). In some implementations, the PSE can be implemented as a software application downloaded and installed on a PSE client device. In one example, a PSE on a client device can be extended by means of plug-in functionalities that communicate to one or more accessory devices (e.g., using one or more available APIs). For example, a user, using one or more I/O capabilities of the PSE client device, can indicate to the PSE that personal safety of the user is at risk. The PSE, for instance, in conjunction with the personal security service provided by a remote personal security server, can initiate a response by one or more outside parties to the indicated safety risk or emergency. The progress of the initiated response can be tracked and presented on the PSE client device and/or one or more accessory devices. Accordingly, the progress of a triggered response to the situation can be updated on a display of the client device or accessory subsystem. For instance, messages can be displayed on a GUI of the client device indicating status of a response. For example, messages such as "Ambulance dispatched", "Kathy and Mike have been informed", "Emergency contacts know your location", "Kathy on the way", and other generated messages can be displayed to the user.

Identifying a safety risk or emergency condition can trigger a state in which the client device and/or one or more accessories (or peripheral devices), further attempt to collect additional data and information concerning the event using functionality of the one or more devices. Health parameters can be collected such as temperature, heart rate, ambient noise and other information. The health of the devices can themselves be checked while in an active emergency state, for instance, to ensure that services of the device(s) are not interrupted, disturbed, or interfered with during the indicated emergency event, among other examples. A variety of responses can be triggered based on a type of identified emergency event. For instance, APIs can be used to initiate the sounding of an alarm (e.g., using an accessory, such as a speaker of the client device) at a specified frequency, using a particular tone, at a particular volume, etc. Additionally, an event can cause messages to be pushed to one or more other devices associated with designated recipients, the messages in some cases including or generated from information gathered by the PSE client device and/or accessory devices. For instance, information such as including location information, user status information, context information, and other characteristics can be communicated to such parties as designated emergency contacts, healthcare providers, insurance providers, legal representation, emergency responders, law enforcement officials, among other examples.

In some example implementations, the PSE can actively track the user in response to an indicated or detected emergency event. Such tracking, in some implementations, can take place in a low power mode. Tracking can include, for instance, tracking of call logs, calendars, and periodic (configurable periodicity) location samples relating to the user. The user can further direct the PSE to continuously or more aggressively track user context. Tracking activities can include, for instance, tracking and correlating call logs, calendars, location, updating status on the accessory subsystem, recording the voice calls, monitoring the SMS and data traffic, among other examples. The tracking can further include tracking of inputs collected through corresponding optional accessory devices, such as devices providing functionality for pulse and temperature monitoring, among other examples.

Continuous tracking can be used to ensure safety of the user by checking adherence to learned patterns in the user context. For example, a user's daily route home, time it takes to drive home, typical traffic stops, speed on particular routes, people frequently called, typical activity level, typical heartbeat, travel and activity schedule, etc. can be determined for a particular user from data collected and generated from sensors of a client device (and accessory devices of the client device) associated with the particular user. Subsequent data collected using the client device of the particular user can be monitored for any unusual changes or deviations from data describing corresponding expected characteristics of the user and the user's behavior. Additionally, such continuous tracking can further include checking for adherence by the user to predefined geo-fences (including hierarchical geofences described in more detail hereafter), among other examples.

A user may utilize a PSE client device (and an instance of a PSE installed on the client device) in a variety of ways to indicate a need for help, emergency, or another event indicating a level of urgency. For instance, in one example, the user may indicate and trigger an emergency through an input comprising, for instance, a predefined sequence or pattern of button pushes, voice inputs, etc. entered using functionality of the client device. In another example, a graphical user interface can be provided on a display of the PSE client device with buttons or other UI controls that the user can manipulate to indicate an emergency condition, among many other potential examples.

Figure 6:
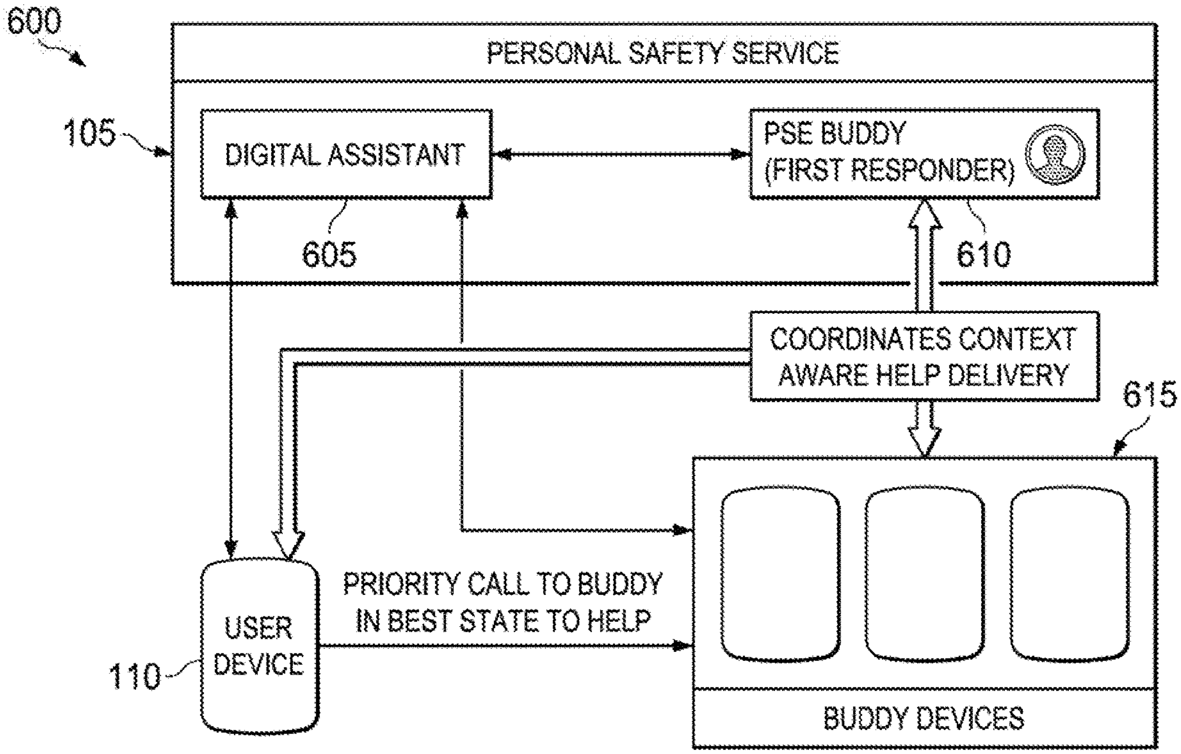
FIG. 6 is a simplified block diagram representing interactions between an example personal safety server, a client device hosting a personal safety engine, and one or more emergency contact devices in accordance with one embodiment.

Turning to the example of FIG. 6, a simplified block diagram 600 is shown illustrating example interactions between a client device 110 having an instance of a PSE and a personal security service 105. As noted above, the client device 110, using a PSE, can collect information including an automated or user-driven indication that an emergency event has taken place. This information can be communicated to a digital assistant module 605 of a personal security service (e.g., hosted by personal security server 105, etc.) and the personal security server 105 hosting the service can further cause or support a variety of actions to be initiated in response to data, conditions, or events identified in data received from the PSE client device (e.g., through the PSE). As an example, one or more emergency contacts (or "buddies") can be identified (e.g., as associated with a particular user) and can be caused to be notified of the emergency situation through personal safety service 105. As noted above, in some implementations, the personal security service 105 can further utilize data received from the client device 110 (e.g., in connection with an indicated or detected emergency event involving the device's user) to not only notify emergency contacts of the event but also provide context for the notification.

Emergency contacts can be pre-designated by a user associated with an instance of a PSE to identify those persons and parties the user wishes to contact in the event of particular types of emergency conditions. Such contacts may be those the user desires to first notify and have respond to a request for help. In some implementations, this can be accomplished by triggering a priority telephone call or other communication (facilitated at least in part using the PSE) with the contact. By collecting and communicating context information in connection with an event a notified emergency contact can have the requisite information to determine appropriate help and actions in response to the communicated situation, coordinate help to the user, as well as update the user on the progress of the response to the event. For example, in some implementations, a notified emergency contact can interface and communicate with (e.g., through one or more networks) the personal security service (such as the service utilized by PSE client device to trigger the emergency event communications) in response to being notified of a particular event involving a user to coordinate and facilitate communication of update messages to the user. The personal security service can route messages and updates from a notified emergency contact to the corresponding user's PSE device in connection with the particular event.

In some implementations, a PSE on a client device can include modules and functionality for designating and alerting specified emergency contacts that help is requested or needed. As an example, alerts and messages sent to an emergency contact's device can include SMS messages, push notifications, priority calls, peer to peer connections, video calls, among other examples. Example PSEs can further include functionality capable of identifying the user's location and other information relevant to the emergency condition and communicating this information as context data to the emergency contacts. Additionally, in some implementations, an example PSE can include functionality for receiving and presenting acknowledgment and update messages originating from notified emergency contacts (or other parties) that a request for help has been communicated, received, and/or responded to. Further, in some instances, designated emergency contacts may be unreachable or nonresponsive. Accordingly, in some implementations of an example PSE, the PSE may include functionality for identifying and notifying secondary or other contacts of the event, for instance, in lieu of or in response to a failure to reach a primary emergency contact, among other examples. In other instances, rather than automatically defaulting to a secondary contact when a primary emergency contact cannot be successfully reached, an example PSE, in response to a failed attempt to contact an emergency contact using a first communication technique or mechanism, can reattempt the contact using an alternate communication technique.

Figure 7:
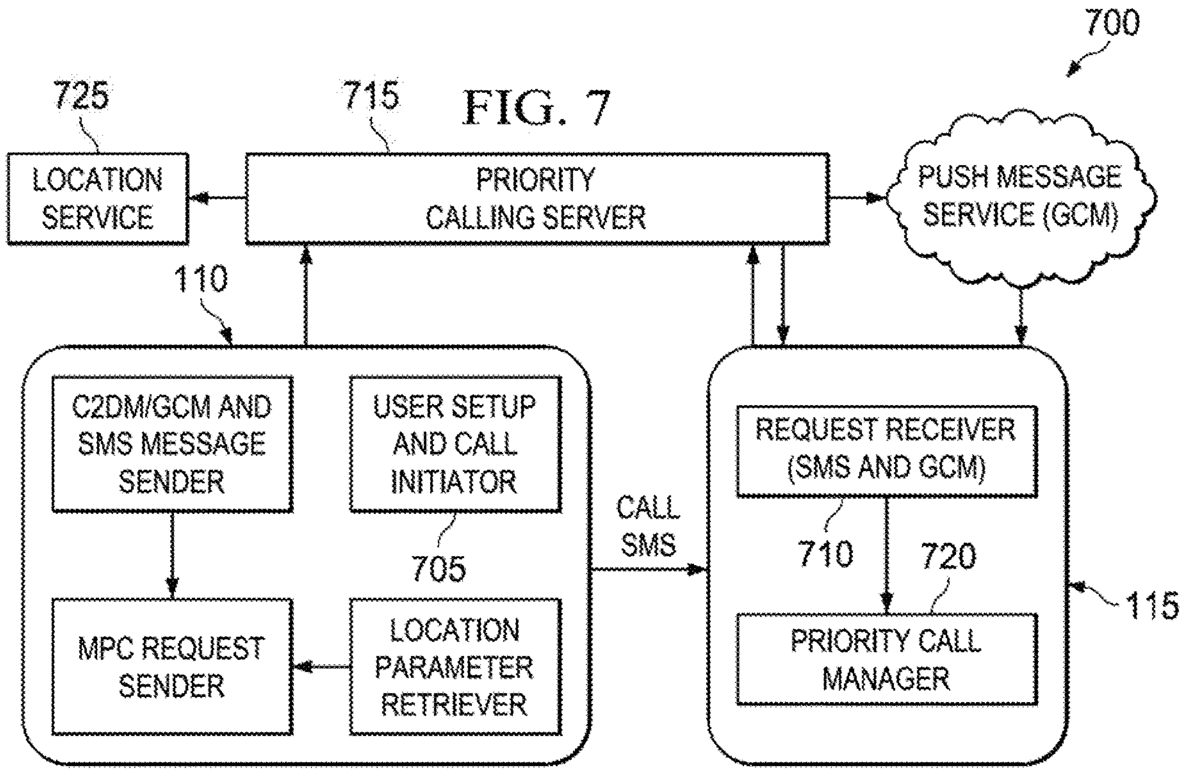
FIG. 7 is a simplified block diagram representing a priority call initiated by a client device using a priority calling service in accordance with one embodiment.

As noted above, in some implementations, a priority calling service may be provided in connection with a PSE and/or a personal security service. Turning now to the example illustrated in the simplified block diagram 700 of FIG. 7, an example system is shown providing priority calling functionality, for instance, through a PSE installed on one or more client devices 110, 115 and in connection with an example personal security server 105 capable of facilitating, at least in part, priority calling between the client devices 110, 115. In one example implementation, a first client device 110 can include a C2DM or GCM message utility and/or an SMS messaging utility in addition to telephonic capabilities, such as cellular or voice over IP telephony functionality. The first client device 110 can initiate a priority call intended for the second client device 115 (or a user of the second client device 115). In some instances, the priority call can be automatically initiated in response to an emergency event detected or specified at the first client device (e.g., using an example PSE). In some implementations, a priority call can include a text-based message sent or communicated in parallel with a telephonic call to another device. The text-based message can provide context for the received telephonic call in some implementations and indicate to the recipient of the telephonic call the importance or urgent nature of the priority call. Further, in some implementations, a priority call text-based message can include context data such as that described above, such as location information collected for instance by an example geolocation subsystem operating on the first client device (e.g., in connection with an example PSE), among other examples.

In some implementations, both the first client device 110 and second client device 115 can include a priority calling application or applet installed on the client device. In some examples, priority calling functionality can be included in instances of an example PSE installed on each client device. The presence of modules, applets, or PSEs installed on both the calling 110 and recipient 115 devices can allow for more robust functionality during a priority call. For example, the text-based messages sent in parallel with the telephonic priority call can utilize C2DM, GCM, or other application-to-application messaging formats to provide richer and more robust messaging in parallel with the telephonic call. In such instances, a call initiator module 705 (e.g., of an example PSE) can contact a supporting priority calling server 715 (e.g., of personal security server 105) in response to an attempted priority call to initiate the generation and communication of a GCM or other message (e.g., using a push message service). The pushed message can include or be generated from data retrieved, generated, and otherwise communicated by the calling device 110 from the calling device 110 to the recipient device 115 in parallel with the telephonic call (e.g., over a telephonic communication network) to facilitate a priority call.

Additionally, priority calling functionality on a client device (e.g., in connection with an example PSE on the client device 110) can include modules and functionality for automating the identification or detection of intended recipients, such as emergency contacts, to be contacted in response to a detected or indicated emergency event at the client device 110. The recipient device (e.g., 115) can further include functionality for receiving both the telephonic call initiated by a caller's priority call as well as the text-based messaging transmitted or otherwise communicated in parallel with the telephonic call. For instance, a recipient client device (e.g., 115) can include hardware and software functionality (e.g., 710) for receiving text-based messages including, for example, SMS and GCM messages. Additionally, as noted above, a recipient client device can further include a priority call manager, client, or other application or module (e.g., 720) (e.g., an example PSE) for handling received priority calls.

In other instances, a recipient client device (e.g., 115) may not include specialized functionality for receiving priority calls but may nonetheless include functionality capable of handling, rendering, and presenting both telephonic and text-based messaging received in a priority call (e.g., from client device 110). For example, an example recipient client device may not have an instance of a priority call manager or PSE but may nonetheless include functionality for handling SMS and other text-based messages as well as telephonic communications. The capabilities of a recipient client device can be identified, for instance, by a priority calling server (e.g., 105) to identify a compatible format for text-based messages to be communicated to the respective recipient client device. In other instances, redundant text-based messages can be communicated in a priority call to facilitate both GSM-enabled recipient client devices and/or SMS-enabled recipient client devices, among other examples. Further, priority calling server 715, such as a personal security server 105, may further operate to facilitate priority calling by gathering context information from sources outside of the participating client devices. For instance, priority calling server may interface with a location service 725, user profile directories, or other services and data sources to retrieve and include corresponding data and intelligence in context data communicated, for instance, in text-based messaging transmitted in parallel with telephonic communications of a priority call, among other examples.

Figure 8A:
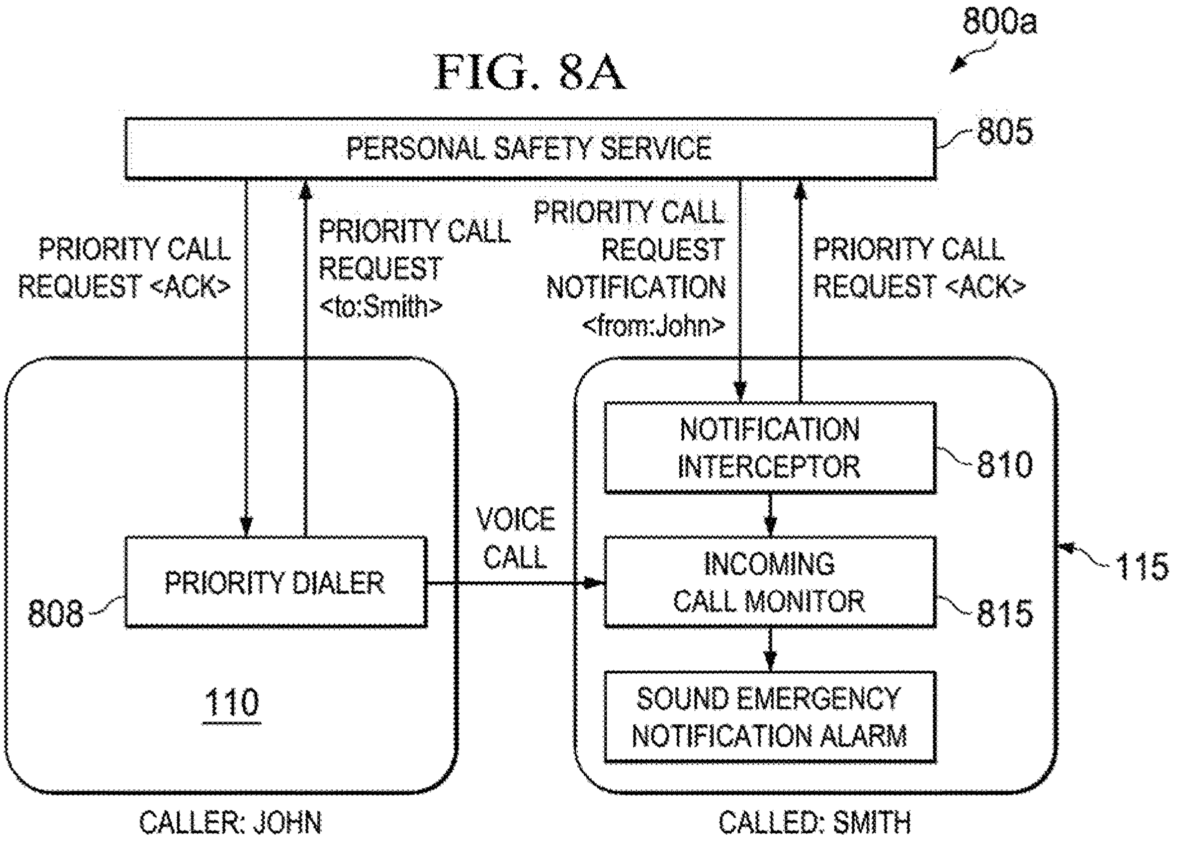
FIGS. 8A-8B are simplified block diagram representing interactions between client devices and a personal safety service in connection with example priority calls in accordance with some embodiments.

Turning now to FIG. 8A, a simplified block diagram 800*a* is shown illustrating an example priority call involving a caller John (and associated first client device 110) and a recipient Smith (using a second client device 115). In one example, a user, John, can initiate a priority call, for instance, in response to an emergency situation or other event. In one example implementation, a list of contacts, such as a list of pre-designated emergency contacts or auto configured list based on past user calling history, etc., can be displayed on the first client device allowing the user to then select one of the contacts and initiate a priority call by using a UI control of the first client device.

The example priority call illustrated in FIG. 8A includes a voice call transmitted, for instance, over a cellular, IP, or POTS telephone network to the second client device 115 of Smith. In parallel, a priority call request is transmitted from the first client device 110 to a PSE support service 805 (e.g., hosted by a personal security server or priority calling server). For example, a priority dialer module 808 with functionality for initiating and managing priority calls originating from the first client device (e.g., through PSE install on the first client device) can initiate the priority call, including both the voice portion of the priority call and the text-based portion of the priority call.

The PSE service 805 can support priority calls and can identify from the priority call request that Smith, and an associated client device (e.g., 115), are the intended recipients of the priority call. The PSE service 805 can route a priority call request notification from John to Smith along with, in some instances, context data collected from the first client device 110, such as context data collected in connection with an emergency condition prompting the priority call. An example notification interceptor 810 of the second client device (e.g., of a PSE installed on the second client device) can receive the priority call request notification and forward the notification to an incoming call monitor 815 that includes functionality for associating the received priority call request notification with the included text-based priority call messaging such that presentation of the text messaging is co-presented with the voice portion of the priority call. Additionally, in some instances, a PSE or other component on the second client device can include functionality for providing the user Smith with a specialized notification corresponding to received priority calls, such as a special ring, display, UI, etc. The priority call indicators can be independent of the standard device configuration, and can be user-configurable in some examples.

In classic telephony, calls are not tagged as a special call. Priority calls allow the receiver to know that an incoming call is tagged as a priority call, providing the recipient user with a special notification that the incoming call is likely a priority and should be answered, including in circumstances when phone calls would ordinarily not be immediately answered (e.g., when the recipient is busy or on another call). In some implementations, when both the calling client device and recipient client device have installed PSEs, a priority call can include a handshake sequence to alert the recipient device of the incoming priority call and thereby prompt the recipient device to process the incoming call accordingly. Once the hand shake is completed, the notification interceptor 810, for instance, on the recipient device can be alerted on an incoming priority call and monitor its incoming calls for the corresponding priority call. In some instances, the recipient device can include functionality (e.g., in notification interceptor 810) to modify the recipient device configuration to enable the recipient device to receive the priority call (e.g., despite the device otherwise not being in a position to handle an incoming call, for instance, when the device is on silent, being used in another call, or in another mode, among other examples).

Figure 8B:
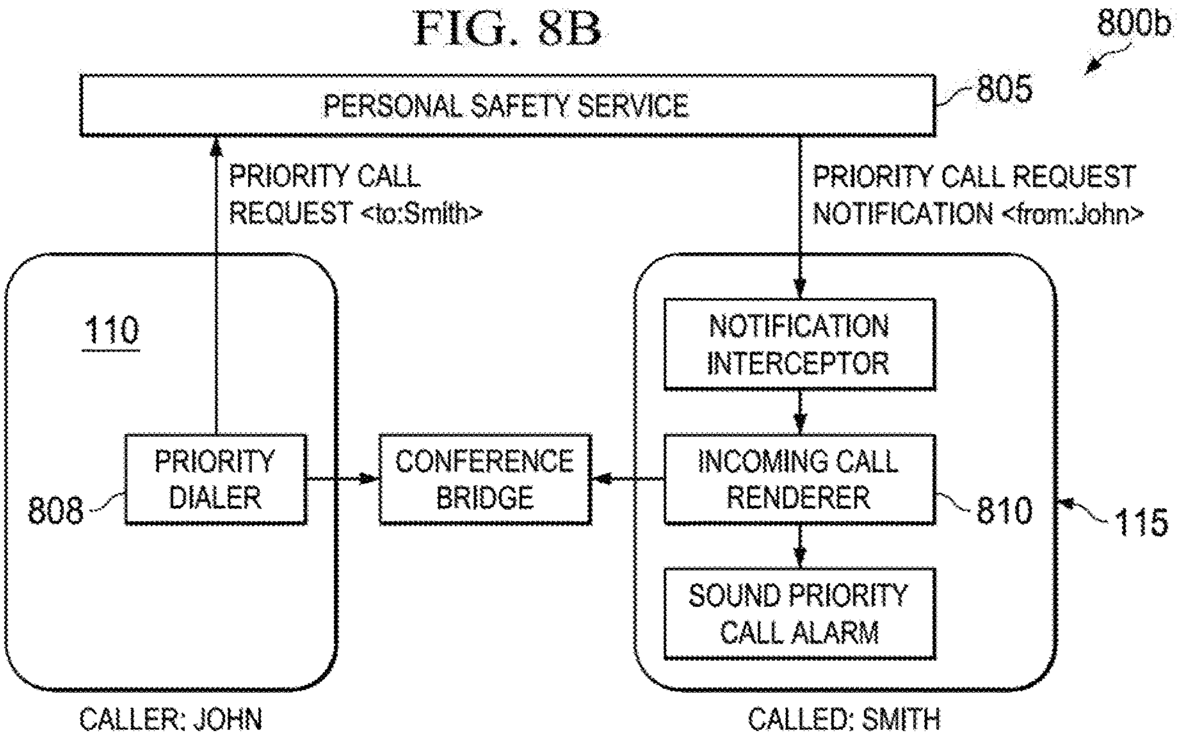

Turning to the example of FIG. 8B, illustrated by the simplified block diagram 800*b*, in some implementations, in addition to or in lieu of a traditional telephonic communication session between the calling and receiving client devices, a conference bridge such as a voice, multimedia, video, or conference call may be initiated, for instance, in response to the receiving client device accepting the priority call, among other examples. In some implementations, a conference bridge may be implemented through the PSE service 805 or implemented on another provider (and initiated by the PSE service 805). The conference bridge may in some instances, then allow the calling and receiving parties to exchange important information relating, for instance, to an emergency situation experienced by the calling user, such as photographs, video, context data, or other data describing the situation.

Figure 9A:
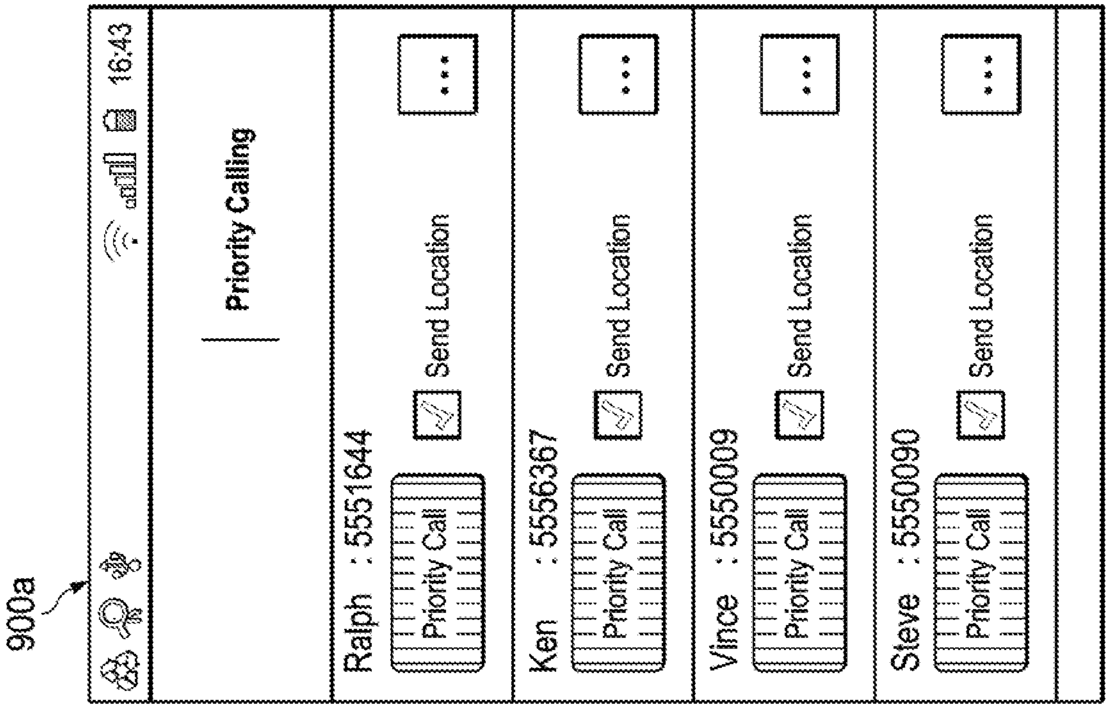
FIGS. 9A-9B are screenshots of example user interfaces for use in a priority call in accordance with some embodiments.
Figure 9B:
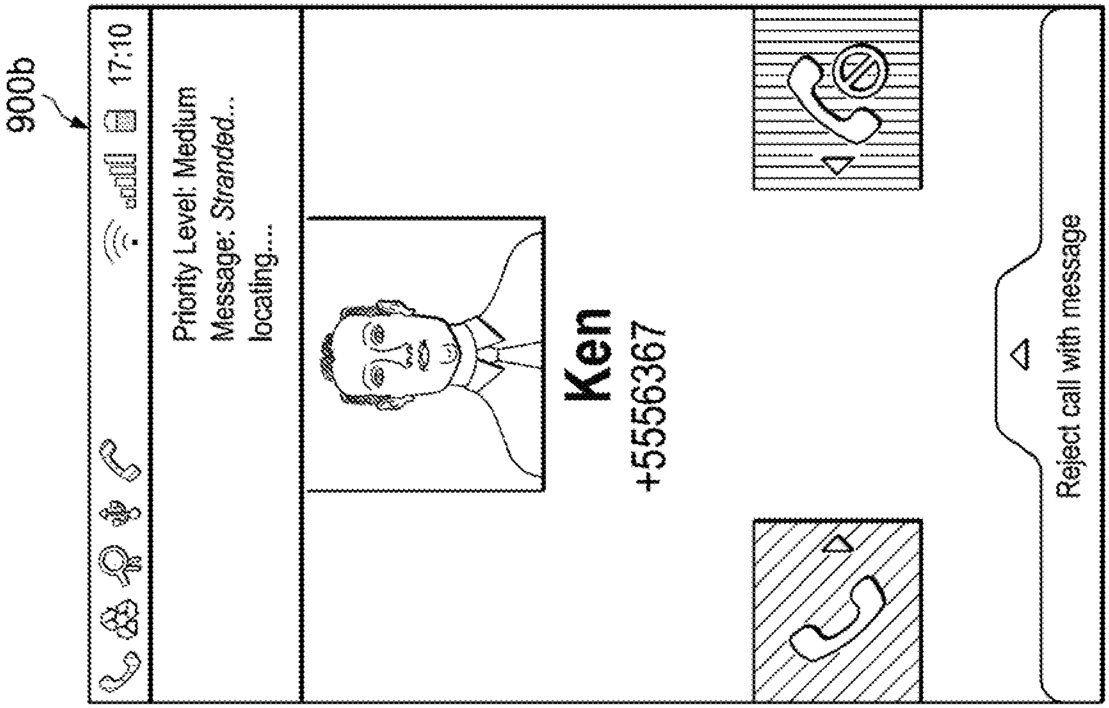

Turning to the example screenshots 900*a-b* illustrated in FIGS. 9A-9B, a variety of graphical user interfaces can be presented to users in connection with a priority call. For instance, in FIG. 9A, example screenshot 900*a* is shown of an example user interface that could be displayed to a user attempting to initiate a priority call. For instance, a contact list, such as a specialized contact list, favorites list, or other listing can be presented to a user along with an option to make the initiated call a priority call. Additionally, an option can be provided through controls on the user interface to dictate whether and what type of context data should be sent in connection with an initiated priority call. Further, in some implementations, the user may be permitted to initiate multiple priority calls in parallel based, for instance, on the selection of multiple recipients for the priority call, among other examples.

Turning to the example of FIG. 9B, another example user interface is shown for a recipient client device receiving a priority call from another user. As shown in this particular example, a message can be presented along with a prompt 905 that a voice call is being received that communicates certain text-based or graphical information to the user/recipient that the incoming call is a priority call. Additionally, as noted above, in some implementations, specialized ring tones, graphical presentations, and other alerts may also be concurrently presented indicating to the recipient that the call is a priority call. In some implementations, such as in the present example, priority call messaging may communicate such information as a priority level of the priority call. Indeed, in some implementations, multiple different priority levels can be designated, either manually by the caller or automatically by the client device or handling service (e.g., in response to context data or other information collected or retrieved by the client device and indicating a heightened priority for the priority call, among other examples), and the designated priority level can be presented along with the prompt at the recipient device. Further, priority call messaging can indicate the reason for the priority call as well as other information such as the location or status of the calling user, among other examples.

Figure 10:
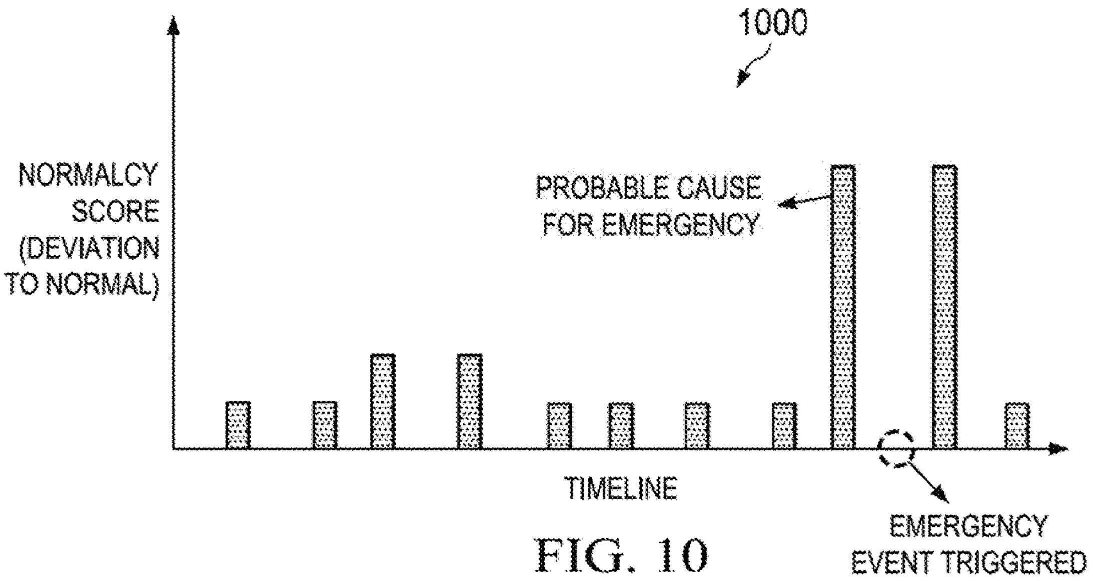
FIG. 10 is a simplified chart representing the triggering of an emergency event based on a detected deviation from normal characteristics in accordance with one embodiment.

Turning now to the example of FIG. 10, as noted above, when a personal safety event happens, in some implementations, the system can compare the current context parameters of a user such as location, path taken, recent actions using the client device, etc. against "normal behavior" of the user derived, for example, from historical context data collected and maintained by the client device and/or personal security server, to assess whether abnormalities exist between the collected current context parameters and the derived normal, or expected, behavior. The context data at the time of or in the vicinity of an emergency or other event can be collected and a link can be established or determined between the collected context data and an actual emergency event or some other out of the ordinary event affecting the user of the client device. The chart 1000 of FIG. 10 represents results of assessments by, for instance, a PSE or PSE service resident on or remote from the client device, indicating whether recent context data collected from or in connection with the PSE indicates a deviation from expected or typical events of the user. As shown in the current example, a deviation from normal beyond a particular threshold can trigger an emergency event or other alert at the client device. Such detected events can then launch various actions, including automated functionality through the PSE, to attempt to remediate or seek assistance for the user in connection with the detected event.

Figure 11:
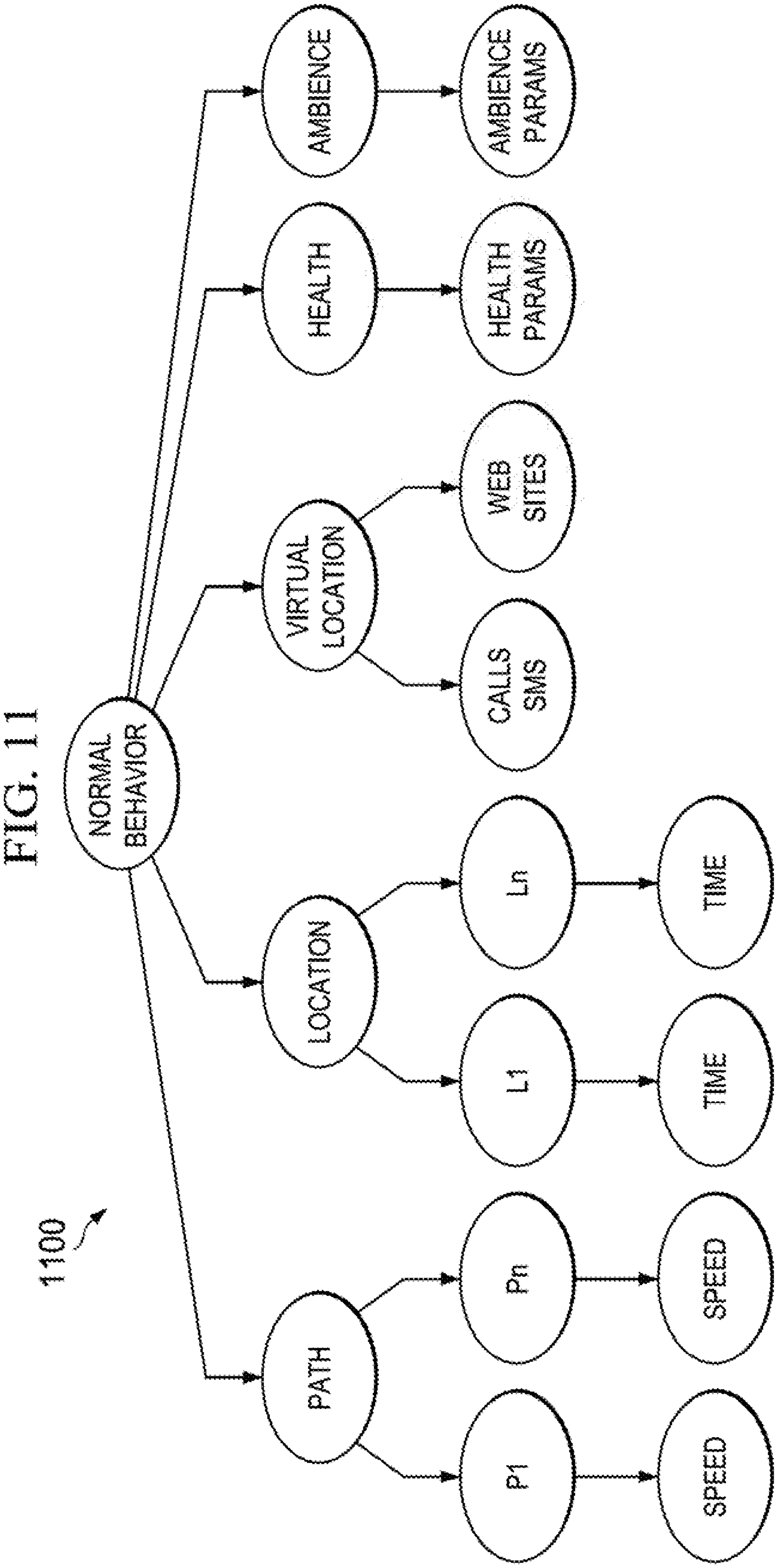
FIG. 11 is a simplified graph representing normal behavior characteristics determined for a particular user in accordance with one embodiment.

The chart 1100 of FIG. 11 illustrates a representation of a potential algorithm that can be used to assess and determine deviations from, updates to, or an agreement with derived normal behavior or conditions based on context data collected at the client device. In this particular example, a standard, typical, or expected behavior can be based on a variety of data points collected, for instance, from sensors and functionality of the client device hosting a PSE. Such data points can include, for example, typical routes followed by a user determined, for instance, from timing information and gee-positional tracking at the client device, among other examples. Location of the user can also be assessed, for instance, such as a user's typical stopping points (e.g., their residence, school location, work location, shopping location, etc.) or presence within particular gee-fences or other areas. Virtual locations, such as users browsing, texting, and calling behavior and history can be assessed. Implementations allowing for the collection of physiological data such as health parameters of the user, can also be assessed and considered. Additionally, ambient context information, such as temperature, lighting, surrounding noise level, and other environmental characteristics capable of being captured through functionality of the client device can also be collected and assessed. The combination of data points and factors can be correlated to determine expected behaviors or conditions. Further, collection of data deviating from one or more of the standard or expected baselines of behavior or contexts can cause, when in excess of particular thresholds (or combination with deviations involving other particular types of characteristics), a determination of a possible problem, emergency event, or other issue, among other examples.

To illustrate, in one example, an expected behavior profile can be represented, in some examples, as follows:

<Normal Behavior>
<Location>
<Location List>
<Location-1>
<Cluster of GeoPints>—Location is small area determined based on cluster of geo-points.
<Timeranges>
<Range-1: Dayofweek:Timerange> eg: Daily:6 AM to 8 AM, 1 Weekdays: 9 AM to 8 PM
<Range-2: Date:Timerange> eg: On Nov. 12, 2011: 9 AM to 6 PM etc.
<Path>—about frequently taken paths
<Path1>
<From: Location-1 to Location-2>
<PrimaryPath: Directions on Map>—Most frequently taken path
<Speed:Average Speed, Max Speed, Min Speed>
<Path-deviation1: Directions on Map: weekly/monthly frequency>
<Speed:Average Speed, Max Speed, Min Speed>
<Path-deviation1: Directions on Map: weekly/monthly frequency>
<Speed:Average Speed, Max Speed, Min Speed>
<Virtual Loctations>
<Communication Log>
<Calls: Frequently called numbers, Frequently texted numbers>
<Websites>
<Visits: Frequently visited domains/sites>
<Health>
<Sensor Data>
<Temp: Temperature sampling for past 1 hour/day/month>
<Pulse: Temperature sampling for past 1 hour/day/month>
<Ambience>
<Sensor Data>
<AccelorometerData: past 1 hour samples>
<AmbientNoice: past 1 hour samples>
<Othersensor: past 1 hour samples>

Figure 12:
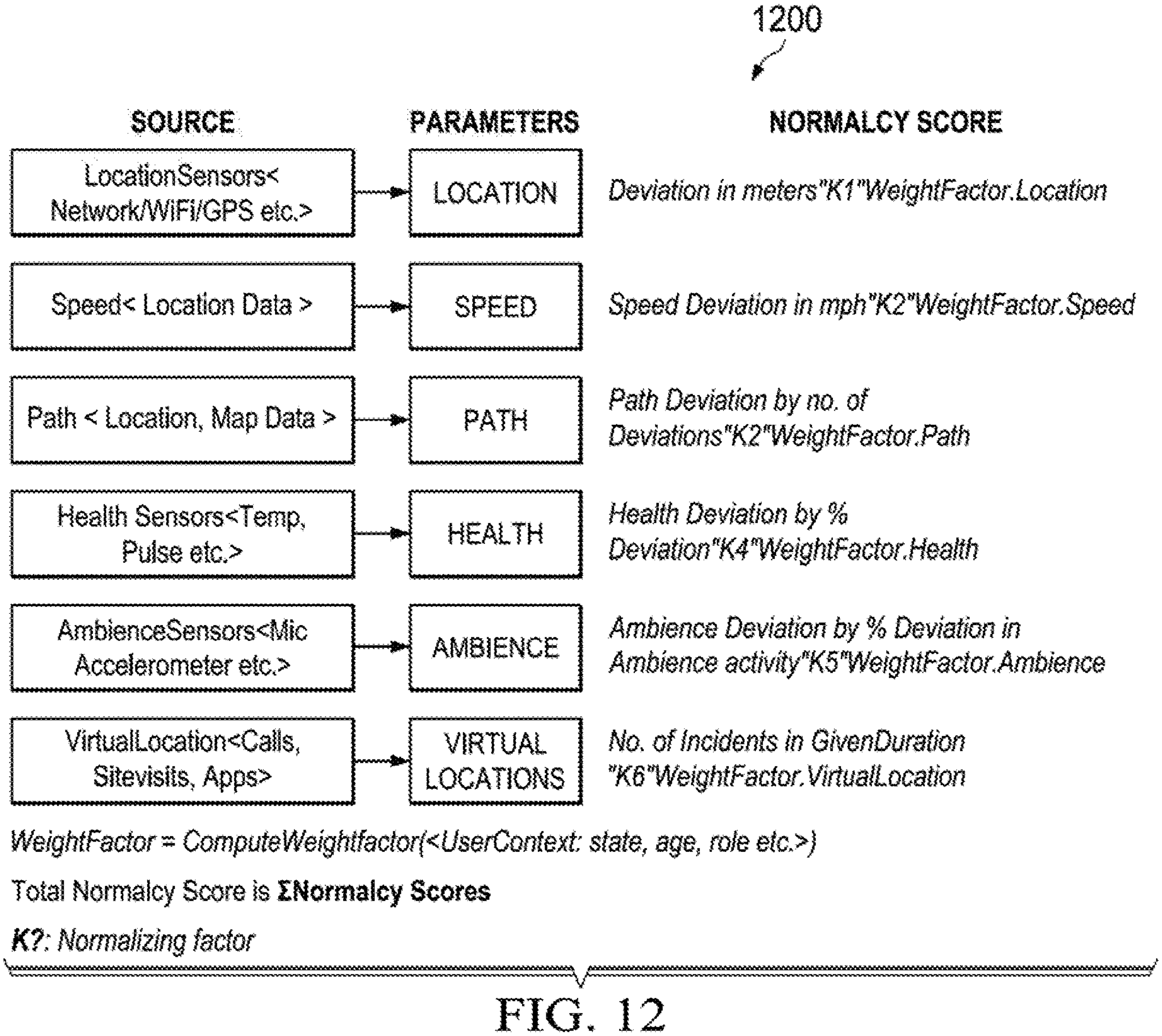
FIG. 12 is a simplified block diagram representing use of context information collected at a client device for calculating a normalcy score for a user in accordance with one embodiment.

FIG. 12 includes an example chart 1200 illustrating an example algorithm for calculating a normalcy score as well as a numerical value for deviations from expected baseline behavior for a user of a particular client device. Each parameter of the normal behavior baseline can have a weight that is determined by the user context and security context. This can allow assigning higher or lower weight to a deviation from normal behavior based on the user profile. For instance, context information for virtual locations, such as calls, SMS messaging, social networking, and the like, could be weighted higher for a child or teenager than for adult, based on associated user profile information for the respective child, teenager, and adult users. In another example, an adult salesman who is generally on the road may, based on historical data collected from the salesman's device (or from other users of a similar demographic or profile), could have low weighting for deviations from a normal location for the user (e.g., based on the user's travel schedule causing frequent deviations with regard to location of the user, etc.). Accordingly, the normalcy score for each parameter can be a product of deviation, a normalizing factor, and the weight, among other examples. In one implementation, the final normalcy score can include the sum of all normalcy scores, with higher value scores indicating a more likely deviation from a normal behavioral baseline.

As an example, in FIG. 12, chart 1200 summarizes calculation of an example normalcy score. Location sensors of a client device, such as network, Wi-Fi, and GPS information, can be used to derive location parameters which are weighted by a particular corresponding weight factor. Further, speed information of the user can be derived from a speed sensor on the client device. Path information can similarly be collected and analyzed, for instance, from location and map data, and path parameters can also be assessed according to particular defined deviation tolerances, weight factors, and other parameters whose values, in some instances, can be derived manually, by a user, as well as or alternatively, automatically, for instance, based on historical trends determined for the user. Additionally, ambient conditions can be captured using other client device sensors to derive ambience parameters, virtual location sources can be used to derive virtual location parameters, and other sources and sensors can be used to derive other context parameters with each of the parameters potentially having varying deviation tolerances, weight factors, and other factors applied to derive respective parameter normalcy scores that can be summed to generate a total normalcy score for the user, among other examples.

Figure 13:
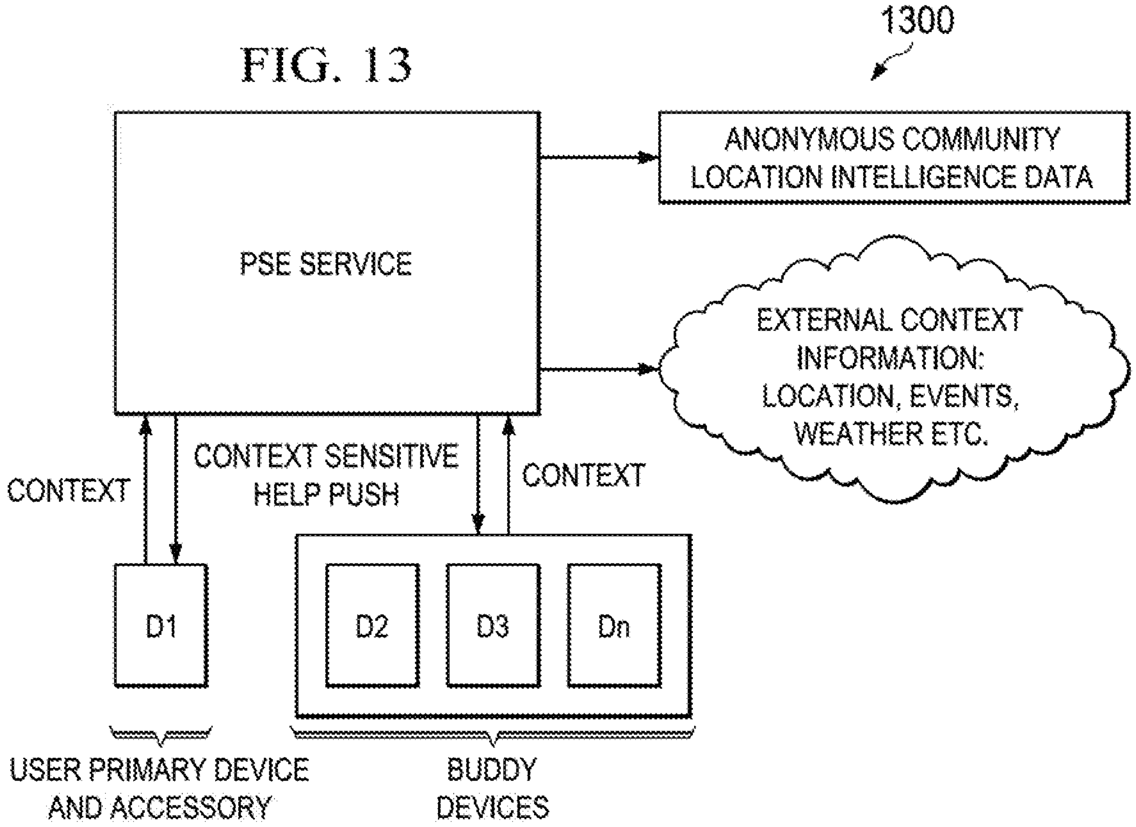
FIG. 13 is a simplified block diagram representing interactions between an example personal safety server, a client device hosting a personal safety engine, and one or more other devices for developing community intelligence regarding an event or location in accordance with one embodiment.
Figure 14:
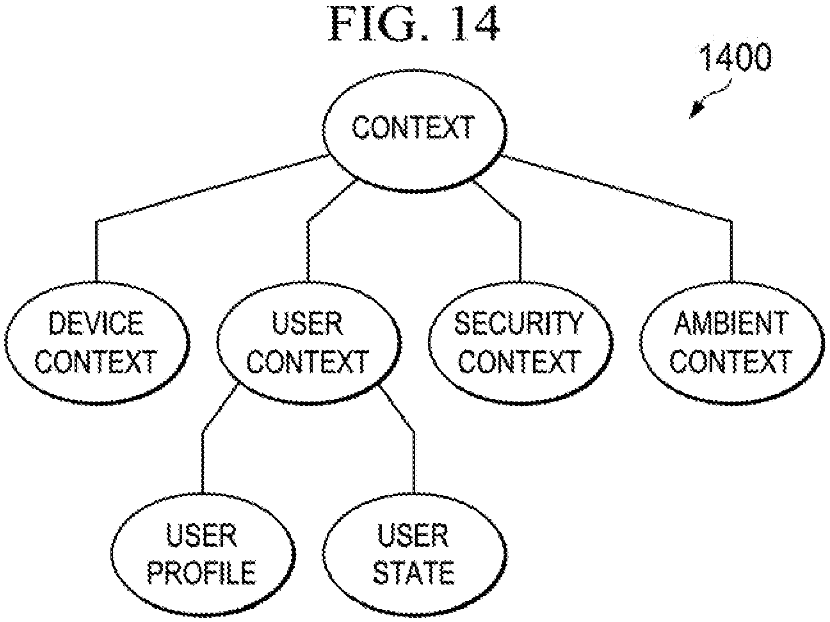
FIG. 14 is a simplified representation of contexts used in connection with personal safety services in accordance with one embodiment.

FIG. 13 is a simplified block diagram illustrating how various context data can be collected and used in connection with context information pushed, for instance, to recipients of alerts, priority calls, and other communications triggered, for instance, by emergency events and other events. As noted above, context data can be collected in connection with the determination of deviations from normal behavior baselines to trigger, in some instances, automated emergency events or other alerts. Sources of such context data, as noted above, can include the client device itself as well as external sources such as other users' client devices and remote data sources and service providers capable of providing such context information as local events such as traffic information, current events, government-issued alerts, weather events, and other information. Turning to the mapping 1400 of FIG. 14, context collected and used in connection with a PSE can include both user-centric context information such as user profile information (e.g., demographic information of the user, etc.) and user state information (e.g., as derived from context discovered through the user's client device, among other examples), as well as non-user context information. Examples of such non-user context information can include device-specific information, security information (e.g., security and threat feed intelligence, etc.), ambient context information, among other examples.

In some implementations, when a personal safety event happens, a client device can send the context information to a web server, such as a server hosting a PSE service, among other examples. The server can in turn process and use received context information and other inputs from internal and external services to derive context-related results, such as, normalcy scores, detected emergency events, multiuser behavioral baselines, events affecting multiple users, among other examples. In some implementations, the functionality of a PSE can be partitioned between the client device and remote servers such as computing devices implemented in a cloud infrastructure.

In one illustrative example, context information can be collected, for instance, from the client device sensors to assist in the automated determination of the criticality of the given situation facing a user of the client device. In one example, the criticality of the situation can be assessed from a variety of inputs, including inputs received by the affected user of the client device, inputs received from other users such as emergency contacts who have interacted with the affected user, inputs from sensors on the client device (e.g., a pulse monitor, temperature monitor, microphone (indicating the user's ability to talk), etc.), external context (e.g., from external data sources and services), inputs from other client devices collocated with and corroborating the state of the user's client device, among other potential inputs. The criticality of the situation can further involve the consideration of potential deviations of the respective inputs from expected baselines, such as, deviations from a user's daily routine (e.g., location, time, sequence of locations, etc.). Indeed, in some examples, normalcy scores, deviations, and the like can be adjusted up or down based on some of the inputs, such as the inputs of an emergency contact, etc.

In some implementations, an emergency event detected as involving a user of a client device can cause one or more persons or entities, such as emergency contacts associated with the user, to be automatically identified and alerted. In some implementations, how and which contacts are alerted can be based on the context of the event triggering the particular alert. For instance, particular contacts can be designated as primary contacts, for instance, by user, based on the level of emergency or priority of the event. For example, for a serious or high-level emergency, a spouse and emergency personnel may be contacted first. In cases of lower-level emergencies, other contacts or combinations of contacts may instead be alerted, among other examples. Further, the form and nature of the communication to the emergency contact, such as how the communication is to be presented on the device of the recipient of the alert, can be based on or tailored to the assessed seriousness or level of the emergency to further assist in quickly communicating the seriousness of the communication.

In one example, an alert message can be automatically constructed using an example template as well as, in some implementations, learned or historical information. For instance, examples of emergency message templates can take the form of:

<user> requested <level of emergency> help

<user> is at <location> near <landmark near location> is accurate <accuracy level(0 . . . 1)> Was on way to <location from calendar>

Health summary <normal/not>. Activity summary <daily routine or deviation>,

Activity at time of call <in car, walking, stationary>

Call <PSE Buddy phone> for further information. These <buddy list> have been contacted. Next update in <x> minutes.

In some implementations, multiple inputs for multiple users such as a community of users can be utilized to gather intelligence about and make determinations concerning developing emergency situations. A PSE service, such as a cloud-based and/or crowd-sourced security service, can learn patterns from information collected from its community of users, such as the number of incidents in a location, patterns in such incidents, and so on. Accordingly, a PSE service can predict the occurrence and/or type of a security event or emergency situation, for instance, from precursor data based on data collected from a community of users in some cases.

Precursor data to a situation requiring assistance can be sent anonymously to a PSE service. Location and landmark of interest can also be shared. The PSE service can use the data to analyze patterns in incidents to infer potential personal safety risk to other users. For instance, an unsafe situation near a bus station can be recorded and used to automatically assess and generate alerts concerning the security of other subscribers or users of the service identified as in geographic proximity to the predicted unsafe situation, among other examples. Such data could also be correlated with other public and/or private data, such as traffic, news, or other information, to corroborate and make such assessments more robust.

Figure 15A:
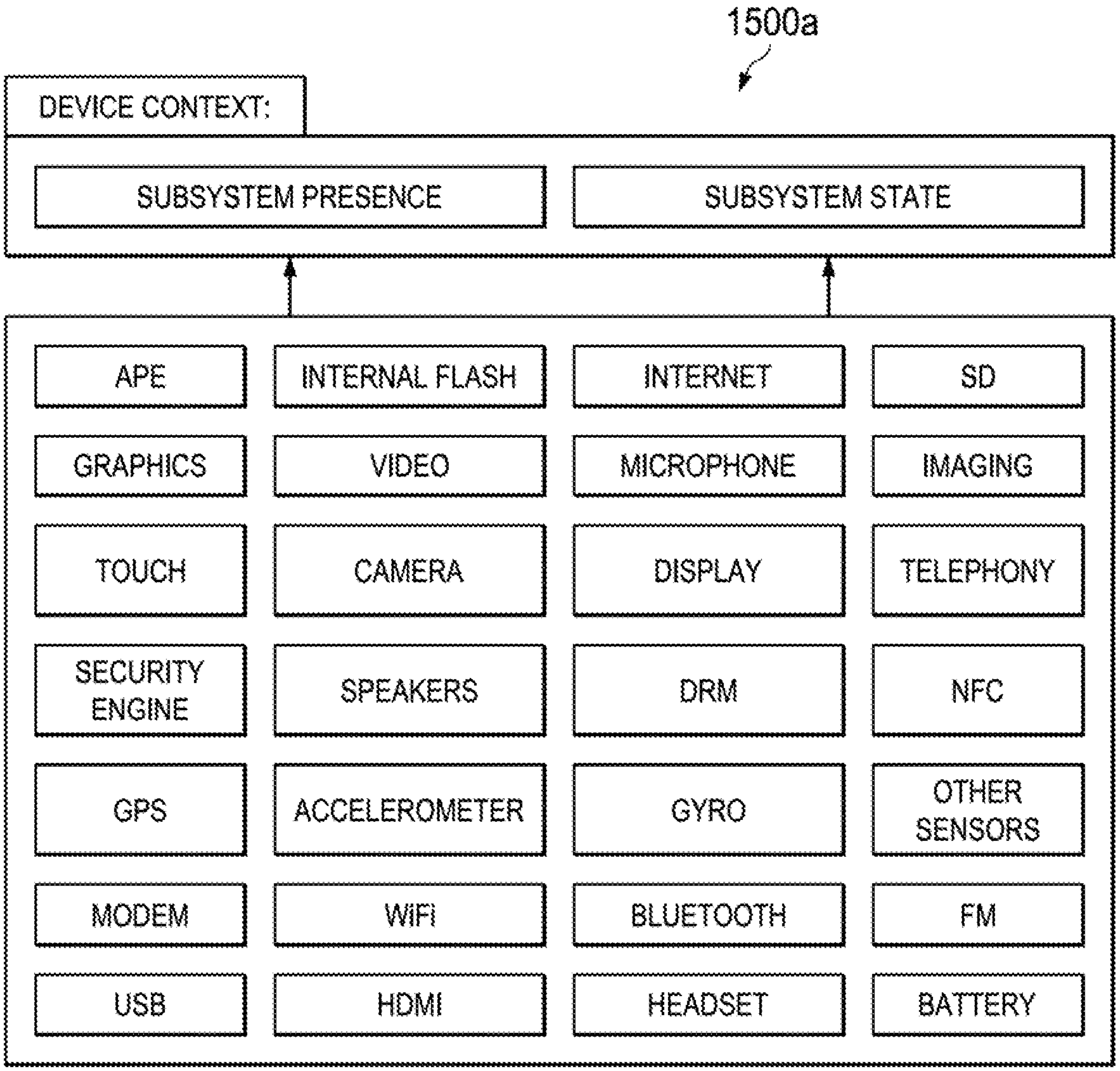
FIGS. 15A-15D are simplified representations of characteristics influencing respective device contexts, user contexts, security contexts, and ambient contexts in accordance with some embodiments.
Figure 15B:
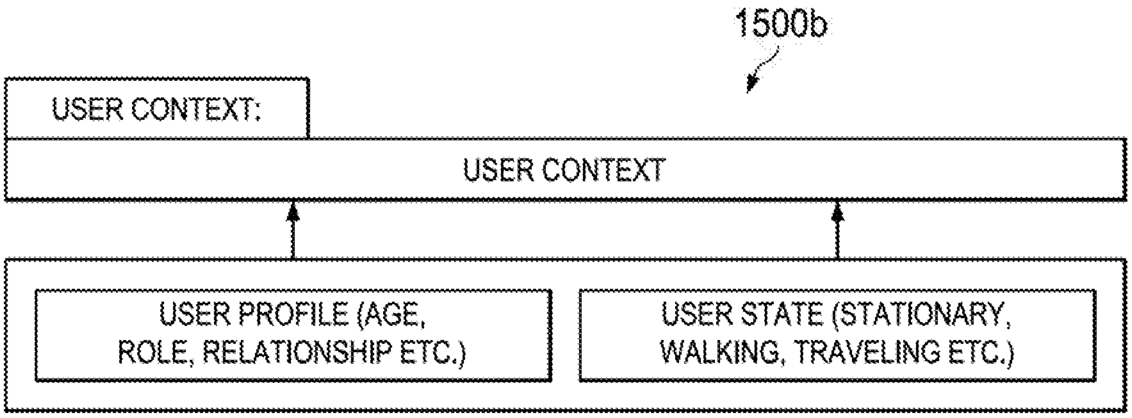

As noted above in the discussion of FIG. 14, a variety of contexts can be determined and used in connection with personal safety assessments and emergency event detection. Turning now to the block diagrams 1500*a-d* of FIGS. 15A-D, the respective contexts of an incident, state, or condition can be represented. For instance, in the example of FIG. 15A, device context can be represented based, for instance, on orientation of the device, network connections, battery level, mode, power-state of subsystems of the device, etc., including the state of the various subsystems of the device as well as the availability or presence of the respective subsystems. For instance, device context can be derived automatically from device instrumentation assessments. An example could be:

<device:battery:90%>
<device:camera:ON>
<device:WiFi:ON>
<device:orientation:LANDSCAPE>.

User context can capture user activity state, represented by a tuple, activity and state, such as represented in FIG. 153. For example, parameter <user:mobility:STATIONARY/WALKING/RUNNING/DRIVING> can represent a more specific state of the user, such as the speed of movement of the user. The user context can be derived by analyzing the historical sensor information as well (e.g., to assess whether this speed of movement is typical). This context can be extended as application features, alert types, sensors, or other functionality is extended. For instance, <user:context> could include a health index that could be derived, for instance, through data collected using special or optional sensors that can be attached to the client device as peripherals. Additionally, among other examples, some of the user contexts can be input by the user or obtained from a user profile database, such as:

<user:profile:age=14>
<user:profile:role=salespersons>.

Figure 15C:
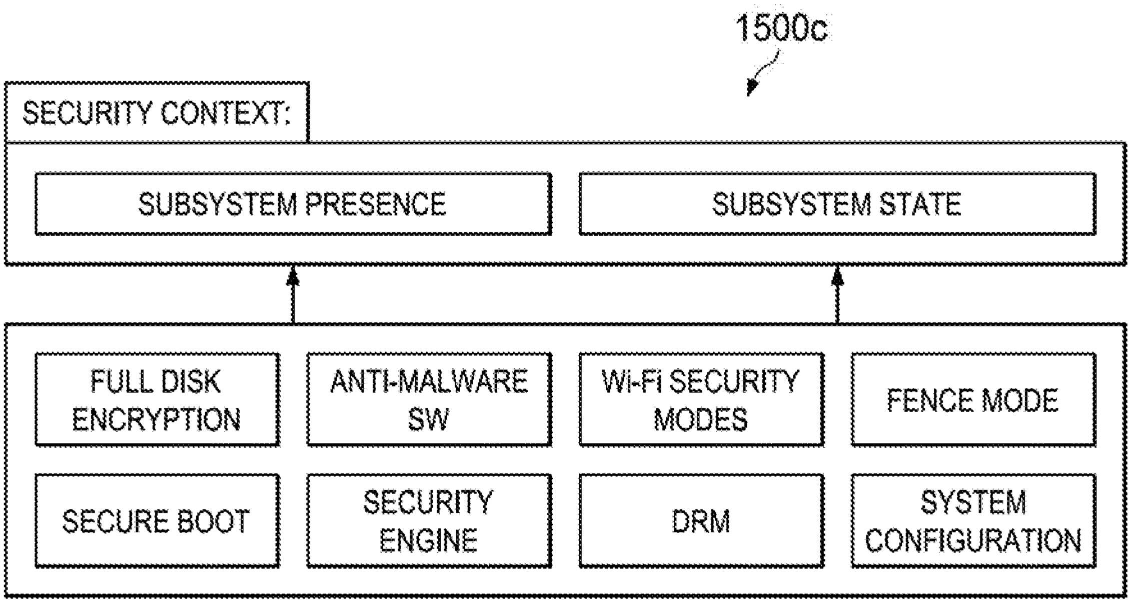
Figure 15D:
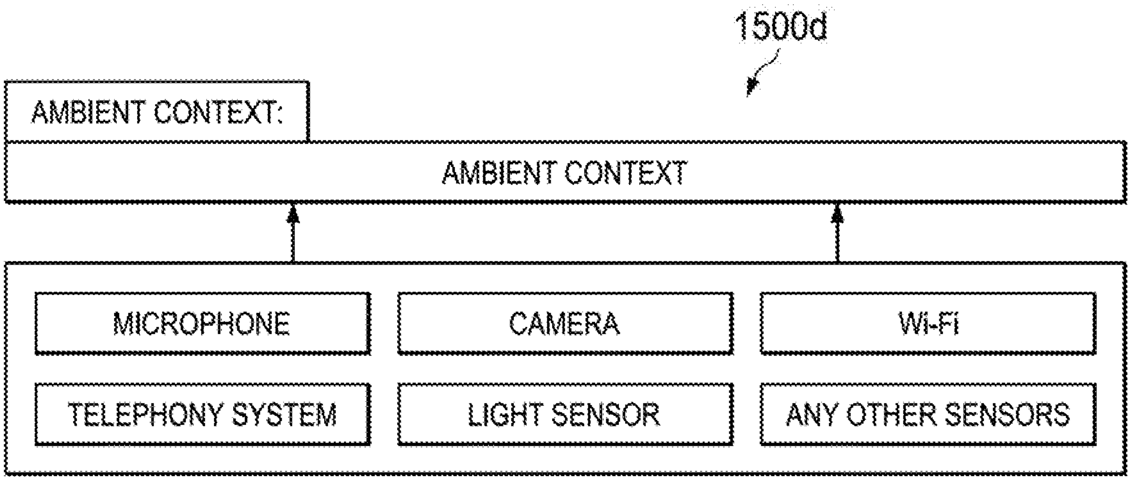

As represented in FIG. 15C, security context can also be determined, for instance, from security-related subsystems on or used by the client device, among other examples. Such security context can identify the security state of the device, such as whether the device is in a secure or health state for reliably use as a personal security client device. Further, communicating and relying upon data from the client device can be based on the security context of the client device, among other examples. Further, turning to the example of FIG. 15D, ambient context can capture the context of the world around the device. The ambient context can include, for example, information collected from cell towers, Wi-Fi router names, audio noise (collected from a microphone of the client device), light level (e.g., collected from a camera or other optical sensor of the client device), etc. For example, location information can be derived from ambient context, such as a wireless access point of a business connected to by the client device:

<ambient:wifi:JOESCAFE>.

FIGS. 16A-B illustrate example screenshots 1600*a-b*, in accordance with some implementations. The example screenshot 1600*a* of FIG. 16A represents an example screenshot that can be presented on the client device of the user experiencing an emergency event or condition. For instance, a user (or their device, using a PSE), in response to a detected emergency event, may have initiated the sending of one or more alerts to one or more contacts, or "buddies". An example user interface 1600*a* can include, for example, an incident status log 1605, indicating that the emergency has been triggered/detected and that various contacts have been alerted. In some implementations, a map 1610 may be displayed, for instance, illustrating the location of the emergency contacts relative to the user as well as, in some implementations, points of interest relevant to the user and the emergency situation affecting the user, such as the location of nearby medical facilities, government buildings, shelters, law enforcement posts, and so on. Further, in some examples, a status window 1615 can be presented that indicates the status of attempts to contact various emergency contacts in connection with the triggered emergency event. For instance, status window 1615 can indicate which contacts have been informed, whether they have been informed, whether they have acknowledged the alert, how they have acknowledged and responded to the alert, how they were contacted, among other information. Further, additional windows (e.g., 1620), can be presented to the user, such as links or instructions for providing self-help or otherwise responding to the detected situation.

Turning to the example of FIG. 16B, another example screenshot 1600*b* is shown of a user interface display, for example, of the recipient device, such as a client device of an emergency contact, or buddy, that has been alerted in response to an emergency event detected on another user's client device. In some examples, a status log window 1625 can be provided that indicates a timeline of the incident as well as context information to assist the emergency contact in understanding, assessing, and responding to the affected person. In some instances, a status window 1630 can also be presented to a recipient user, for instance, to help the user appreciate their ability to assist the affected person relative to others who may have been contacted in response to the detected event. A map view 1635 may also be presented, and some implementations, this is the user and identifying the nature of the affected persons situation as well as the location of the recipient user relative to the affected person. Additional information (e.g., 1640) can also be presented that is relevant to the user's attempts to service and respond to the affected person's condition, such as sources of a first aid information, phone numbers of the local police office, location of nearest ATMs, location of a nearest hospital, and so on.

Figure 17:
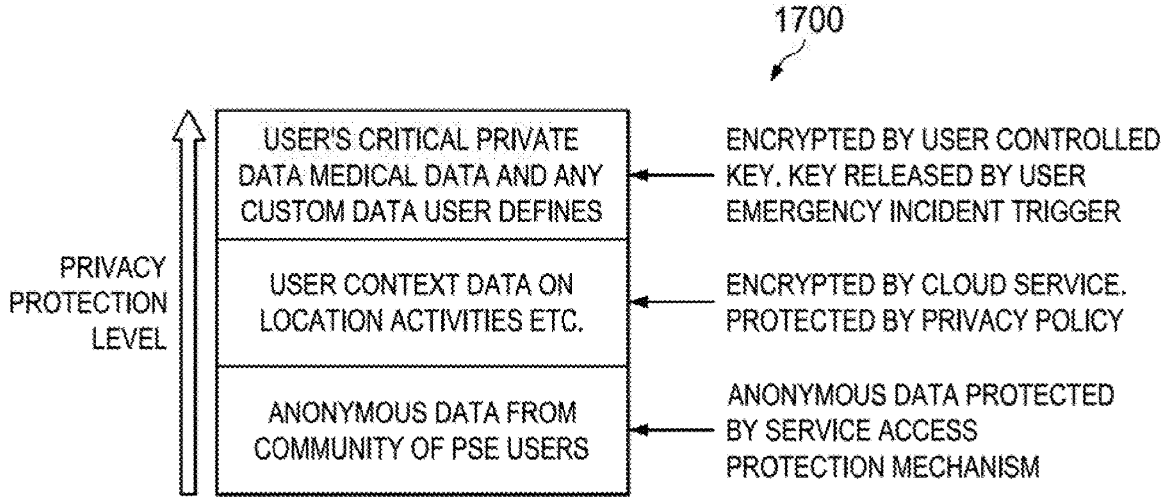
FIG. 17 is a simplified representation of levels of security to be provided to example categories of user data used in connection with personal safety services provided in accordance with one embodiment.
Figure 18:
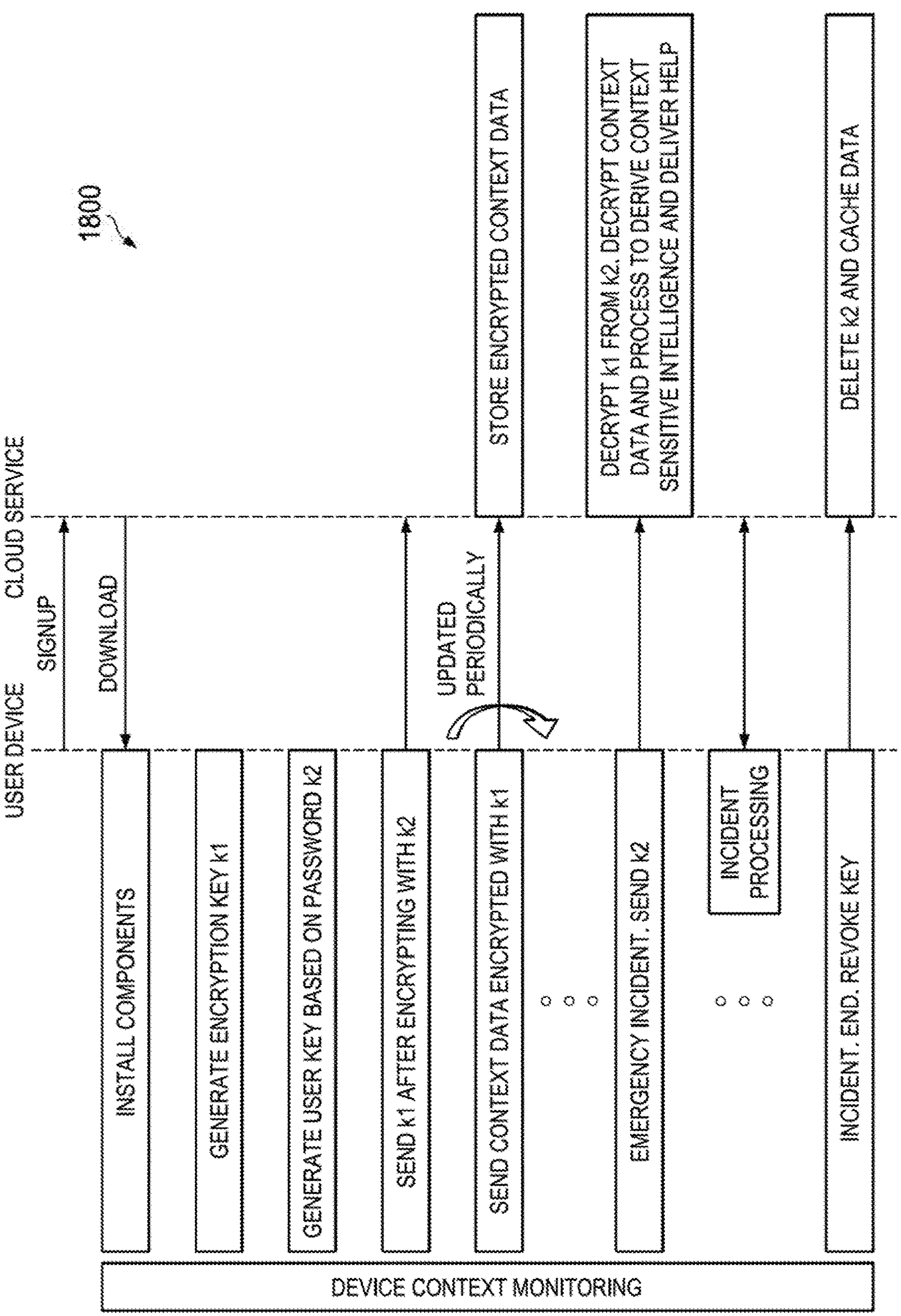
FIG. 18 is a simplified block diagram illustrating a temporary encryption of user data of a particular category in connection with personal safety services provided in accordance with one embodiment.

As can be appreciated, in connection with personal security services provided at least in part through a PSE, sensitive and private information of the user can be communicated. In an attempt to effectively provide personal security services while protecting the privacy of the user, privacy safeguards can be implemented in some implementations. For example, user data can be classified into various categories, each category dictating a level of privacy or care to be used with information in the corresponding category. In some examples, the user can review and/or assign the classification of particular types of data into various categories. As an example, shown in the representation 1700 of FIG. 17, user data can be classified into three categories or levels. For instance, a category can be assigned for the user's critical private data such as medical records, such that communication and/or storage of data in this category is encrypted. As shown in the example diagram 1800 of FIG. 18, encrypted communication of various categories of data can be managed, for instance, according to the flow illustrated in FIG. 18. For instance, access to sensitive data by outside support services of the PSE (e.g., a personal security or PSE service), can be temporary and only granted with explicit permission of the user or in response to the triggering of a particular type of assistance (e.g., in connection with an emergency event). For instance, encryption keys can be reset so that the access is only for the duration of providing assistance to the user. Returning to FIG. 17, less private categories of information, such as an example second category of user data such as location, user activity, etc. can be protected by other less demanding encryption protocols in connection with sharing of the data with outside services used in connection with the PSE. Still other categories of data can be of a type that is allowed to be collected anonymously and used to provide better assistance to all users in the community, such as precursor data and other data used to develop patterns, conclusions, and inferences regarding, for instance, various neighborhoods, types of incidences, patterns of physiological data, among other examples relating to emergency events and requests for assistance on the client device or other users' client devices.

Permissions to access particular data on or collected by a user's client device can be solicited, in some examples, in connection with the sharing of private data of users in connection with services of an example PSE. Indeed, in some implementations, information from both a user requesting assistance with an emergency situation, as well as other users involved in remedying or responding to the situation can be collected and shared, both with remote services used by the PSE and the other users. For instance, location information can be viewed as personal and private information. In one example implementation, an example PSE can use or dictate explicit user consent to share location (and other data). For example, by requesting assistance through the PSE, the user may consent to share the user's location with a set of selected emergency contacts. The contacts can in turn acknowledge the receipt of the request for help, and further acknowledge that they have been informed regarding the PSE's sharing of their own location information with the other user affected by the emergency event. The PSE, in some situations, can guarantee to the users that the location information will be used solely in connection with the immediate emergency or security management services and for the purposes of ensuring safety or assisting in the provision of safety and emergency services, among other examples.

In some implementations, an example PSE can be equipped with functionality for managing battery life of the client device used in the management of personal safety, emergency, and security services provided through the PSE (and client device). As can be appreciated, in the event of low or expiring battery life, the effectiveness of a PSE and the hosting client device in protecting a user can be severely diminished. In some examples, a PSE can include functionality for protecting and reserving battery capacity for purposes of providing safety and emergency assistance. For example, the PSE can provide a specialized battery driver that allows for a reserve (configurable) battery charge to be maintained at the direction of the PSE. In one implementation, a hardware/firmware mechanism can be provided to allow only the PSE assistant and any other applications used by the PSE in connection with PSE services to operate and/or access power of other subsystems of the client device that draw power from the battery. In some implementations, control over power usage by applications and subsystems of the client device by the PSE can be governed or triggered based on the battery level of the client device falling below one or more predetermined thresholds. Power usage can be restricted to PSE-related applications and subsystem in some instances based on the triggering of a security event, so as to preserve battery use during the security event. Indeed, in some examples, multiple thresholds can be set, with each threshold triggering a particular set of controls, rules, or limitations on other applications and subsystems of the client device.

Figure 19:
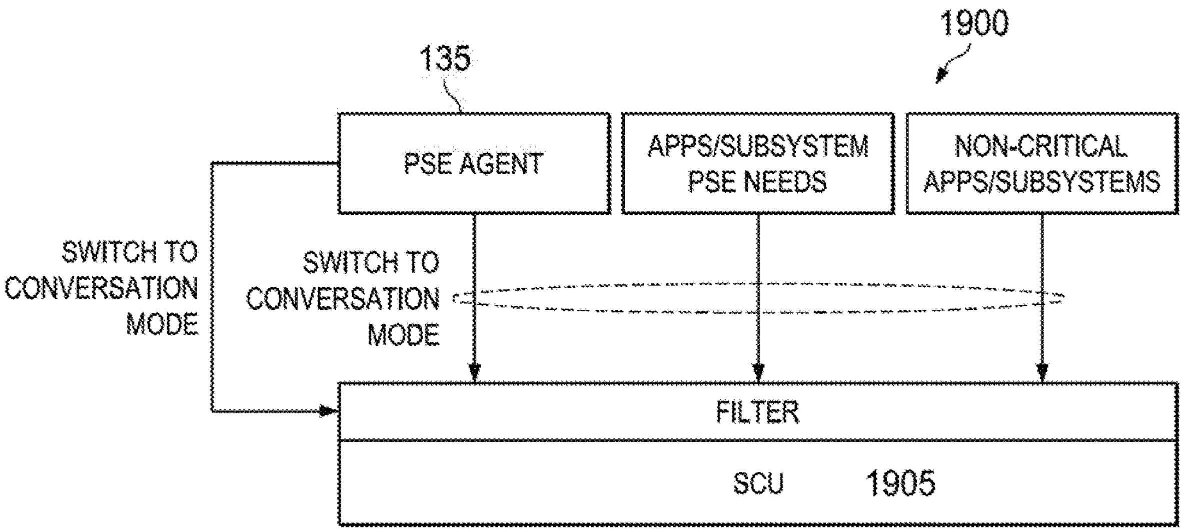
FIG. 19 is a simplified block diagram of an example personal safety engine providing battery management in connection with personal safety services provided in accordance with one embodiment.

To illustrate, in one example, a particular gaming application on the client device may be configured to utilize network access capabilities of the client device to communicate with remote servers, for instance on the Internet, and check status of scores, updates, progress of other remote users, among other examples according to a particular schedule, among other examples. In one example, in response to detecting a diminishing battery condition on the client device, a PSE 135 can cause various limitations to be applied to other applications on the client device including, in this example, the particular gaming application, so as to preserve the client device's ability to be used in connection with personal security services. For instance, the PSE battery control driver can be used to limit or lock the particular gaming applications ability to access or use the data connection of the client device. In some implementations, the firmware of the PSE battery control can be implemented in the system control unit 1905, which can coordinate the power distribution of various subsystems, such as shown in the example 1900 of FIG. 19. Additionally, the user can designate how and what subsystems and applications the PSE battery control can influence. For instance, a user can designate priority levels for subsystems and applications and designate which subsystems and applications will be limited at various battery levels, among other examples. Additionally, in some examples, a user can be provided with the option to manually override, for instance, by a specially programmed sequence, the limitations imposed on other subsystems and applications by an example PSE battery control, among other examples.

As noted above, location information, such as collected from GPS functionality of the client device, can be used in a variety of ways in connection with services provided by an example PSE, remotely provide PSE support and personal security services, etc. In some implementations, geo-fencing can be used, among potentially other geopositional applications and services, in connection with services provided by an example PSE. Geofencing has been successfully employed in locating and monitoring, for instance, the safety of children, monitoring older age citizens, among other examples. However, traditional geo-fencing systems have limitations that have slowed their use and adoption. In one example implementation, improved geo-fencing techniques are provided and can be used, for instance, in connection with personal security services of an example PSE as well as potentially many other types of contextual services.

A geofence can involve the designation of an area, for instance, on a digital map or according to geo-positional data and can be represented, for instance, by a polygon defined by a sequence of latitude and longitude pairs or, in general, as a sequence of locations that, in turn, define a perimeter of a particular geographical area. In one example implementation, geofences can be implemented as a hierarchy of nested polygons superimposed on a digital map of the geographical area. This can allow for a wider range of geofence representations and simplify definition and representation of more complex geofences. For instance, some geometric algorithms configured to detect if a location is within a fence may rely on or assume that the fence is a convex polygon, and fail to detect instances when the polygon is instead concave, among other examples.

Figure 20:
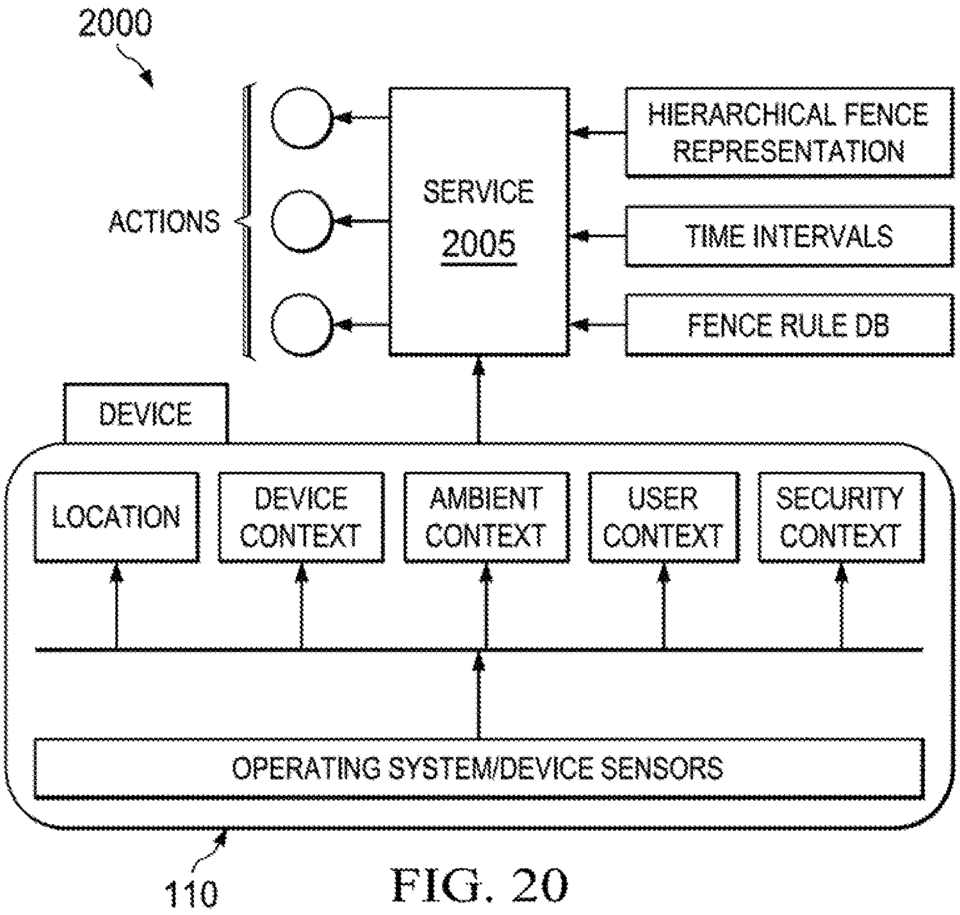
FIG. 20 is a simplified block diagram of an example system providing a geo-fencing service in accordance with one embodiment.

Turning to FIG. 20, simplified schematic block diagram 2000 is shown illustrating an example device, such as a PSE client device 110, configured to operate, in some instances, with a service 2005 adapted to define, manage, update, and detect user interactions with geo-fences, such as geo-fences incorporated in the assessment and collection of context information in connection with personal safety services provided, for instance, through an example PSE implemented at least in part on device 110. In some implementations, a geo-fencing service 2005 can be implemented in whole or in part by servers and systems remote from the PSE client device 110. In other implementations, portions of geo-fencing service 2005 can be implemented on the client device 2005, among other examples.

In the example of FIG. 20, the client device 110 can be equipped with sensors, devices, peripherals, etc. capable of collecting location context, device context, ambient context, user context, security context, among other contexts and data for use, for example, with the provision and development of geo-fences. Further, geo-fencing service 2005 can make use of hierarchical fence representations, time intervals, and fence rules, such as fence rules provided or maintained in a fence rule database or other resource. The service 2005 can utilize geo-fencing functionality to perform a variety of actions including actions responsive to or offered in connection with emergency events indicated or detected at a client device and in some cases also through the service 2005), for instance, through an example PSE.

Figure 21A:
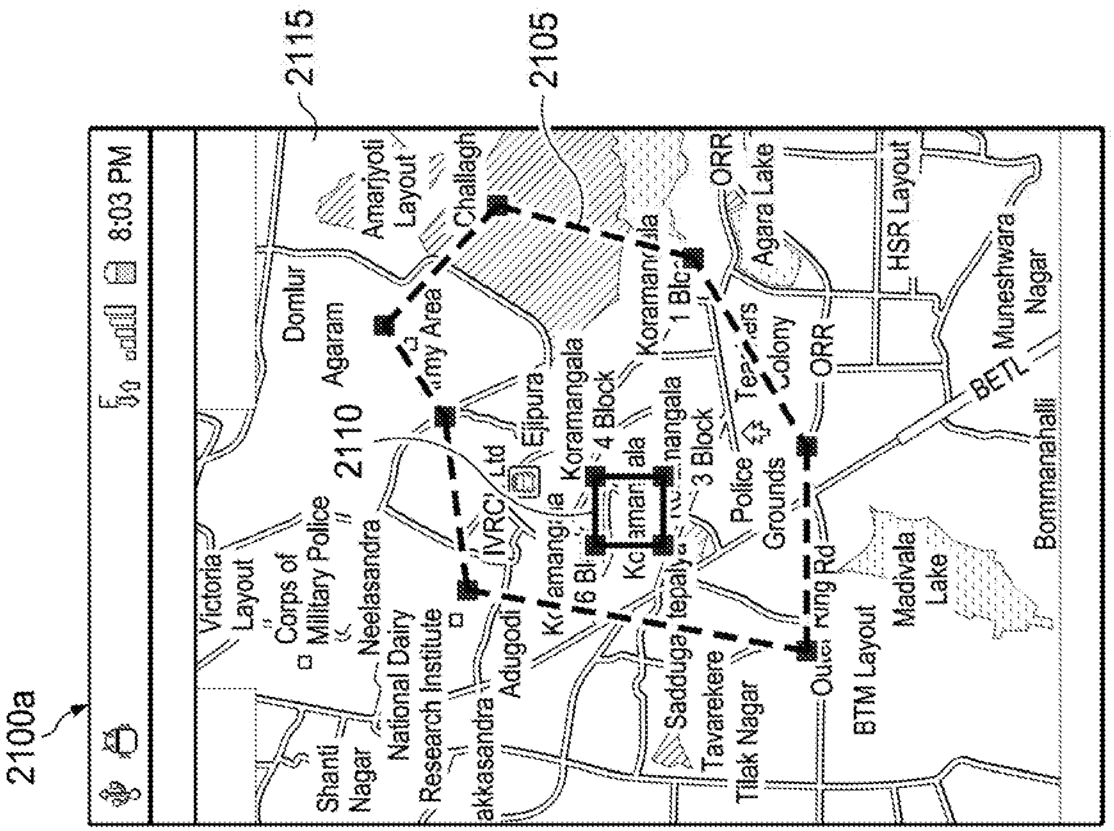
FIGS. 21A-21B are simplified representations of hierarchical geo-fences in accordance with some embodiments.
Figure 21B:
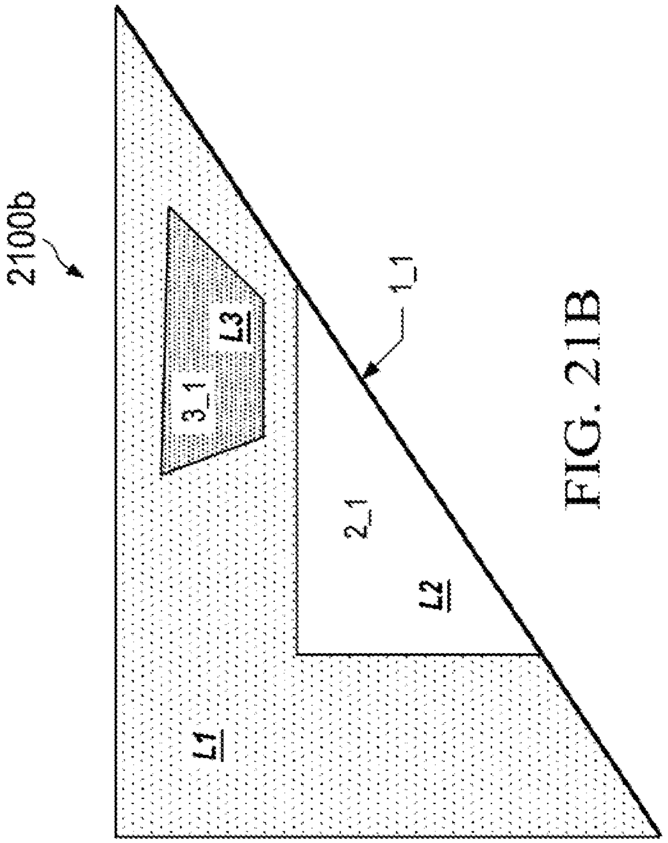

FIG. 21A illustrates an example screenshot 2100a showing a representation of an example hierarchical geo-fence. In one example, a geo-fence can include multiple, layered geo-fences that, in some cases, at least partially overlap. For instance, in the example of FIG. 21A, two distinct hierarchical geo-fences 2105, 2110 are represented, for instance, over a graphical representation of a map 2115 of the geographical area. Turning to FIG. 21B, a representation 2100b of another set of hierarchical geo-fences is shown. A hierarchical geofence, such as shown in FIG. 21B, can allow for representation of potentially concave polygons as a nested set of convex polygons. A geo-fencing service can also possess the ability to define exclusions for the geo-fences. For instance, the operator EXCEPT can be used to create exclusions in convex polygons. In the fence diagram, a particular user or subject can be defined to be allowed to be present in fence 1_1, but excluded from being in fence 2_1 (e.g., because fence 1_1 is concave) and from fence 3_1 (because it is a real exclusion area). For example, a location L1 can be represented as: L1 BELONGS-TO (fence 1_1 (EXCEPT fence 2_1) AND (EXCEPT fence 3_1)).

Continuing with the foregoing example, if a user or subject is detected to be at (allowed) location L1, then an allowable condition can be detected or determined. A geo-fencing rule can serve as the basis of detecting or mapping location L1 as corresponding to the geo-fencing polygon fence 1_1. In another example, location L2 can be defined as corresponding to the geo-fence fence 2_1 where: L2 BELONGS-TO (fence 1_1 (fence 2_1)). Further, if the user or subject is at location L2, then a disallowed condition can be determined are triggered (e.g., because the user is outside an allowed area or in a defined forbidden, disallowed, or discouraged geographical area defined by the geo-fence fence 2_1). Further, and another example, geo-fence fence 3_3 can be defined, annotated, or associated with metadata, etc. indicating that fence 3_3 is an excluded fence. Hence: L3 BELONGS-TO (fence 1_1 (EXCEPT fence 3_1)) Accordingly, if the subject or user is detected to be residing within location three, defined by geo-fence fence 3_3, subject or user can be determined to be in a disallowed condition, among other examples.

Figure 22A:
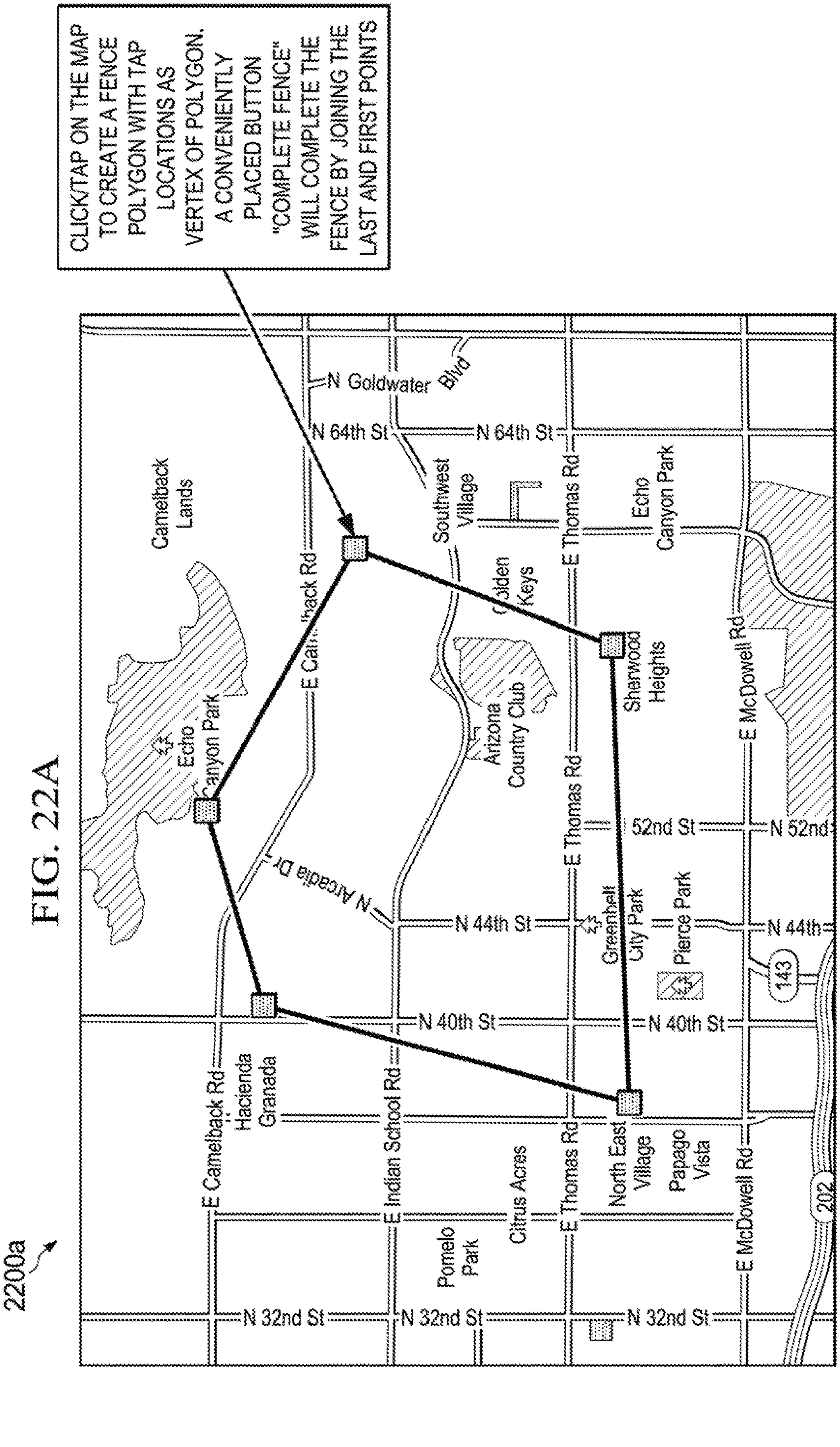
FIGS. 22A-22C are simplified representations of example user interfaces assisting in the definition of example geo-fences in accordance with some embodiments.

Turning to the example of FIG. 22A, a geo-fencing system can include the provision of easy to use and intuitive graphical user interfaces for use by users in marking, defining, creating, modifying, and otherwise designating geo-fences. For instance, as shown in the example screenshot 2200a, a user interface can be provided, for instance, in connection with a touchscreen interface (or other interface) of a client device, and provide for a user to designate over a digital map of a geographic area points or vertices of a polygon defining the metes and bounds of a geo-fence. For instance, a user may click on a representation of a map to create a geo-fence polygon, with each tap designating locations of vertices of the geo-fence polygon. Upon defining the vertices of the polygon, a representation of the polygon can be displayed to the user along with an option for designating or finalizing the polygon's definition or representation as a geo-fence (e.g., by designating associated geo-fence rules, policies, etc.).

Figure 22B:
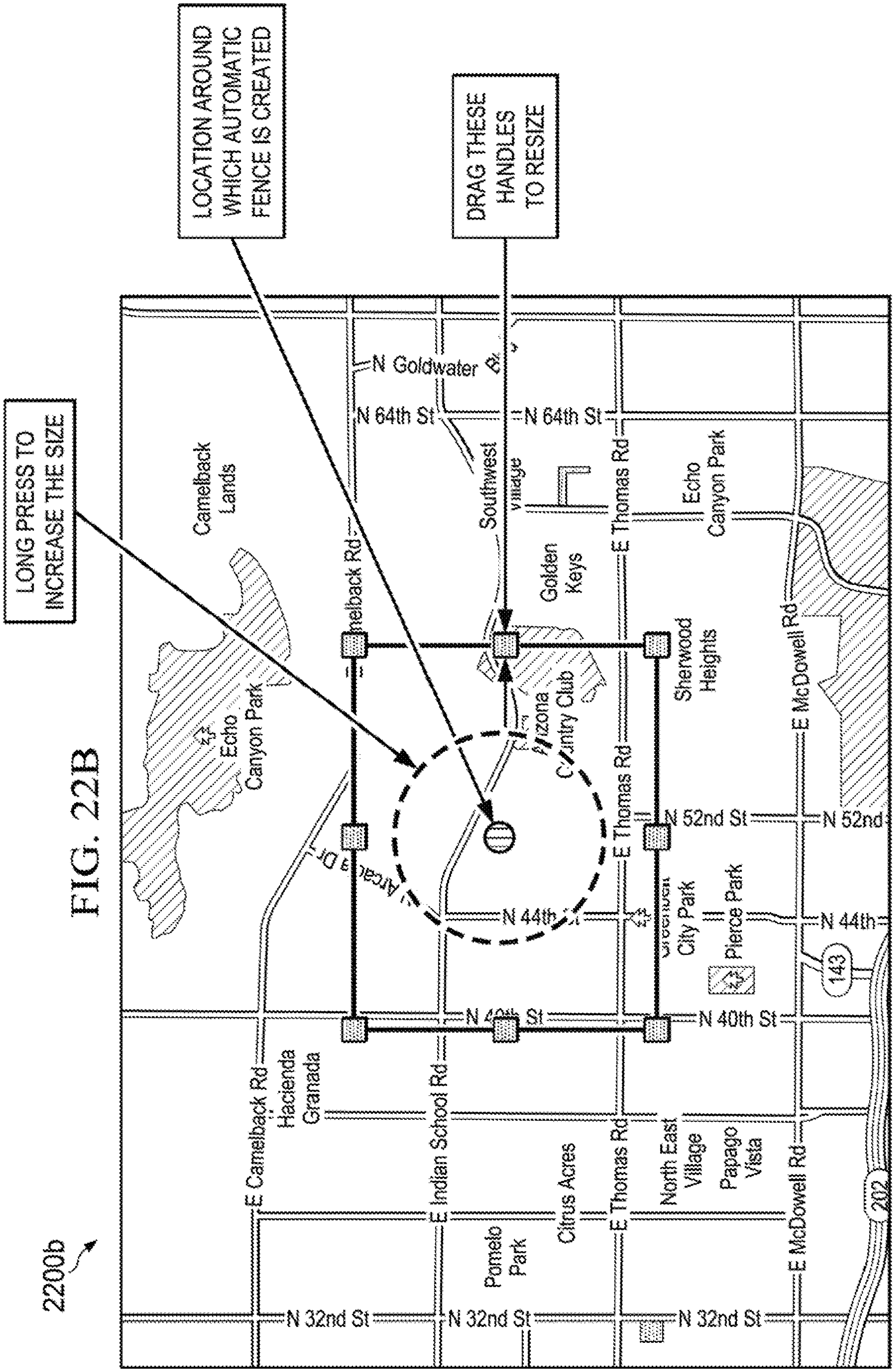

In another example, as shown in the example screenshot 2200h of FIG. 22B, additional or alternative functionality can be provided in connection with a graphical user interface allowing users to define geo-fences over a digital map. For instance, in one implementation, a user may click or tap on a location of a digital map to indicate a center of a desired or planned geo-fence. In response to the designation of the geo-fence's center, expandable, movable, or otherwise modifiable representations of vertices of a corresponding geo-fence can be presented to a user in the graphical user interface, which the user can drag and manipulate to define the more precise metes and bounds of the geo-fence around the designated center, as illustrated in the example of FIG. 22B. For example, one can create a geo-fence representing a one kilometer safe zone, for instance, around a school for a child by first tapping the location of the school and then building an appropriately sized polygon around the center point, among other examples.

Figure 22C:
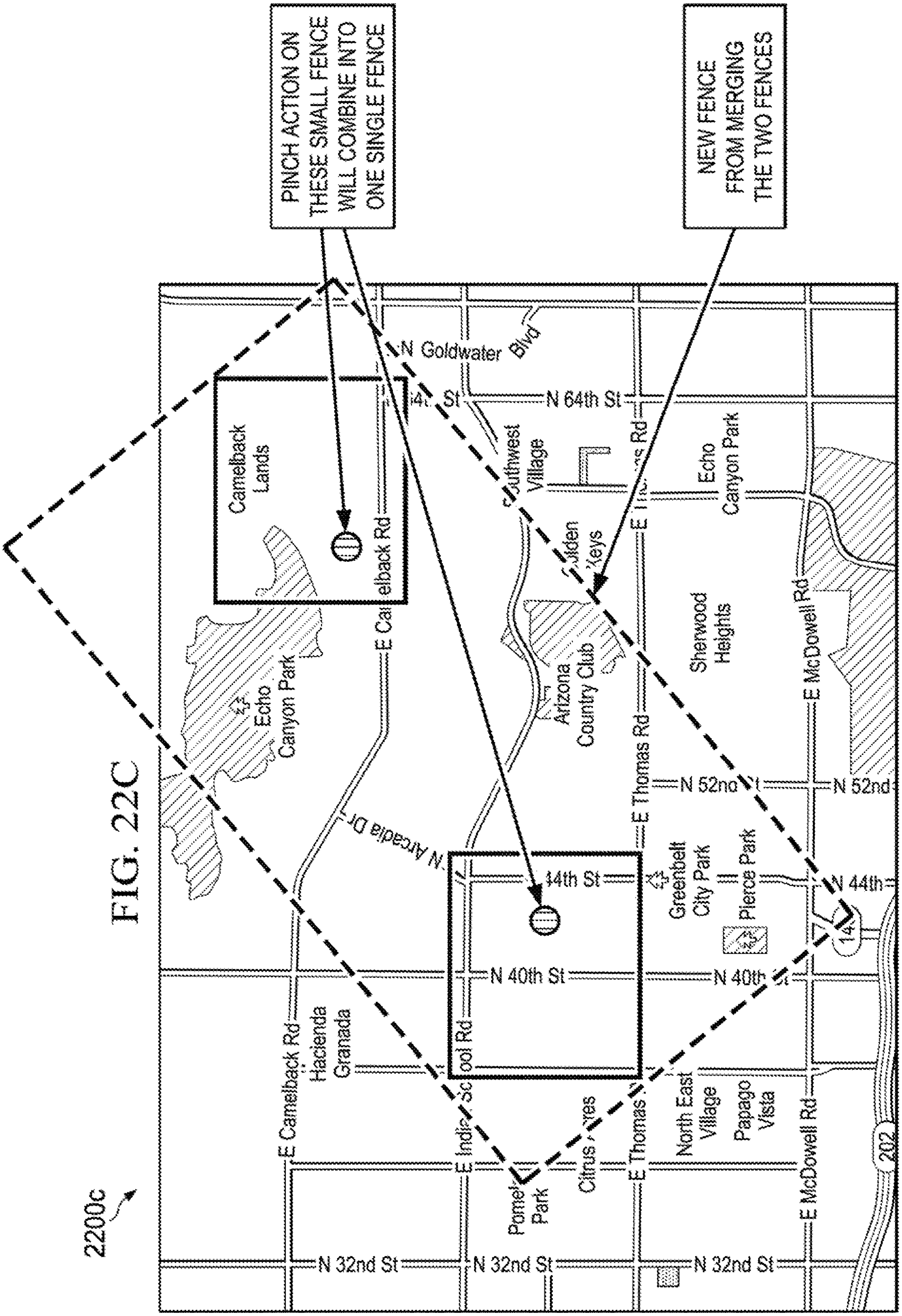

Turning to the example of FIG. 22C, another example user interface control is illustrated in example screenshot 2200c. In this example, a user interface control can be provided to allow a user to combine multiple smaller fences, such as other geo-fences in a hierarchical set of geo-fences, into a different or other geo-fence. For instance, a user may concurrently select two or more geo-fences and use a pinching action, for instance through a touchscreen of a client device, to cause the smaller polygons to be stretched and merge to form a new geo-fence. It should be appreciated, that the examples of FIGS. 22A-C and the related discussion address just some of the potentially many varying examples of geo-fences and controls that can be provided in connection with the provision of geo-fence editing and definition functionality and corresponding user interface tools that can be provided.

FIG. 23A includes an example chart 2300a representing an example algorithm for identifying the mapping of a given location within a series of hierarchical geo-fences. For instance, an example fence rule can be defined, for instance, that designates permitted or allowed areas corresponding to particular geo-fences. For example, a rule can designate that a given user is allowed to be inside a geofence F1 or F4 but not within a fence F2 or F3. Additionally, rules and geo-fencing definitions can define the hierarchical relationships between geo-fences. For instance, fences F2, F3, F4 can be embedded within (or be children of) geo-fence F1, and geo-fence F4 can be embedded within (or be a child of) an example geo-fence F3, among other examples. Further, as illustrated in the pseudocode 2300b of FIG. 23B, an algorithm can be provided for identifying the mapping of a given location within one or of the fences in a hierarchy, for instance by determining whether a particular geo-point is inside or outside one of the designated geo-fence polygons.

In some implementations, geo-fences can be determined and generated automatically. For example, a learning model can be developed and used that represents typical user behavior generated, for instance, by the system as it learns about a user's tendencies through collected historical context data, including example context data discussed above. Based on such a learning model, fences can be identified and automatically generated that correspond to tendencies of a user as they relate to the users placement within various geographical areas. For example, the system can automatically create some fixed-size fences around locations that a user visits regularly such as near a school attended by a child, a user's workplace, a favorite shopping center, etc. Additionally, fences can be associated with certain time spans. For example, a school geo-fence may indicate expected location contexts for a child user but only during weekdays and during periods of the day when school is in session.

Figure 24:
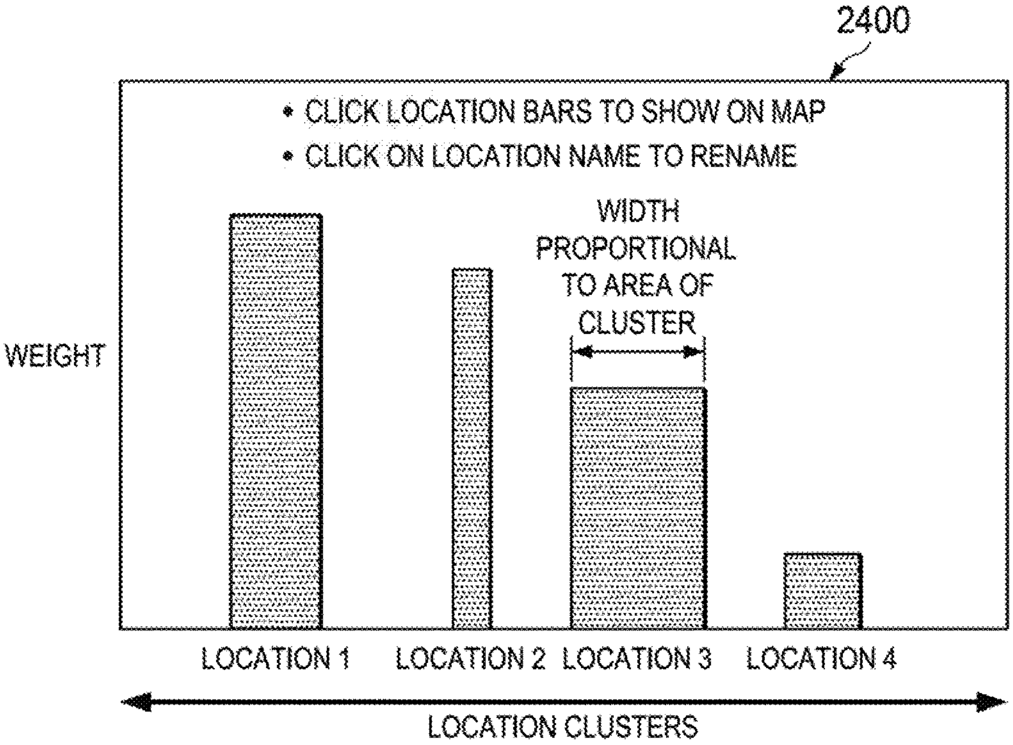
FIG. 24 is a simplified representation of clustering of geographic events in accordance with some embodiments.

As illustrated in the example chart 2400 of FIG. 24, a geo-fencing service can utilize location information and time information indicating a user's duration within a particular geographical area to dynamically determine and generate corresponding geo-fences for the user. For example, a clustering algorithm can be used to determine the logical locations from clusters of locations identified for a particular user. An example "logical location" can include, for instance, an office building that may be, for instance, 100 meters in area, etc. Such a logical location can be deduced, for example, from a cluster of geo-points within that corresponding location based on historical information collected, for example, from GPS data or other data transmitted and collected from a user's (or multiple users', such as other employees within the building) client device(s), among other examples. Further, identified clusters can be weighted, for instance, according to an algorithm such as:

Σ for each logical location in cluster (frequency of visit*k1×duration of visit*k2)

Value of k1 and k2 can range from 0 to 1, and duration can be measured, for instance, in seconds, minutes, or other unit of time.

As clusters and logical locations are identified, vertices corresponding to the perimeter of the identified locations can be identified in order to present a corresponding geo-fence polygon on a map, along with, in some examples, pins or other indicators showing the locations of detected events within the perimeter of the polygon considered as the basis of the determined logical location and corresponding geo-fence. Further, the duration of detected events can also be weighted and considered in connection with the identification of geo-fences. In some examples, longer events can be identified as more important or significant to a given location than shorter events, for instance, at other locations. Further, geo-fencing service can make use of external resources, data, and services, such as from web services hosted by remote servers, to add further context for use in weighting events, identifying logical locations, and refining the dimensions of corresponding geo-fences, among other examples. For example, intelligence posted by outside services may provide such context as typical travel times, visit times, crime rates associated with an area, traffic tendencies, demographic tendencies, and other information.

In some implementations, a user can be presented with historical information including a representation of location clusters identified for the user (e.g., the graph 2400 of the present example). The user can then name the cluster, accept the cluster, click on a representation of the cluster to be taken to a graphical representation of the corresponding geo-fence superimposed on a map of the location, add rules or events corresponding to the cluster, among other examples. Accepting a cluster can result in a geo-fence being generated to which the user can add specific fence rules. In some implementations, the user can be presented with additional interfaces, such as those presented in connection with the examples of FIGS. 22A-22C to fine-tune and further specify and customize the dimensions of the geo-fence generated from the selected location cluster.

In some implementations, hierarchical geo-fences can be context-aware. For instance, a triplet representation of a context-aware geo-fence rule can be represented:

<fence> <time interval> <context>→ Action

Accordingly, a fence can be a nested hierarchical specification of fence names. The time interval can be defined as an interval from date:from-time to date:to-time. Accordingly, the corresponding fence can be designated as active during this defined time. A PSE profile can be associated with one or hierarchical geo-fences and provided with a record database of context aware fence rules. In some examples, a database of fences and fence rules can be protected by a password and/or shared between users in the community. Further, context can be partitioned into <device:context>, <user:context>, <ambient:context>. The device:context can be context of the device or user, including but not limited to, orientation, battery level, power-state of subsystems, etc. Each context can be defined by tuple—subsystem and state. As one example:

<device:battery:90%>
<device:camera:ON>
<device:WiFi:ON>
<device:orientation:LANDSCAPE>

Accordingly, the <device:context> can be derived automatically from device instrumentation. Further, user context can be included to capture user activity state, represented by a tuple, activity and state. Additionally, ambient context can be considered to describe the context of the world around the device. Such contexts can be considered in the enforcement of geo-fences as well as the dynamic generation of geo-fences and geo-fence rules, among other examples.

Figure 25B:
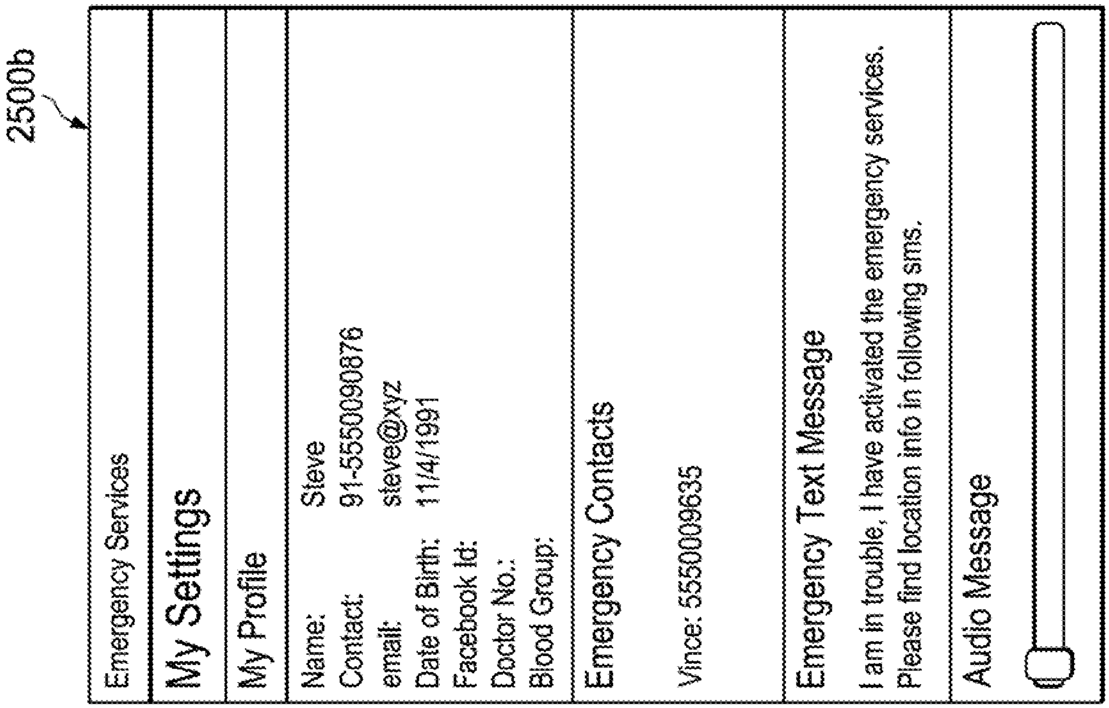
Figure 25A:
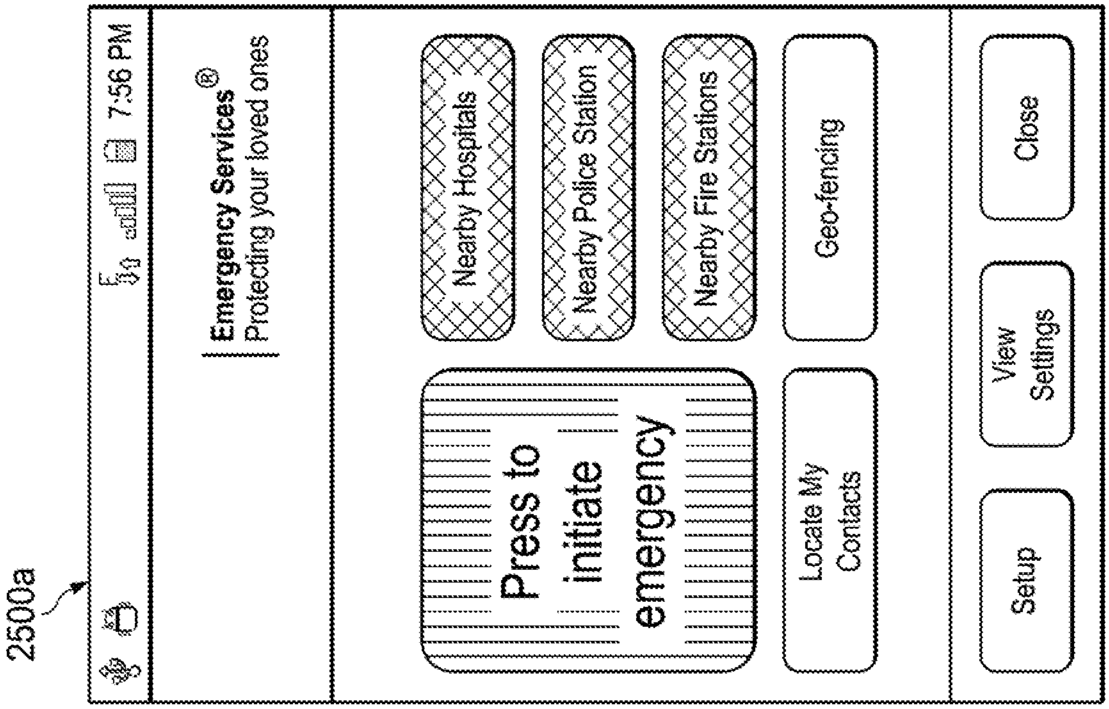

Turning now to FIGS. 25A-25L, example screenshots 2500*a-l* are illustrated showing example functionality and principles of some example of limitations of a PSE incorporating some of the example principles described and introduced above. For instance, screenshots 2500*a* of FIG. 25A illustrates an example PSE dashboard that can be displayed in connection with a PSE app running on a client device. An example PSE dashboard can include such controls as an emergency button the user can press to initiate or indicate an emergency condition. The indication of an emergency condition can further cause the PSE to collect context information and initiate emergency contacts, priority calls, and other actions to attempt to remediate or alert others of the situation. The dashboard, in some examples, can further include buttons that provide easy access to information pertaining to personal security such as the location of nearby hospitals, nearby police stations, nearby fire stations, the designation and contacting of emergency contacts, the definition and enforcement of geo-fences and geo-fence rules that apply to a user of the PSE, among other examples. Further, an example PSE dashboard can provide controls allowing a user to easily manage settings and perform sets of activities in connection with the PSE, such as the designation of rules, contacts, geo-fences, and other examples.

Figure 25C:
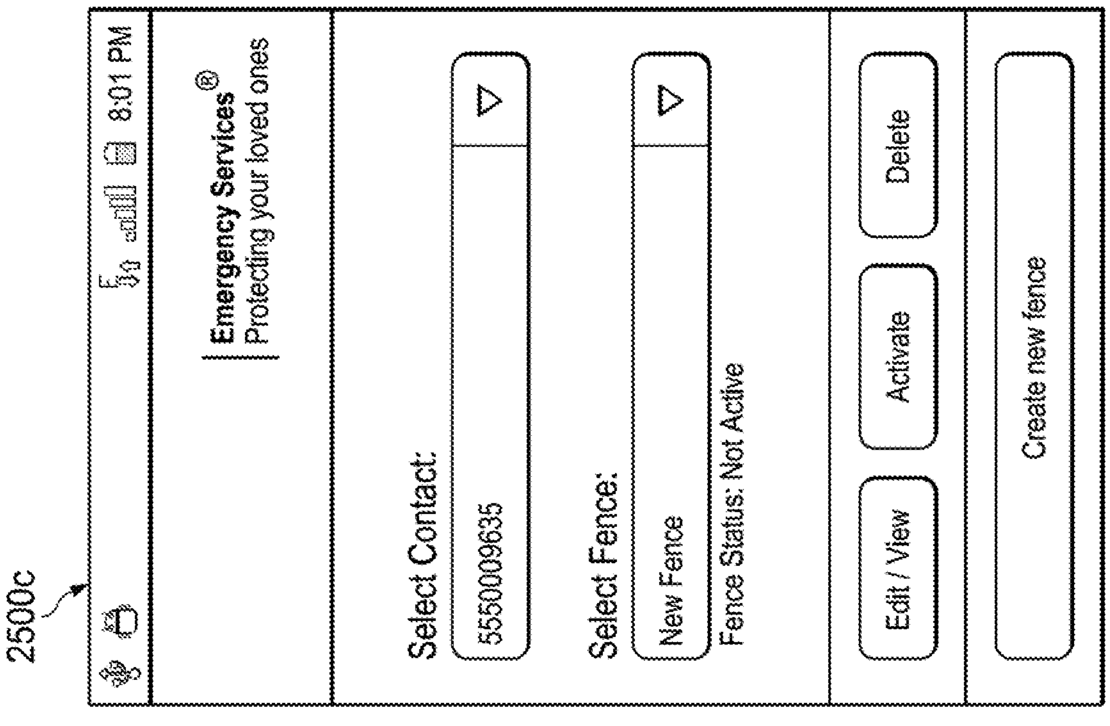
Figure 25D:
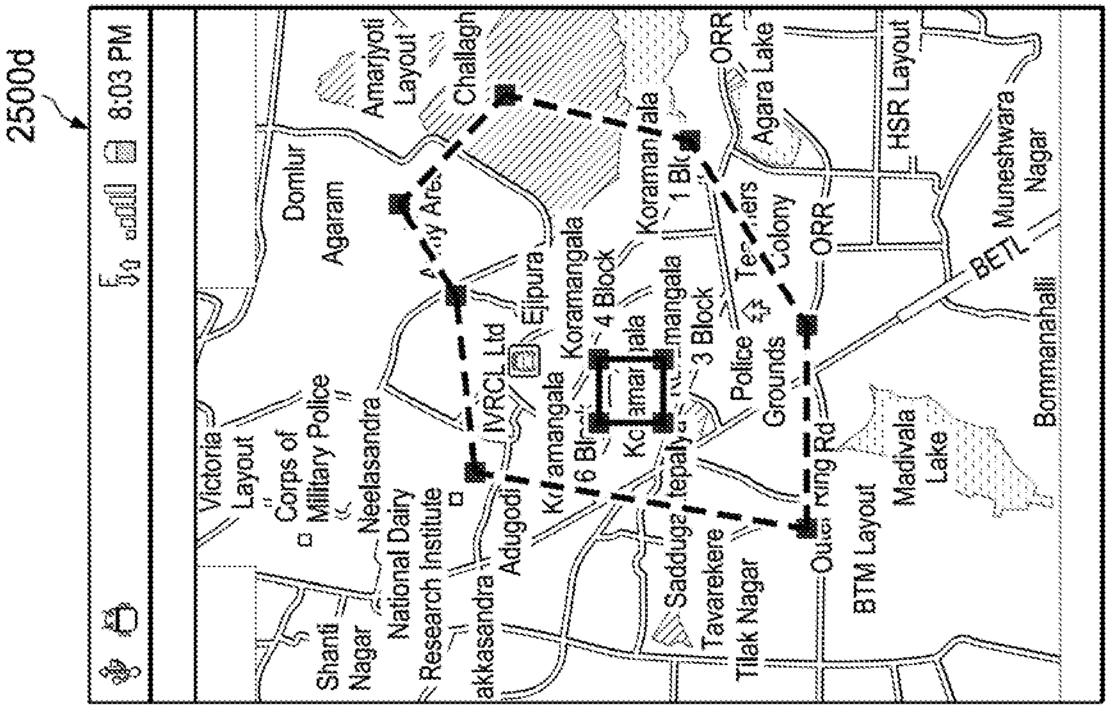

Turning to FIG. 25B, a screenshot 2500*b* is shown of the user interface allowing a user to review and designate settings relating to the functionality of a PSE. Such settings can include the designation of personal information, emergency contact information, priority call message content, audio messages, emergency alerts and ring tones, among other examples. In the example of FIG. 25C, a window is shown for managing geo-fences in connection with various rules and contacts. For instance, geo-fence rules can be set for a user, contacts, family members, etc. Additionally, a user can create new geo-fences, activate geo-fence rules and fence boundaries, and edit geo-fence rules and boundaries, among other examples. Relatedly, the example of FIG. 25D illustrates a graphical user interface pertaining to geo-fences that can be used, for instance, in defining dimensions of a geo-fence, examining the location of the user or family member, etc. within one or geo-fences, defining rules for particular geo-fences, among other examples.

Figure 25G:
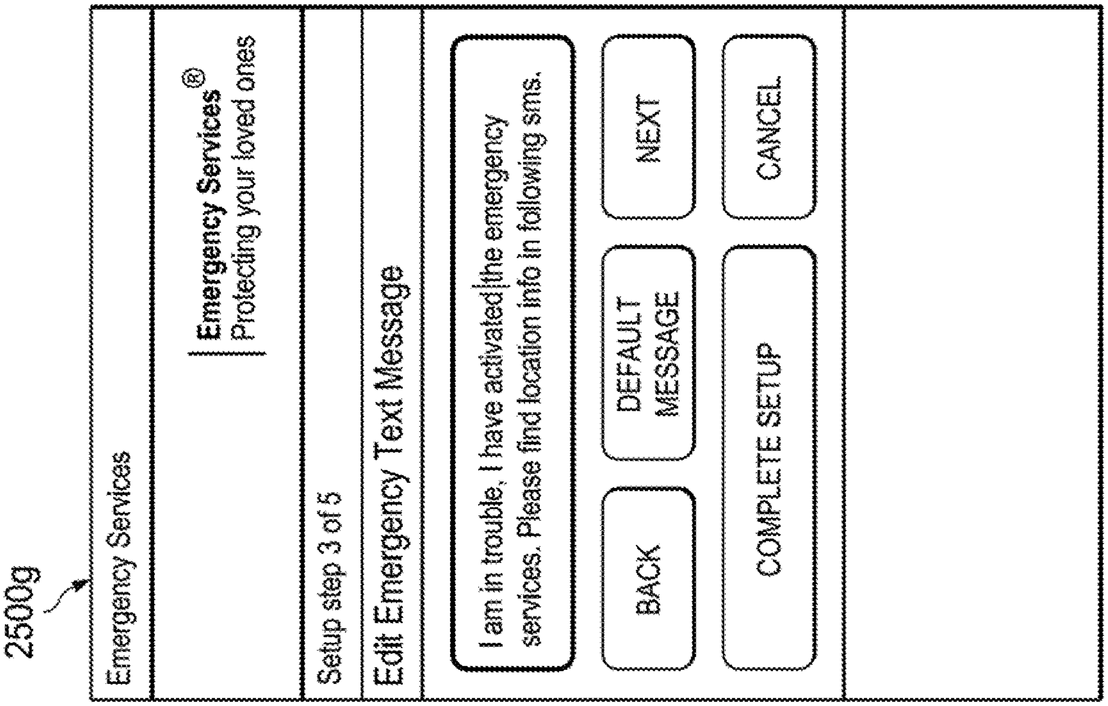
Figure 25H:
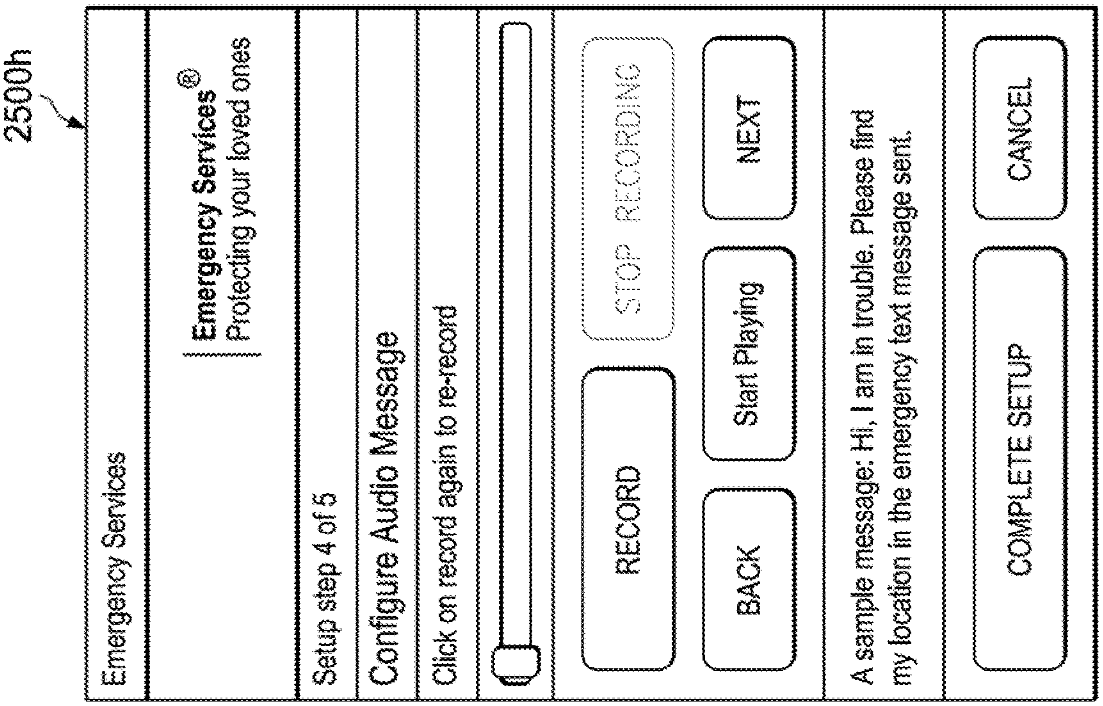
Figure 25I:
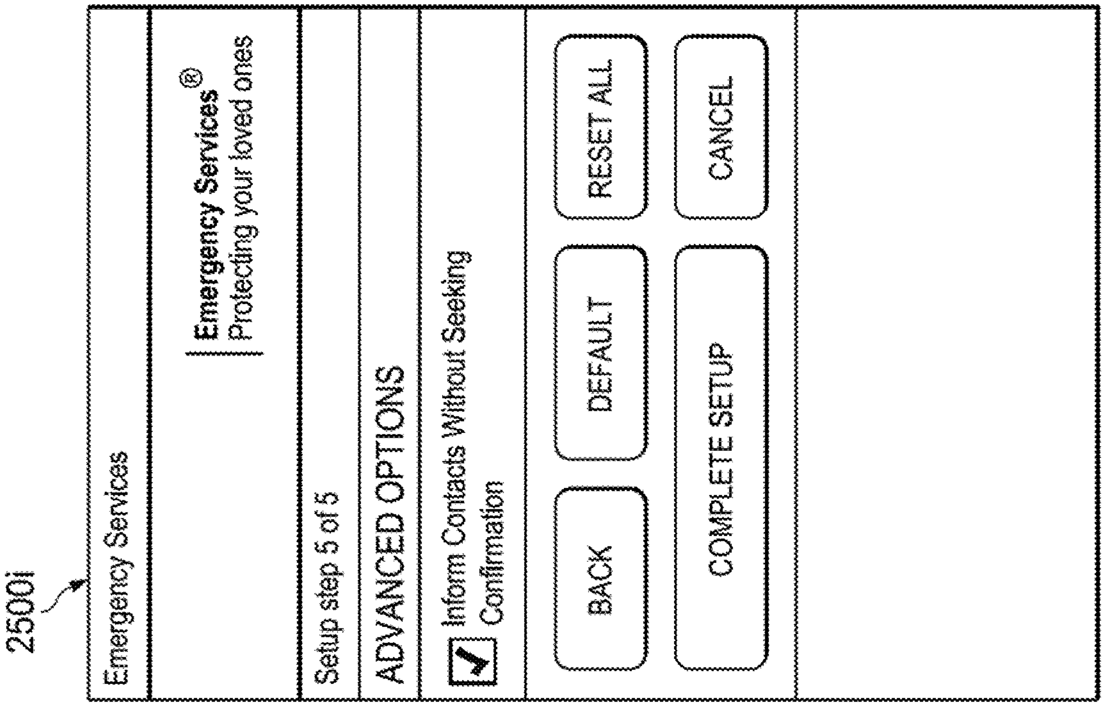

FIGS. 25E-25I illustrate an example flow using one or more example user interfaces of a PSE to perform an account set up for the PSE. For instance, in FIG. 25E, a user can designate personal contact information, profile information, and preferences. In FIG. 25F, a user can assign and designate emergency contacts as well as activate tracking functions and other preferences and settings that apply to monitoring or contacting the emergency contacts or other persons of interest. FIG. 25G shows an example user interface for setting an emergency message that can be communicated, for example, in response to an identified or detected emergency event. In some examples, text-based messaging, as well as the provision of context data, can be set and defined, for instance, in connection with automatically initiated or manually requested priority calls, among other examples. In FIG. 25H, another user interface view is shown of an audio message set up routine allowing a user to pre-record audio messages that can be communicated, for example, to emergency contacts in response to detected emergency events. In some examples, audio messages (as well as other multimedia content) can be provided in connection with a priority call or other action prompted by the detection of an emergency event using, for instance, application to application messaging functionality such as GCM, among other examples. Finally, in this example, FIG. 25I illustrates an example user interface allowing a user to define additional event settings, such as preferences or actions that should be taken, for instance, in response to emergency events identified to the PSE, among other examples.

Figure 25J:
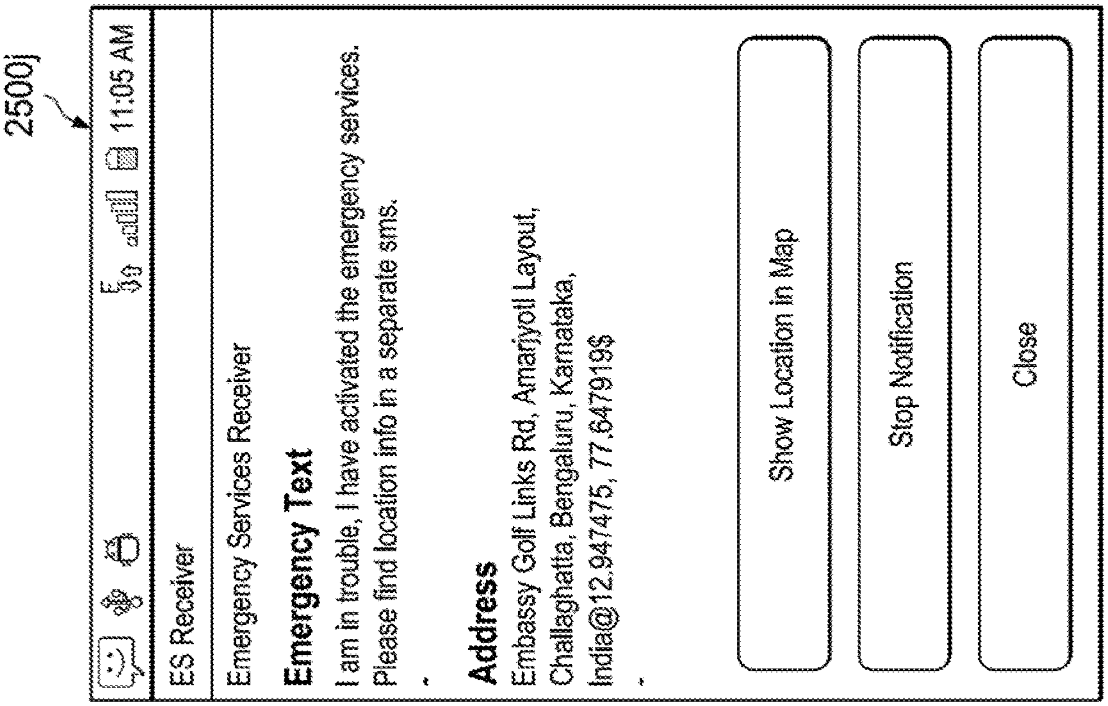
Figure 25K:
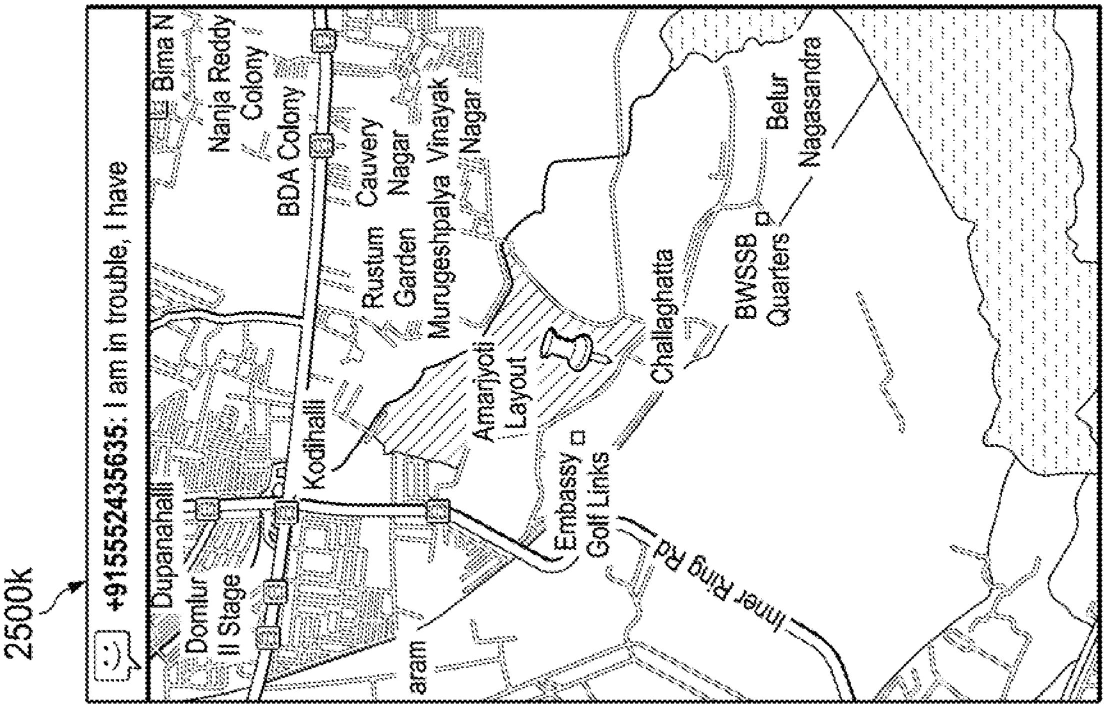
Figure 25L:
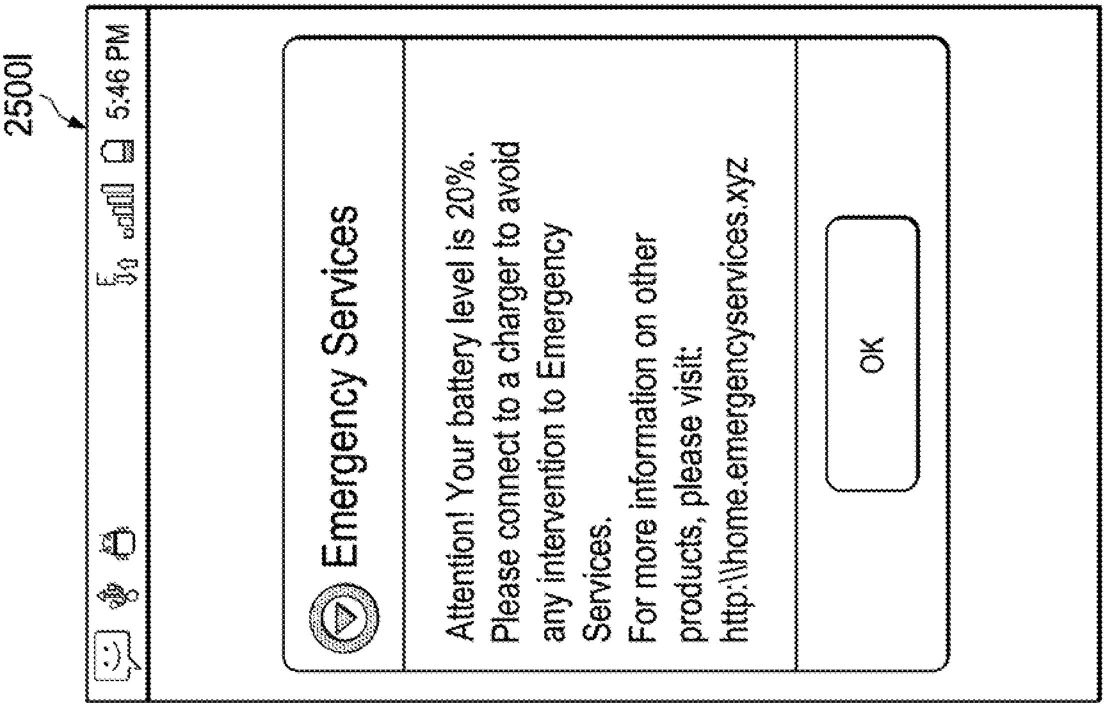

The examples of FIGS. 25J-25K illustrate example user interfaces presented, for instance, on client devices of emergency contacts that have been notified in connection with an emergency event detected at another client device (e.g., utilizing a PSE). For instance, FIG. 25J shows an example user interface of a recipient of an emergency services message that includes received emergency text as well as location information pertaining to the emergency event and/or user affected by the emergency event. Additional example controls can be provided, for instance, such as buttons allowing a user to see an identified emergency or user location on a map, view context data, learn more information about the event (e.g., from other remote services and sources), as well as control whether the notification persists on the display of the receiving client device, among other examples. The example of FIG. 25L shows an example user interface indicating a location on a digital map of a detected emergency event that has been pushed as a notification to a recipient device, such as a client device of a contacted emergency contact. The example of FIG. 25L illustrates an example user interface that can be presented to a user by a PSE in connection with power maintenance functionality of the PSE allowing, for example, a user to accept or deny a suggestion or action by a PSE battery power manager with regard to a detected battery power alert, among other potential examples.

Turning to FIGS. 26A-26F, example flowcharts 2600*a-f* are shown illustrating example techniques in connection with example security services involving, in some implementations, a PSE implemented on a mobile computing device, such as a smart phone, tablet, laptop, netbook, etc. For instance, in the example of FIG. 26A, a personal emergency services dashboard can be presented 2602 on a mobile computing device, the personal emergency services dashboard providing a user with controls for accessing and utilizing personal emergency services provided, for example, by a PSE installed on the mobile computing device. The control can be rendered 2604 on the dashboard that can be manipulated by a user to indicate that an emergency condition is being experienced by the user. One or more personal emergency services can be provided 2606 in connection with user interactions with dashboard controls. For instance, a user manipulation can indicate an emergency condition to cause one or more emergency services actions to be initiated in response to the emergency condition, among many other examples.

Figure 26A:
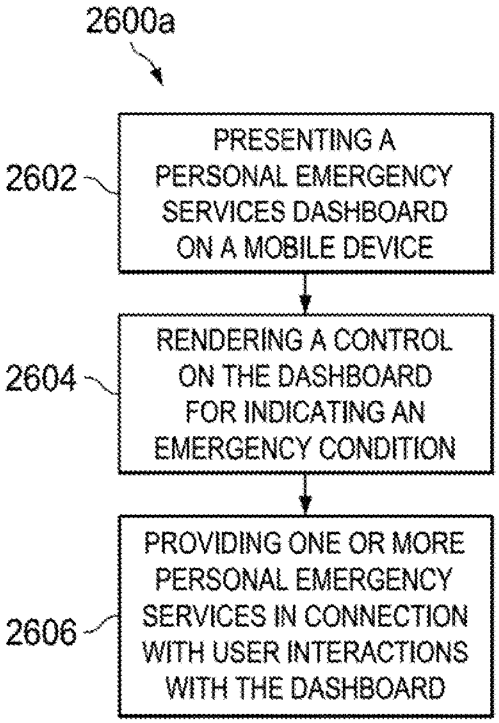
FIGS. 26A-26F are flowcharts representing example operations involving an example personal safety engine in accordance with some embodiments.
Figure 26B:
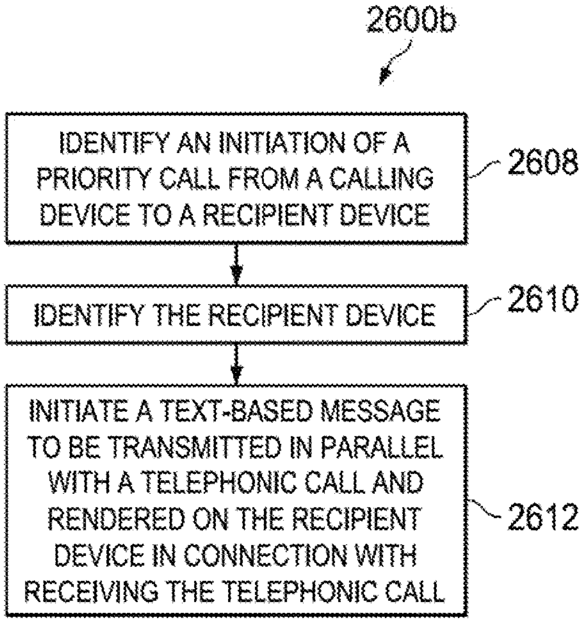

In the example of FIG. 26B, and initiation of a priority call can be identified 2608, the priority call involving a client device placing or initiating a priority call intended for one or more recipient devices, such as recipient devices of emergency contacts associated with the user of the client device. The recipient device can be identified 2610 and the priority call can include a text-based message being transmitted 2612 in parallel with the telephonic portion of the priority call to the recipient device. The text-based message can be rendered in connection with and in some cases substantially concurrent with the receipt of the telephonic portion of the party call at the recipient device to thereby notify the user of the recipient device of a priority condition experienced by a user of the calling device. Indeed, the text-based message can describe the priority condition among other information, including context data collected from the calling device and relating to the priority condition.

Figure 26C:
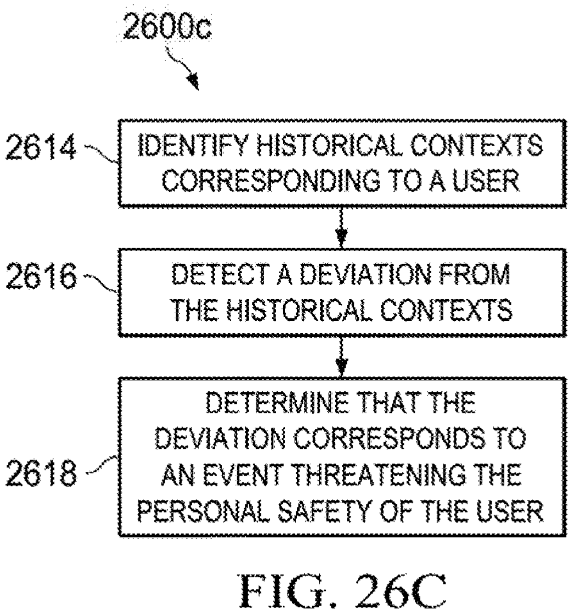

In the example of FIG. 26C, historical contexts can be identified 2614 for a user based on context data that has been obtained, at least in part, through a mobile computing client device associated with the user. A deviation from the historical context can be detected 2616, for instance, based on additional, subsequent context information collected from the mobile computing device describing conditions experienced by the user or of an environment affecting the user, among other examples. It can be determined 2618 that the detected deviation corresponds to an event, such as an emergency event, that potentially jeopardizes the safety and well-being of the user associated with the mobile computing device.

Figure 26D:
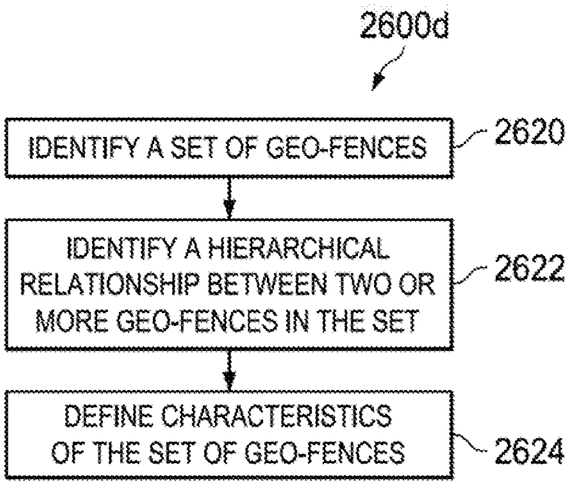

In the example of FIG. 26D, a set of geo-fences can be defined or identified 2620 and a hierarchical relationship can be identified 2622 between two or more of the set of geo-fences. The user can be allowed to 2624 to define characteristics of the set of geo-fences. For instance, one a more rules, including rules used to determine personal safety of one or more persons can be defined and associated with one or more of the set of geo-fences. In addition, rules can vary between two or more geo-fences in a hierarchical relationship. Users can define characteristics of geo-fences including rules associated with the geo-fences, associations between particular users and particular defenses, the boundaries of a geo-fence, among other examples. Geo-fences can be used in connection with providing personal safety services to one or more users in some implementations.

Figure 26E:
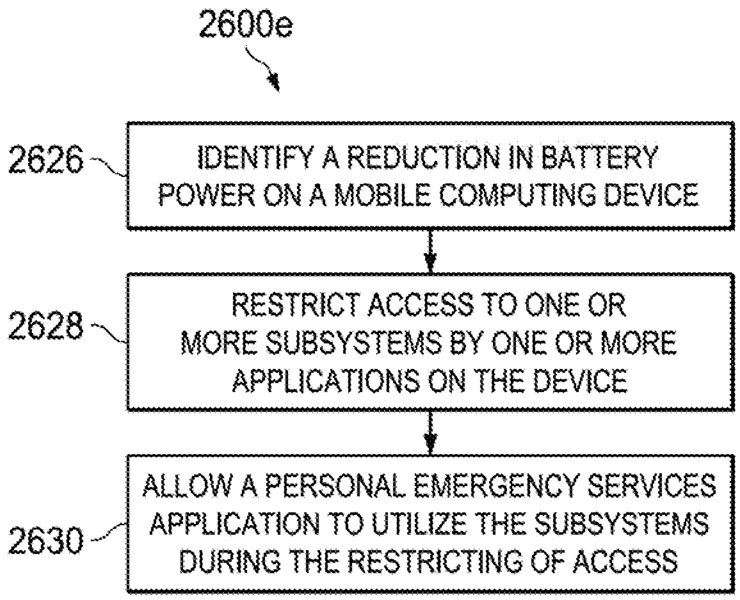

In the example of FIG. 26E, a reduction in battery power can be identified 2626 on a mobile computing device. Access to one or more subsystems by one or more applications on the mobile computing device can be restricted 2628 based at least in part on the identified reduction in battery power. Further, a personal emergency services application on the mobile computing device can be allowed 2630 to continue to utilize the subsystems, including restricted subsystems, during the restricting of access to the one or more applications.

Figure 26F:
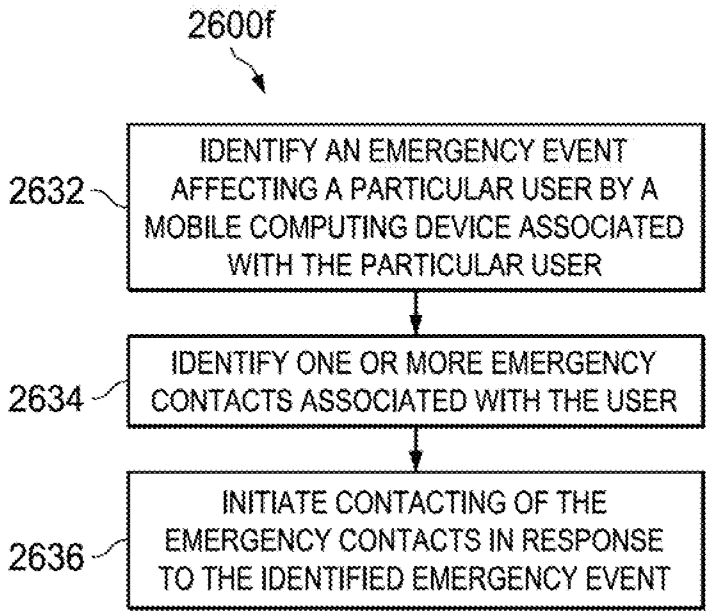

In the example of FIG. 26F, an emergency event can be identified 2632 affecting a particular user. The emergency event can be detected or identified on a mobile computing device associated with a particular user. One or more emergency contacts can be identified 2634 that are associated with the user based at least in part on the identified emergency event. Further, contacting of the emergency contacts can be automatically initiated 2636, in some cases, without the intervention of the affected user, in response to the identified emergency event in order to communicate the occurrence of the event along with details of the event to the one or more emergency contacts.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, diverse user interface layouts and functionality can be supported. Additionally, while the above description focuses on applying the above principles to the generation of customized whitelists, similar principles can be applied to generating other such listings used in security tasks, including tailored blacklists. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on machine accessible storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium or other machine accessible storage medium can be, or be included in, a computer-readable storage device, a computer-readable storage substrate, a random or serial access memory array or device, or a combination of one or more of them. Moreover, while a machine accessible storage medium is not a propagated signal per se, a machine accessible storage medium can be a source or destination of computer program instructions encoded in an artificially generated propagated signal. The machine accessible storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. "Network elements" can encompass various types of routers, switches, gateways, bridges, loadbalancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

The following examples pertain to embodiments in accordance with this Specification. One or more embodiments may provide an apparatus, a system, a machine readable medium, and a method to identify one or more historical contexts for a user from historical context data, where at least a portion of the historical context data was collected from sensors on a client device associated with the user. Context data can be detected from sensors on the client device, the context data describing a present context of the user. It can be determined that the present context deviates from the historical context beyond a threshold and further determined that the deviation corresponds to an event jeopardizing safety of the user based on the determination that the present context deviates from the historical context beyond the threshold.

In one example, an action can be launched based on the determined event. The action can include at least one of initiating a priority call, collecting additional context data at the client device, and alerting an emergency contact. The action can be determined based on the context data.

In one example, the context data includes one or more of location context data, device context data, ambient context data, user context data, and security context data. User context data can include user profile data and user state data.

In one example, the context data is received from the client device.

In one example, the received context data is encrypted with a temporary key.

In one example, the context data is received from a source external to the client device. The context data can include context data received from the client device. Historical context data can include historical context data collected from the external source.

In one example, detecting the deviation includes determining a context-specific deviation for each of a set of context types and determining a net deviation from the context-specific deviations. The set of context types can include location context data, device context data, ambient context data, user context data, and security context data.

In one example, determining a context-specific deviation includes identifying a weighting for the context type and applying the weighting to the corresponding context-specific deviation.

In one example, steps are performed at least in part by the client device. In other examples, steps are performed at least in part by a personal safety server external to the client device.

In one example, the action includes initiating a priority call that includes a telephonic component and a text-based component and the text-based component describes the present context.

One or more embodiments may provide an apparatus, a system, a machine readable medium, and a method to identify an initiation of a priority call, where the priority call includes a telephonic component and a text-based component. A recipient device for the priority call can be identified. The text-based component can be caused to be transmitted to the recipient device in parallel with initiation of the telephonic component, where the telephonic component includes a telephone call from a calling device to the recipient device. The text-based component can be received and displayed at the recipient device in connection with receiving of the telephonic call at the recipient device, and the text-based component can include a message describing conditions affecting a user of the calling device.

In one example, the text-based message is communicated over a web-based messaging service to a corresponding application on the recipient device. The text-based message can include, for instance, a GCM message, an SMS message, or other message. The text-based message can be displayed substantially concurrently with an indication of the telephonic call at the recipient device.

In one example, context data can be collected from the calling device and cause the context data to be communicated to the recipient device. The context data can include one or more of location context data, device context data, ambient context data, user context data, and security context data.

In one example, the priority call is initiated in a response to a user input at the calling device requesting the priority call.

In one example, the priority call is initiated without intervention of a user at the calling device and in response to a detection of a priority condition at the calling device. The priority condition can be determined automatically from context information detected at least in part at the calling device. Content of the text-based message can be selected automatically based on characteristics of the detected priority condition.

In one example, the recipient device is identified as corresponding to a particular emergency contact on a listing of emergency contacts associated with the calling device. The particular emergency contact can be automatically selected based on the conditions affecting the user.

In one example, the priority call overrides at least one of an existing call on the recipient device and a silent ringtone setting of the recipient device.

In one example, the priority call causes presentation of a ringtone or display at the recipient device corresponding to priority calls.

In one example, steps are performed by a server device external to the calling device and the recipient device, where the external server device facilitates the priority call between the calling device and the recipient device. In other examples, steps can be performed by the calling device.

In one example, the conditions include an emergency condition.

In one example, response status information can be collected from the recipient device and the response status information can be communicated for presentation on the calling device.

In one example, the response status information describes at least one of whether the priority call has been acknowledged by a user of the recipient device, an action initiated by the user of the recipient device in response to the priority call, and a location of the user of the recipient device.

One or more embodiments may provide an apparatus, a system, a machine readable medium, and a method to identify a plurality of geo-fences and determine a hierarchy of geo-fences including the plurality of geo-fences. The hierarchy of geo-fences can include a first geo-fence and a second geo-fence in the plurality of geo-fences, where the first geo-fence forms a perimeter around a first geographical area, the second geo-fence forms a perimeter around a second geographical area, and the second geographical area is contained within the first geographical area.

In one example, a first set of rules for the first geo-fence can be defined and a second set of rules for the second geo-fence can be defined, where the first set of rules is different from the second set of rules.

In one example, each of the first and second sets of rules correspond to monitoring of personal safety of one or more users.

In one example, personal safety is monitored, at least in part, through geolocation data identifying whether the one or more users are located in a particular one of the plurality of geo-fences.

In one example, the geolocation data is acquired from respective mobile client devices associated with the one or more users.

In one example, the particular geo-fence corresponds to a restricted geographic location and detecting that a particular user is located within the particular geo-fence triggers an indication of an emergency condition affecting the particular user.

In one example, the first and second sets of rules are associated with a particular user. The first and second sets of rules can be defined at least in part by the particular user.

In one example, at least one the first and second sets of rules are defined by a first user to apply to one or more other users. The other users can include at least one of a child, a disabled person, or an elderly person monitored by the first user.

In one example, at least one geo-fence includes a concave polygon.

In one example, a user can be allowed to define boundaries of one or more geo-fences. The user can define a boundary of a particular geofence through one or more touchscreen manipulations. The boundary can be a polygon defined by three or more vertices and the user can define the boundary by dragging and dropping graphical representations of the vertices overlaid on a presentation of a map corresponding to a geographical area to be represented by the particular geo-fence. In another example, a center location of the particular geo-fence can be defined by tapping a presentation of a map corresponding to a geographical area to be represented by the particular geo-fence. In another example, the particular geo-fence can be defined by combining two or more other geo-fence representations displayed on a touchscreen interface by concurrently selecting the other geo-fence representations and performing a pinch operation to merge the other geo-fence representations.

In one example, steps are performed at least in part by a client device. In some instances, steps are performed at least in part by a personal safety server.

In one example, at least one of the plurality of geo-fences can be defined.

In one example, a particular geo-fence for a particular user can be automatically defined based on detected location context tendencies of the particular user.

In one example, the particular geo-fence is defined based on a number of times the particular user is detected as positioned within a geographical area corresponding to the particular geo-fence and durations of time the particular user was positioned with the geographical area. Rules can be defined corresponding to the durations of time.

In one example, defining the particular geo-fence includes allowing a user to define boundaries of one or more geo-fences.

In one example, the user defines a boundary of a particular geo-fence through one or more touchscreen manipulations.

One or more embodiments may provide an apparatus, a system, a machine readable medium, and a method to identify a reduction in battery power on a mobile computing device and restrict access to one or more subsystems of the mobile computing device by one or more applications on the mobile computing device based at least in part on the reduction in battery power. A personal emergency services application can be allowed to utilize subsystems of the mobile computing device during the restricting of access.

In one example, the one or more subsystems are pre-selected by a user of the mobile computing device.

In one example, the one or more applications are pre-selected by a user of the mobile computing device.

In one example, it can be determined that battery power on the mobile computing device has fallen below a pre-defined threshold level.

In one example, the threshold level is one of a set of threshold levels defined for the mobile computing device, where a first one of the applications is restricted based on the battery power falling below a first one of the set of threshold levels, and a second one of the applications is restricted based on the battery power falling below a different, second one of the set of threshold levels.

In one example, the threshold level is a first threshold level and determining that battery power has fallen below a second, lower threshold level causes one or both of additional applications or access to additional subsystems to be restricted.

In one example, the personal emergency services application operates in a low power mode based at least in part on identifying the reduction in battery power.

In one example, the personal emergency services application utilizes at least a particular one of the subsystems to collect context information relating to monitoring of personal safety of a user of the mobile computing device.

In one example, the particular subsystem includes at least one of a camera, accelerometer, geopositional sensor, and microphone.

In one example, the personal emergency services application utilizes at least a particular one of the subsystems to facilitate communication of detected personal security events affecting a user of the mobile computing device.

In one example, a user of the mobile computing device can be prompted for approval to restrict the access and user approval can be received in response to the prompt.

One or more embodiments may provide an apparatus, a system, a machine readable medium, and a method to present an interactive personal safety services dashboard on a mobile computing device, where the personal safety services dashboard includes emergency alert controls operable, when manipulated by a user, to indicate an emergency condition affecting a user of the mobile computing device. One or more personal emergency services can be provided in response to user interactions with the personal safety services dashboard.

In one example, the personal safety services dashboard includes further controls for initiating a priority call.

In one example, initiating a priority call includes identifying a recipient device for the priority call and initiating a text-based message to be transmitted to the recipient device in parallel with a telephonic call from the mobile computing device to the recipient device. The text-based message can be received and displayed at the recipient device in connection with receiving the telephonic call at the recipient device and the text-based message can describe conditions of a user of the calling device.

In one example, a priority call is initiated in connection with an indication of an emergency condition based on a user manipulation of the emergency alert controls.

In one example, the personal safety services dashboard includes further controls for identifying and defining emergency contacts for the user.

In one example, an indication of an emergency condition affecting the user causes the mobile computing device to initiate communication of the emergency condition to one or more of the emergency contacts.

In one example, the personal safety services dashboard includes further controls for monitoring responses to the emergency condition by one or more of the emergency contacts.

In one example, the personal safety services dashboard includes further controls for causing location information of one or more of the emergency contacts to be displayed on a digital map on the mobile computing device.

In one example, the personal safety services dashboard includes further controls for defining one or more geo-fences associated with the user.

In one example, the geo-fences are used in the assessment of the safety of the user by the one or more personal safety services.

In one example, the personal safety services dashboard includes further controls for controlling battery management on the mobile computing device to preserve battery power for the one or more personal safety services.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, various combinations of components, steps, and functionality can be implemented and still fall within the scope of the principles described above. Moreover, a listing of elements or features, such as "at least one of A, B and C" could mean A; B; C; A and B; A and C; or A, B, and C, etc., among other examples.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one machine accessible, non-transitory storage medium having instructions stored thereon, wherein the instructions, when executed on a machine, cause the machine to:

identify an initiation of a priority call, wherein the priority call is initiated without intervention of a user at a calling device and in response to a detection of a priority condition at the calling device, the priority condition is determined automatically from context information detected at least in part at the calling device, the context information describes a current context of use of the calling device, the priority condition is determined based on a determination that the current context of use deviates from an expected context of use beyond a threshold, and the priority call includes a telephonic component and a text-based component;

identify a recipient device for the priority call; and cause the text-based component to be transmitted to the recipient device in parallel with initiation of the telephonic component, wherein the telephonic component comprises a telephone call from calling device to the recipient device, the text-based component is to be received and displayed at the recipient device in connection with receiving of the telephone call at the recipient device, the priority call overrides an existing call on the recipient device, and the text-based component includes a message describing conditions affecting a user of the calling device.

2. The non-transitory storage medium of claim 1, wherein the message is communicated over a web-based messaging service to a corresponding application on the recipient device.

3. The non-transitory storage medium of claim 2, wherein the message includes a GCM message.

4. The non-transitory storage medium of claim 2, wherein the message includes an SMS message.

5. The non-transitory storage medium of claim 2, wherein the message is displayed substantially concurrently with an indication of the telephone call at the recipient device.

6. The non-transitory storage medium of claim 1, wherein the instructions further cause the machine to collect context data from the calling device and cause the context data to be communicated to the recipient device.

7. The non-transitory storage medium of claim 6, wherein the context data includes one or more of location context data, device context data, ambient context data, user context data, and security context data.

8. The non-transitory storage medium of claim 1, wherein the priority call is initiated in a response to a user input at the calling device requesting the priority call.

9. The non-transitory storage medium of claim 1, wherein content of the message is selected automatically based on characteristics of the priority condition.

10. The non-transitory storage medium of claim 1, wherein the recipient device is identified as corresponding to a particular emergency contact on a listing of emergency contacts associated with the calling device.

11. The non-transitory storage medium of claim 10, wherein the particular emergency contact is automatically selected based on the conditions affecting the user.

12. The non-transitory storage medium of claim 1, wherein the priority call overrides a silent ringtone setting of the recipient device.

13. The non-transitory storage medium of claim 1, wherein the priority call causes presentation of a ringtone or display at the recipient device corresponding to priority calls.

14. A method comprising:

identifying an initiation of a priority call, wherein the priority call is initiated without intervention of a user at a calling device and in response to a detection of a priority condition at the calling device, the priority condition is determined automatically from context information detected at least in part at the calling device, the context information describes a current context of use of the calling device, the priority condition is determined based on a determination that the current context of use deviates from an expected context of use beyond a threshold, and the priority call includes a telephonic component and a text-based component;

identifying a recipient device for the priority call; and causing the text-based component to be transmitted to the recipient device in parallel with initiation of the telephonic component, wherein the telephonic component comprises a telephone call from the calling device to the recipient device, the text-based component is to be received and displayed at the recipient device in connection with receiving of the telephone call at the recipient device, the priority call overrides an existing call on the recipient device, and the text-based component includes a message describing conditions affecting a user of the calling device.

15. A system comprising:

at least one processor device;

at least one memory element; and a personal safety engine adapted, when executed by the at least one processor device, to identify an initiation of a priority call, wherein the priority call is initiated without intervention of a user at a calling device and in response to a detection of a priority condition at the calling device, the priority condition is determined automatically from context information detected at least in part at the calling device, the context information describes a current context of use of the calling device, the priority condition is determined based on a determination that the current context of use deviates from an expected context of use beyond a threshold, and the priority call includes a telephonic component and a text-based component;

identify a recipient device for the priority call; and cause the text-based component to be transmitted to the recipient device in parallel with initiation of the telephonic component, wherein the telephonic component comprises a telephone call from the calling device to the recipient device, the text-based component is to be received and displayed at the recipient device in connection with receiving of the telephone call at the recipient device, the priority call overrides an existing call on the recipient device, and the text-based component includes a message describing conditions affecting a user of the calling device.

16. The system of claim 15, wherein at least a portion of the personal safety engine is hosted on the calling device.

17. The system of claim 15, wherein at least a portion of the personal safety engine is hosted on a server system external to the calling device.

* * * * *

UNITED STATES PATENT AND TRADEMARK OFFICE

CERTIFICATE OF CORRECTION

PATENT NO. : 10,536,570 B2
APPLICATION NO. : 15/348531
DATED : January 14, 2020
INVENTOR(S) : Srikanth Nalluri et al.

It is certified that error appears in the above-identified patent and that said Letters Patent is hereby corrected as shown below:

In the Drawings

On Sheet 22 of 30, in FIG. 23A, Line 7 (approx.), delete "(f1(EXCEPT(f3(f4)" and insert -- (f1(EXCEPT(f3(f4)) --, therefor.

Signed and Sealed this
Seventeenth Day of March, 2020

Andrei Iancu
*Director of the United States Patent and Trademark Office*